(12) United States Patent
Asmussen

(10) Patent No.: US 7,207,053 B1
(45) Date of Patent: Apr. 17, 2007

(54) METHOD AND APPARATUS FOR LOCALLY TARGETING VIRTUAL OBJECTS WITHIN A TERMINAL

(75) Inventor: Michael L. Asmussen, Fairfax County, VA (US)

(73) Assignee: Sedna Patent Services, LLC, Philadelphia, PA (US)

( * ) Notice: Subject to any disclaimer, the term of this patent is extended or adjusted under 35 U.S.C. 154(b) by 839 days.

(21) Appl. No.: 09/628,805

(22) Filed: Jul. 28, 2000

Related U.S. Application Data

(63) Continuation-in-part of application No. 09/597,893, filed on Jun. 19, 2000, which is a continuation-in-part of application No. 09/054,419, filed on Apr. 3, 1998, now Pat. No. 6,463,585, which is a continuation-in-part of application No. 08/735,549, filed on Oct. 23, 1996, now Pat. No. 6,738,978, which is a continuation of application No. 08/160,280, filed on Dec. 2, 1993, now Pat. No. 5,600,364, which is a continuation-in-part of application No. 07/991,074, filed on Dec. 9, 1992.

(51) Int. Cl.
 H04N 7/11 (2006.01)
 H04N 7/025 (2006.01)
 H04N 5/445 (2006.01)
(52) U.S. Cl. .......................... 725/42; 725/35
(58) Field of Classification Search .............. 725/11, 725/32–35, 42, 44
 See application file for complete search history.

(56) References Cited

U.S. PATENT DOCUMENTS 4,331,974 A 5/1982 Cogswell et al. ............. 725/34

(Continued)

FOREIGN PATENT DOCUMENTS

EP 0620689 A1 10/1994

(Continued)

OTHER PUBLICATIONS http://www.chilidog.com/zip/zipnotes.html, Zip Codes, Distances, GPS and GNIS, Jun. 29. 1998.*

Primary Examiner—Hunter B. Lonsberry
(74) Attorney, Agent, or Firm—Patterson & Sheridan, LLP

(57) ABSTRACT

A method and an apparatus are used to target virtual objects to subscribers in a television delivery system. Programs are selected and virtual object locations are defined in the selected programs. The virtual objects available for targeting are categorized and the categories are correlated to viewing population information to determine the optimum targeting of the virtual objects. The virtual objects may be targeted based on information related to groups of subscribers. When a frame of a program includes a virtual object location, a default or an alternate virtual object is displayed. The virtual object location may change over space or time. The virtual object may be interactive, and may be used to link a subscriber to a remote location, such as an Internet web site. An operations center or a cable headend may generate group assignment rules that are stored in individual terminals and are used to assign the subscribers' television terminals to groups, based on factors such as area of dominant influence and household income maintained securely and privately within the terminal. A retrieval plan is then generated that instructs the television terminals to select the desired virtual object for display. The television terminals record which virtual objects were displayed, and may use this information to assist in targeting the virtual object.

70 Claims, 29 Drawing Sheets

U.S. PATENT DOCUMENTS

| | | | |
|---|---|---|---|
| 4,930,160 A | 5/1990 | Vogel | 725/30 |
| 5,155,591 A | 10/1992 | Wachob | 725/35 |
| 5,270,809 A | 12/1993 | Gammie et al. | |
| 5,317,391 A | 5/1994 | Banker et al. | |
| 5,374,951 A | 12/1994 | Welsh | |
| 5,467,402 A | 11/1995 | Okuyama et al. | |
| 5,515,098 A | 5/1996 | Carles | 725/35 |
| 5,550,863 A | 8/1996 | Yurt et al. | |
| 5,600,364 A | 2/1997 | Hendricks et al. | 725/9 |
| 5,635,989 A | 6/1997 | Rothmuller | |
| 5,715,315 A | 2/1998 | Handelman | |
| 5,818,511 A | 10/1998 | Farry et al. | |
| 5,929,849 A | 7/1999 | Kikinis | 725/113 |
| 6,177,931 B1 * | 1/2001 | Alexander et al. | 725/52 |
| 6,201,536 B1 | 3/2001 | Hendricks et al. | |
| 6,493,872 B1 * | 12/2002 | Rangan et al. | 725/32 |
| 6,741,834 B1 * | 5/2004 | Godwin | 455/3.01 |

FOREIGN PATENT DOCUMENTS

| | | |
|---|---|---|
| WO | WO/ 94/16527 | 7/1994 |
| WO | WO 96/08109 | 3/1996 |
| WO | WO 99/26415 | 5/1999 |
| WO | WO 99/52285 | 10/1999 |

* cited by examiner

METHOD AND APPARATUS FOR LOCALLY TARGETING VIRTUAL OBJECTS WITHIN A TERMINAL

This application is a continuation-in-part of U.S. application Ser. No. 09/597,893, filed Jun. 19, 2000, entitled METHOD AND APPARATUS FOR TARGETING VIRTUAL OBJECTS, which is a continuation-in-part of U.S. application Ser. No. 09/054,419, filed Apr. 3, 1998, now U.S. Pat. No. 6,463,585, entitled TARGETED ADVERTISEMENT USING TELEVISION DELIVERY SYSTEMS, which is a continuation-in-part of U.S. application Ser. No. 08/735,549, filed Oct. 23, 1996, now U.S. Pat. No. 6,738,978, entitled METHOD AND APPARATUS FOR TARGETED ADVERTISING, which is a continuation of U.S. application Ser. No. 08/160,280, filed Dec. 2, 1993, entitled NETWORK CONTROLLER FOR CABLE TELEVISION DELIVERY SYSTEM, now U.S. Pat. No. 5,600,364, which was a continuation-in-part of U.S. application Ser. No. 07/991,074, filed Dec. 9, 1992, entitled REMOTE CONTROL FOR MENU DRIVEN SUBSCRIBER ACCESS TO TELEVISION PROGRAMMING.

TECHNICAL FIELD

The technical field relates to a method and apparatus for providing virtual objects that are targeted to subscribers based on processing performed locally by a subscriber's terminal. The method and apparatus specifically relate to monitoring, controlling, and managing a content delivery network including an operations center, a local insertion center, or a subscriber's local terminal.

BACKGROUND

Television as an advertising medium has undergone significant advances since its inception in 1939. Modern advances in digital technology now allow viewers to be very selective in choosing programs to watch. Other advances in digital technology have led to such programming enhancements as a "tail" on a hockey puck, or an overlaid first down marker on a football field. The same technological advances allow improvements in the way advertisements are currently presented. Many sporting events are now presented with virtual object advertisements included in the video. For example, the broadcast of a major league baseball game may include one or more virtual object spots in which an advertisement is displayed. The advertisements are then seen by television viewers, but not by fans who attend the game. However, the advertisements are fixed, and are not varied according to individual viewers.

SUMMARY

A system and a method delivers targeted virtual objects to reception sites. A virtual object is a realistic, synthetic replica of an actual object. The virtual object is viewable within video programming and may be combined with original video and audio to supplement or replace portions of the original video and audio content. Virtual objects may be overlaid on video, partially or entirely obscuring the underlying video. An overlaid object may be static in nature, such as a graphical icon or the like, or alternatively may be dynamic, such as a video clip, animation, or scrolling alphanumeric characters, for example. Overlaid objects may be limited spatially to a fixed portion of the video screen, limited temporally to a given time for display, limited by a combination of both location and time, or tied to a spatially changing portion of the screen that is moving with time. Alternatively, virtual objects may be added to and embedded within the actual video. Multiple virtual objects may be embedded in the video in a multi-layer fashion. The virtual object is indistinguishable from the other video content sharing the field of view. Virtual objects may be interactive in nature. That is, a viewer may select an object and the selection will initiate a process whereby a reception site sends a command to a location designated by the interactive virtual object to initiate some action.

An operations center may process the video signal to allow for the insertion of virtual objects into the video. An object delivery center serves as a standalone or supplemental system to the operations center to deliver virtual objects independently of the video with which the virtual objects are to be associated. A delivery network includes any of a number of different delivery systems to support the delivery of video and virtual objects from the operations center and the object delivery center to a local insertion center, or directly to a reception site. The delivery network is also used to deliver video and virtual objects from the local insertion center to the reception site. The reception site receives the video and virtual objects and associates the appropriate virtual objects with the video based on targeting algorithms.

The reception site collects virtual object viewing information. The reception site may use the virtual object viewing information and other information stored at the reception site to locally target the virtual objects at the reception site. Performing all targeting locally to the reception site maintains the subscriber's privacy. The reception site also provides interactive requests, which are driven by the selection of interactive virtual objects, to an interactive object servicing center using the delivery network. Interactive responses are returned by the interactive object servicing center to the requesting reception site.

The process of managing the content and the virtual objects to be included in the content begins with a number of configuration and set-up steps. Generic reception site and viewing population information can be collected at the operations center. This information is used to characterize the population of reception sites viewing the content in which virtual objects are to be placed. Information may be collected from various sources, including viewer surveys and marketing databases correlated by zip code+4, Nielsen or Arbitron program rating services, for example.

Next, reception site groups are determined. For a number of target categories, groups are defined. Examples of target categories include demographic targeting (age/sex/income) and location, such as Area of Dominant Influence (ADI), for example. Each target category is then segmented into appropriate groups. For example, the ADI may include Los Angeles, Calif. and Washington D.C. New target categories can be added and the groups redefined after their initial establishment.

Group assignment rules are then created by the operations center based on information being collected and tracked locally by each reception site. These group assignment rules are then periodically distributed to all reception sites.

For each target category, each reception site assigns itself to a group based on the information collected by the reception site and the group assignment rules provided by the operations center and stores the group assignments therein.

The group assignment information that is stored at the reception site is able to survive power cycling of the reception site, and other normal service interruptions. Finally, as groups are modified or group assignment rules change, reception sites are notified of the changes using updated group assignment rules being distributed by an operations center. Additionally, the group assignment rules may be periodically resent to the reception sites to ensure that newly added reception sites and to reception sites that have accidentally lost their information are up-to-date.

A virtual object location definer system determines where in the content the virtual objects are to be placed and the rules associated with placement of the virtual objects. Content may be video programming, commercials and advertisements, or electronic program guide (EPG) information, for example. A virtual object selector system determines which available virtual objects are suitable for placement in a virtual object location. A targeted virtual object management system determines which reception site groups should receive and display which virtual object for a given virtual object location. The virtual objects and targeting information are then distributed to reception sites.

After a reception site receives and stores the virtual objects and targeting information, the reception site will place the most appropriate virtual object into virtual object locations based on the targeting information, and will display the combined content with the overlaid or embedded virtual object.

The reception site stores information indicating that a virtual objects was inserted. The accumulated history information maybe collected by the reception site and stored for review purposes at a later time or for use with the group assignment rules. As mechanisms become available to identify specific viewers in a household, the reception site allows for individual identification information to also be provided with collected and stored data.

A centralized operations center can determine virtual object locations available for virtual object placement. Alternatively, a local insertion center can determine the virtual object locations. The operations center can determine the specific virtual objects to be placed in a virtual object location. Alternatively, the local insertion center may determine the specific virtual objects to be placed in a virtual object location. The reception site itself can determine which virtual object is to be placed in a virtual object location based on its own internal routines.

Content, virtual objects, and associated targeting/virtual object placement control and group assignment rules can be relayed to reception sites. The reception site may reside within a digital cable set top box that has access to a delivery network. Alternately, the reception site may be components of digital television satellite receivers. The reception site may be incorporated into the circuitry of a television, thereby eliminating the need for a separate control device attached to the television. Alternatively, the reception site may be incorporated into a personal computer, personal data device, smart phone with a display, or electronic book device.

DESCRIPTION OF THE DRAWINGS

The detailed description will refer to the following drawings in which like numerals refer to like items, and in which.

DETAILED DESCRIPTION

Figure 1:
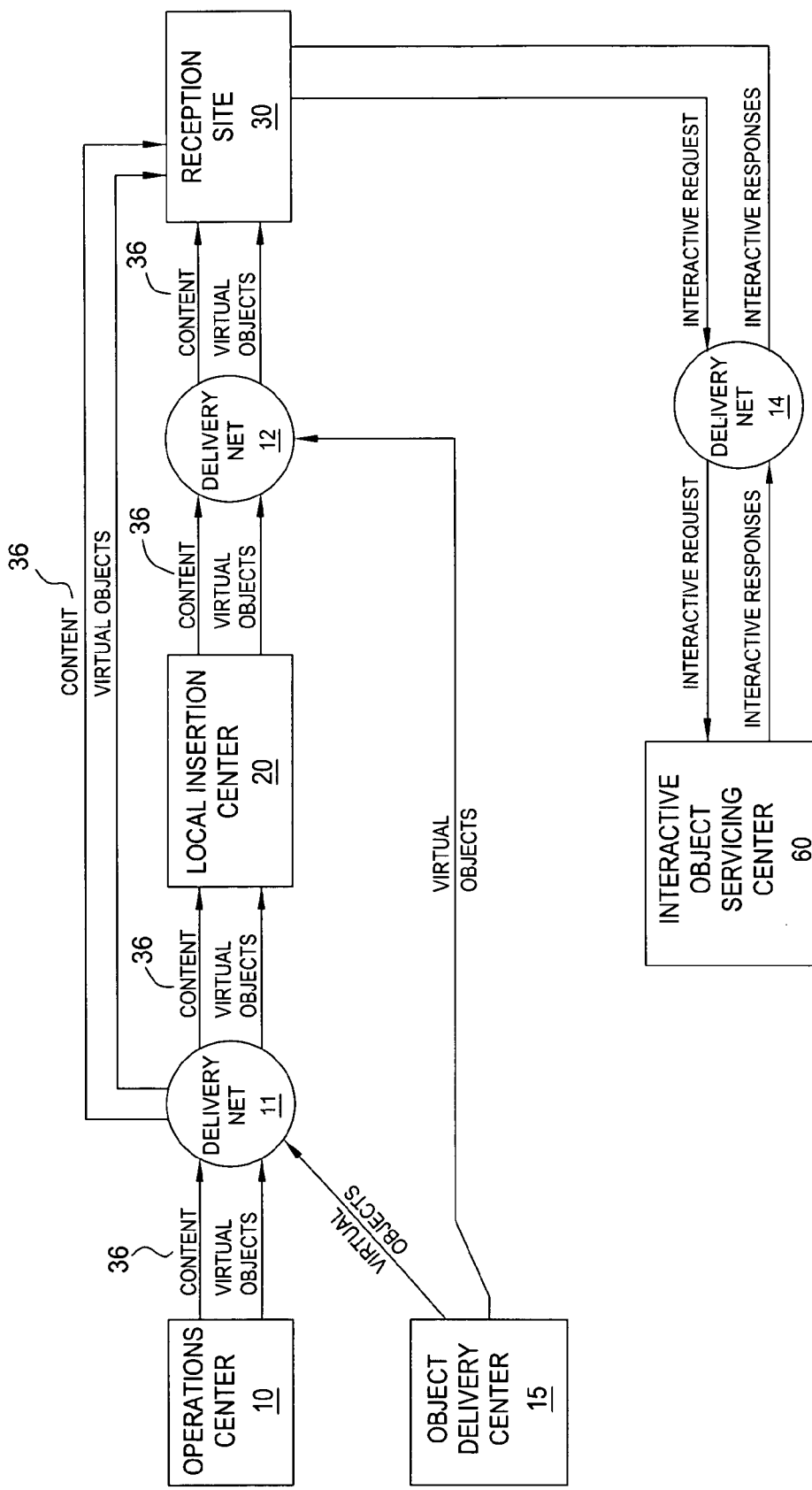
FIG. 1 is an overview of the virtual object targeting delivery system.

An overview of the virtual object delivery system is depicted in FIG. 1. An operations center 10 performs the processing of a video content signal to allow for the insertion of virtual objects into the content 36. An object delivery center 15 serves as a standalone or supplemental system to the operations center 10 to deliver virtual objects independent of the content with which the virtual objects are to be associated. A delivery network 11 includes any of a number of different delivery systems to support the delivery of the content 36 and virtual objects from the operations center 10 and the object delivery center 15 to a local insertion center 20 or directly to a reception site 30. A delivery network 12 is used to deliver content and virtual objects from a local insertion center 20 to the reception site 30. The reception site 30 may be any device or terminal capable of receiving video, including a set top terminal, a television, a personal computer, a wireless telephone, a wired telephone, a PDA device, an electronic book, at digital satellite television receiver or any similar device or terminal.

The reception site 30 receives the content 36 and virtual objects and associates the appropriate virtual objects with the content 36 based on internal targeting algorithms and group assignment rules. The reception site 30 may collect virtual object viewing information to be used in targeting virtual objects and in assigning the reception site to the appropriate group for each target category. The reception site 30 provides interactive requests, which are driven by the selection of interactive virtual objects, to an interactive object servicing center 60 using a delivery network 14. Interactive responses are returned by the interactive object servicing center 60 to the requesting reception site 30.

Figure 2:
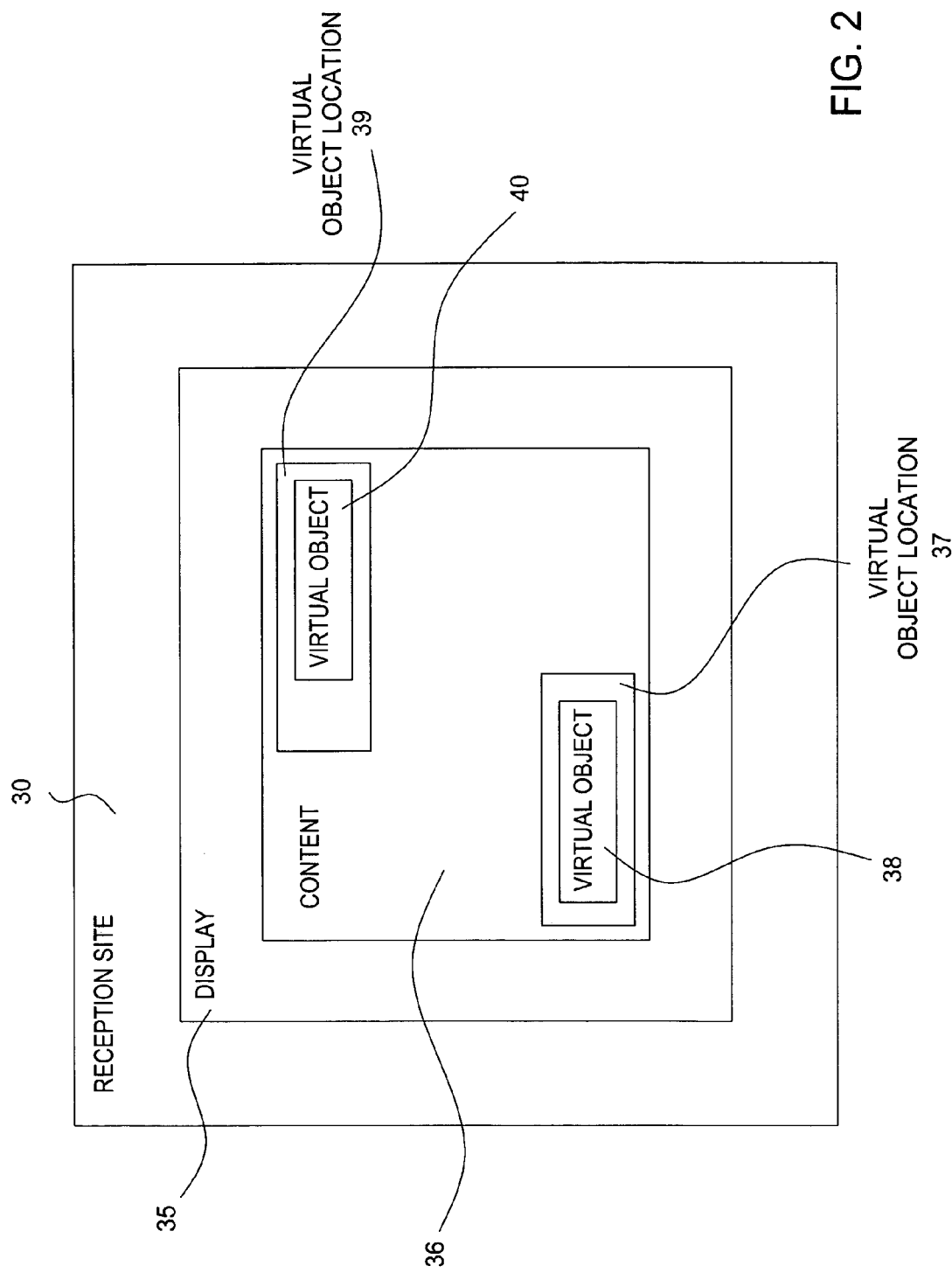
FIG. 2 provides a pictorial representation of virtual objects and virtual object locations.

Virtual objects may be realistic, synthetic replicas of actual objects. Virtual objects may also be caricatures of actual individuals, photographs or other life-like renderings of actual individuals, cartoon figures, text objects, graphical renderings, or icons, for example. The virtual objects may be animated or fixed. The virtual objects are combined with video and audio to supplement or replace portions of video and audio in original content 36. As shown in FIG. 2, the reception site 30 may contain or be connected to a display 35 on which the content 36 maybe displayed. An opportunity, advertisement spot, or location, in the content 36 that is available for the placement of the virtual object will be denoted as a virtual object location 37 henceforward. Within the virtual object location 37, one or more individual virtual objects may be assigned, each denoted as a virtual object 38 henceforward. Multiple virtual object locations, shown as virtual object locations 37 and 39 may be present in the content 36. Multiple virtual objects, shown as virtual objects 38 and 40 maybe present within the virtual object locations.

Figure 3:
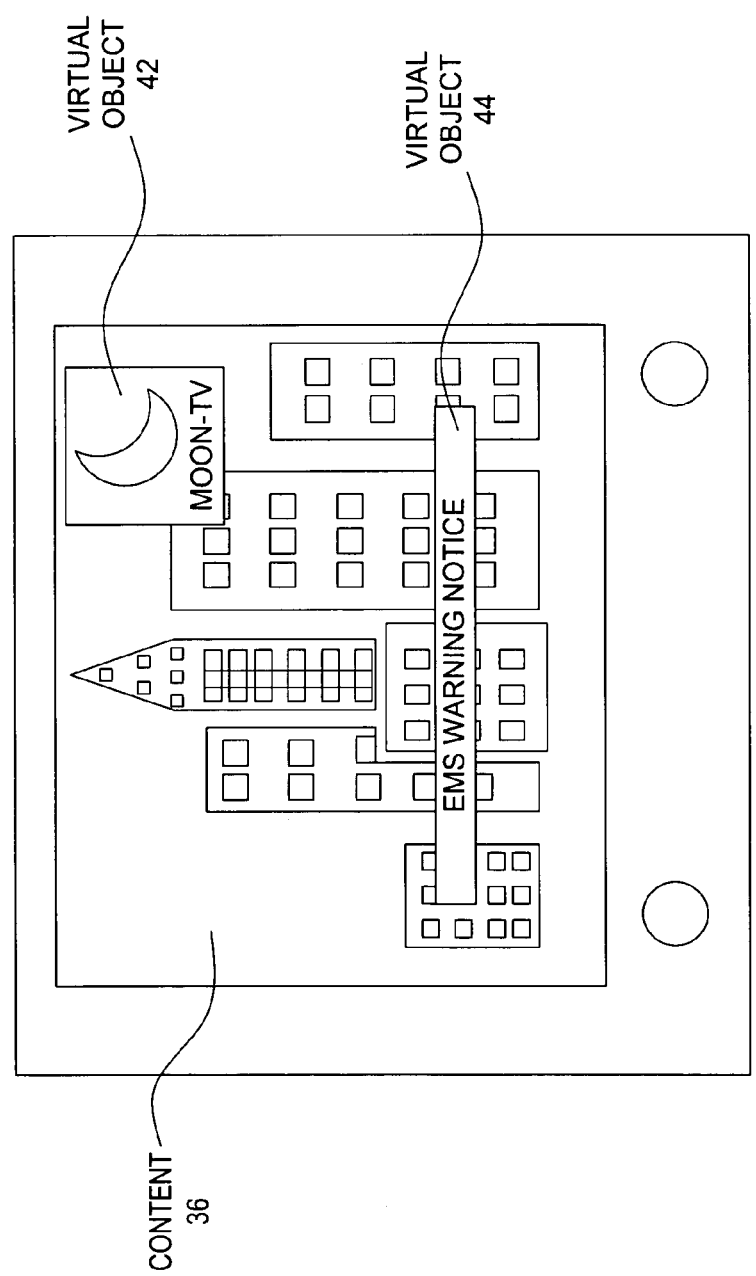
FIG. 3 is an example of an overlaid virtual object.

As shown in FIG. 3, virtual objects may be overlaid on video, partially or entirely obscuring the underlying video. An overlaid virtual object may be static in nature, like a graphical icon, as shown by virtual object 42. Alternatively the overlaid virtual object may be dynamic, like a video clip, animation, or scrolling alphanumeric characters as shown by virtual object 44. Overlaid virtual objects may be limited spatially to a fixed portion of the video, limited temporally to a given time for display, or limited by a combination of both location and time. Overlaid virtual objects may also be tied to a spatially changing portion of the video that is moving with time.

Figure 4:
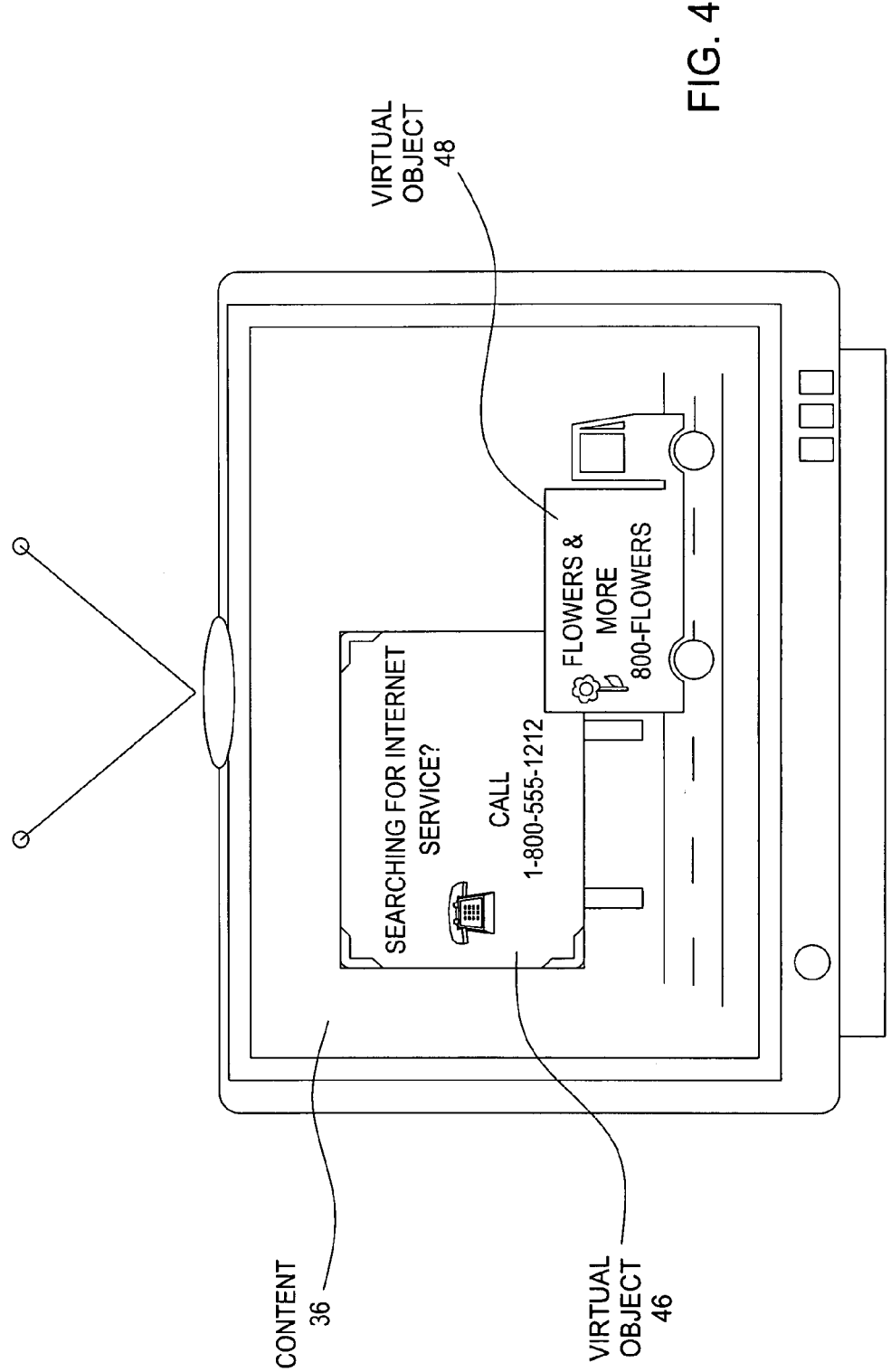
FIG. 4 is an example of an embedded virtual object.

Alternatively, as shown in FIG. 4, virtual objects may be added to and embedded within video. In this alternative, a synthetic virtual object could be indistinguishable from the other video content 36 sharing the field of view as shown by virtual object 46 and virtual object 48. For instance, today's technology allows for the virtual placement of a billboard at televised sports events and the placement of a virtual first down marker in televised football games.

In an embodiment, virtual reality and animation technologies are combined with advanced digital video techniques to provide realistic interaction of virtual objects within video. Combining these technologies, a soda can may be synthetically placed in the video, and may then be made to change over time. This placement and subsequent modification can occur at the video's source, at an intermediate point within the distribution and delivery path, or at the reception site 30. Combining the placement of virtual objects with the ability to target specific virtual objects to specific viewers or groups of viewers allows one household to see a scene with the soda can for cola, while the next door neighbor sees a root beer soda can, for example.

Virtual objects may be interactive in nature, where a viewer can select a virtual object 35 and this selection will initiate a process whereby the reception site 30 sends a command to the location designated by the interactive virtual object 38 to initiate some action. Actions may include linking to a Web site to display content related to the interactive virtual object 38, initiating a purchase transaction, or initiating a request for more information about the selected virtual object 38.

The operations center 10 shown in FIG. 1 may include a number of systems that act together in processing the content 36 for the inclusion of virtual objects, for the selection of appropriate virtual objects to be placed in the content 36, for the targeting of virtual objects to reception site groups, and for the packaging and delivery of the content 36 and virtual objects to reception sites.

Placement of virtual objects can be explicitly selected by the operations center 10, resulting in the specific selection and placement of virtual objects into content 36. Alternatively, the placement maybe generically defined by the operations center 10. In this alternative, the reception site 30 performs all the processing associated with selecting the appropriate virtual object 38 to be placed in the content 36 based on basic guidelines provided by the operations center 10 and algorithms operating at the reception site 30.

Figure 5:
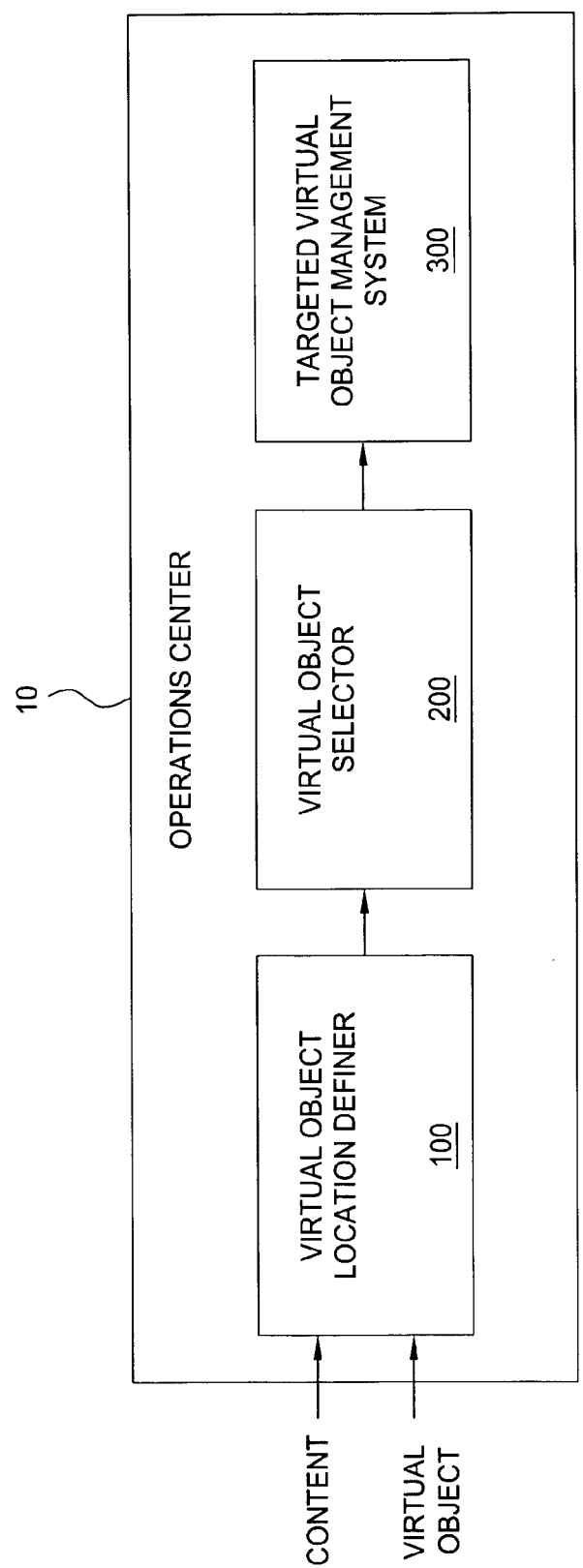
FIG. 5 depicts an operations center.

As shown in FIG. 5, the operations center 10 includes a virtual object location definer 100, a virtual object selector 200, and a targeted virtual object management system (TVOMS) 300.

Figure 6:
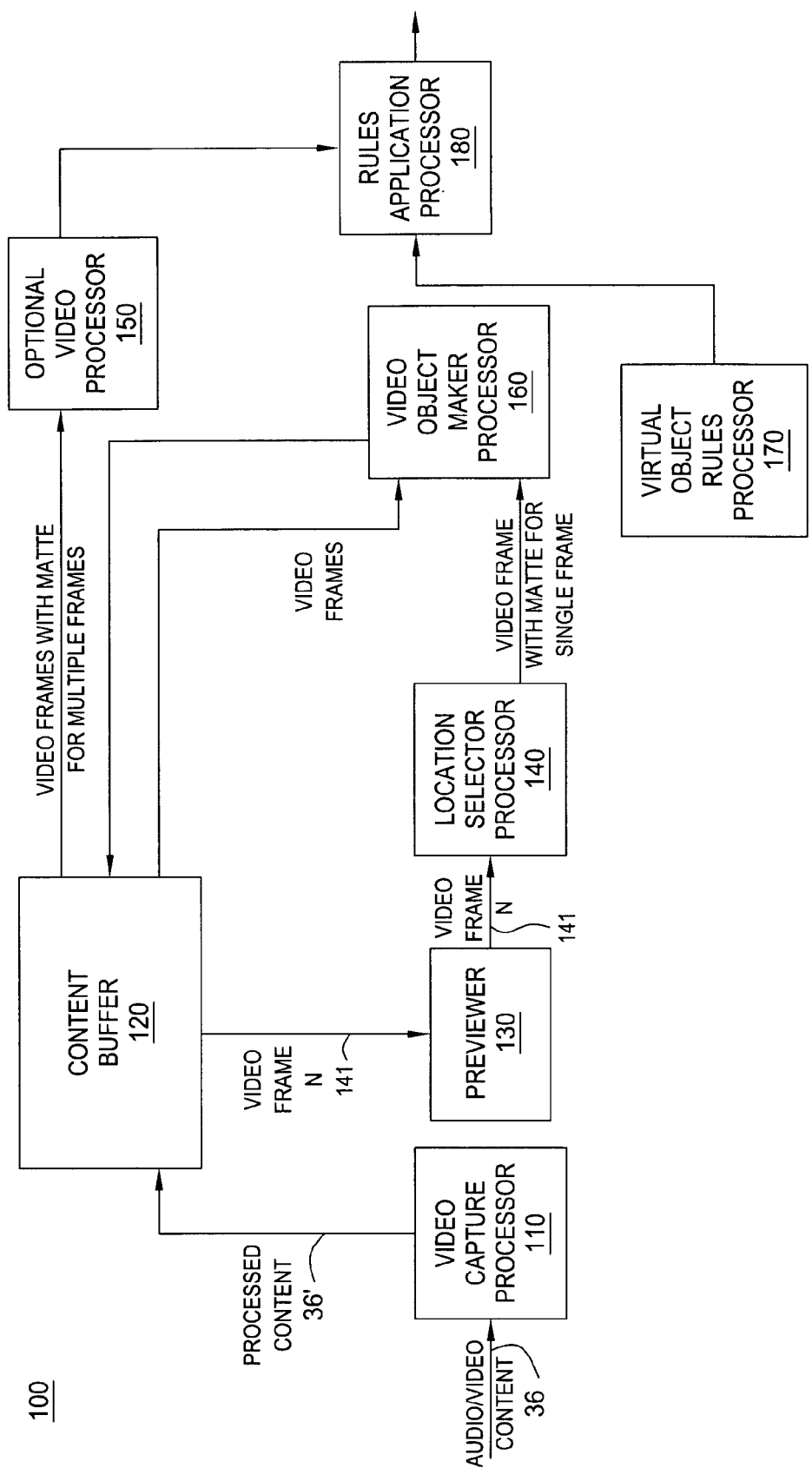
FIG. 6 depicts a virtual object definer.

FIG. 6 presents the virtual object location definer 100. A video capture processor 110 processes video and audio content 36 on a frame by frame basis, converting the original content 36 into a corresponding digitized representation. The processed content 36' is then stored in content buffer 120 for future access. A pre-viewer subsystem 130 allows for the viewing of a video frame of the processed content 36'. Frame N 141, for example, (shown in FIG. 7) associated with the processed content 36', may be retrieved from the content buffer 120, viewed, and passed to a location selector processor 140. The location selector processor 140 allows for the selection of where in the frame N 141 the virtual object 38 may be placed. When the frame N 141 is retrieved by the location selector processor 140, either a static area may be selected, or alternatively, a dynamic area, which is tied to an area within the frame of the processed content 36', may be selected. An overlay matte 16 (see FIG. 7) maybe used in the virtual object insertion process to identify where and how a virtual object location 37 is to be placed in the processed content 36'.

Techniques for pattern recognition used by the location selector processor 140 to facilitate the creation of the matte 16 and the identification of the pixels within the frame that the matte 16 is to be associated with for that frame are described in detail in U.S. Pat. No. 5,808,695, to Rosser, Roy J.; Das, Subhodev; and Tan, Yi; entitled Method of Tracking Scene Motion for Live Video Insertion; U.S. Pat. No. 5,903,317, to Sharir, Avi; and Tamir, Michael; entitled Apparatus and method for Detecting, Identifying, and Incorporating Advertisements in a Video; U.S. Pat. No. 5,524,065, to Yagasaki, Toshiaki; entitled Method and Apparatus for Pattern Recognition; U.S. Pat. No. 5,627,915, to Rosser, Roy J.; Das, Subhodev; and Tan, Yi; von Kaenel, Peter; entitled Pattern Recognition System Employing Unlike Templates to Detect Objects Having Distinctive Features in a Video Field; and U.S. Pat. No. 4,817,171, to Stentiford, Frederick; entitled Pattern Recognition System, the disclosures of which are hereby incorporated by reference.

Figure 7:
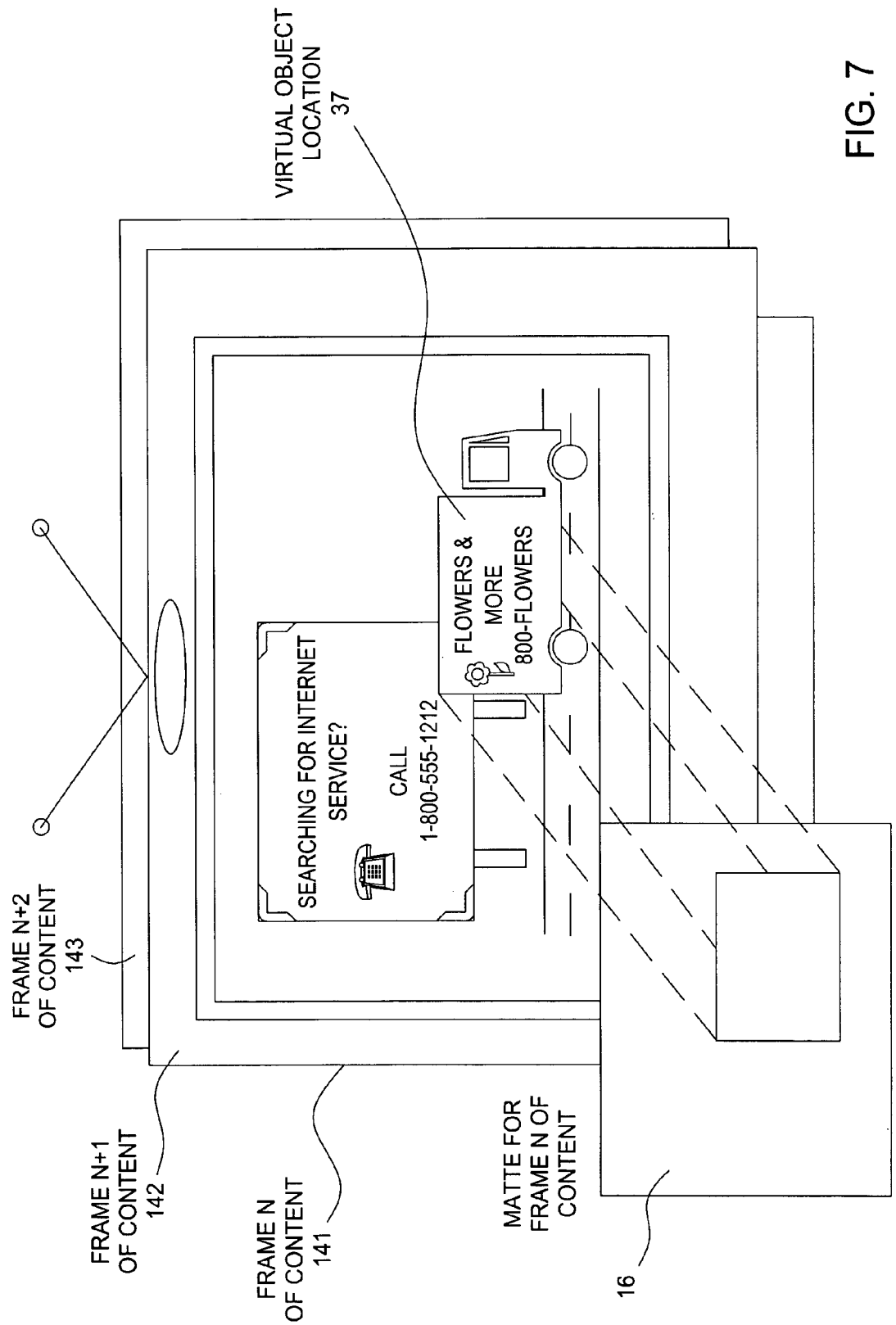
FIG. 7 is a pictorial representation of a virtual object location matte.

When the area is selected by the location selector processor 140 and the overlay matte 16 for the initial video frame N 141 is created, a video object marker processor 160 creates the transparent overlay matte 16 that is associated with the selected area for subsequent frames, for example frame N+1 142 and frame N+2 143 of the processed content 36', for the duration of frames designated, as shown in FIG. 7. This selected area defines the virtual object location 37. Pattern recognition technology may then be applied to each subsequent frame of the processed content 36' in the video object marker processor 160, creating a sequence of mattes to be applied to each frame of the processed content 36', moving and transforming as needed to match the temporal movement and transformations of the virtual object location 37 within the processed content 36' to which the virtual object 38 is to be tied. The pattern recognition technology handles transitions, cutaways, and cutbacks within the processed content 36', and any visual blocking or occlusions that may occur as other objects within the processed content 36' appear in front of the dynamic area selected for virtual object location 37.

Simultaneously with the selection of the virtual object location 37 and the creation of the mattes, a virtual object rules processor 170 allows for the entry of rules that govern the types of virtual objects and other relevant placement guidelines associated with the virtual object location 37. These rules allow for the selection of characteristics such as the duration of the virtual object location 37, and viewing overlay characteristics such as transparency of the overlay virtual object. The operations center 10 processes the stored, non-realtime processed content 36' and the real-time (live) processed content 36'. For real-time processed content 36', the content buffer 120 serves as a short buffer, and pre-defined rules are pre-loaded into the virtual object rules processor 170. Additionally, the video object marker processor 160 is pre-loaded with the directions as to which locations within the processed content 36' are to be treated as virtual object locations. The video object marker processor 160 then automatically searches the real-time processed content 36' using pattern recognition technologies presented above, or other technologies, and automatically creates the mattes required for each virtual object location. Once the video object marker processor 160 creates the mattes and the associated controls, the mattes are associated with the actual processed content 36' in the content buffer 120. The processed content 36', along with the mattes are then optionally processed using the optional video processor 150, which performs any necessary content encoding (e.g., MPEG4, or digitalization), and makes the content 36' available to a rules application processor 180. The rules application processor 180 creates metadata packets that carry the virtual object placement rules information and mattes and associates these packets with the processed content 36' for each virtual object location 37 selected in the virtual object location definer 100.

Figure 8:
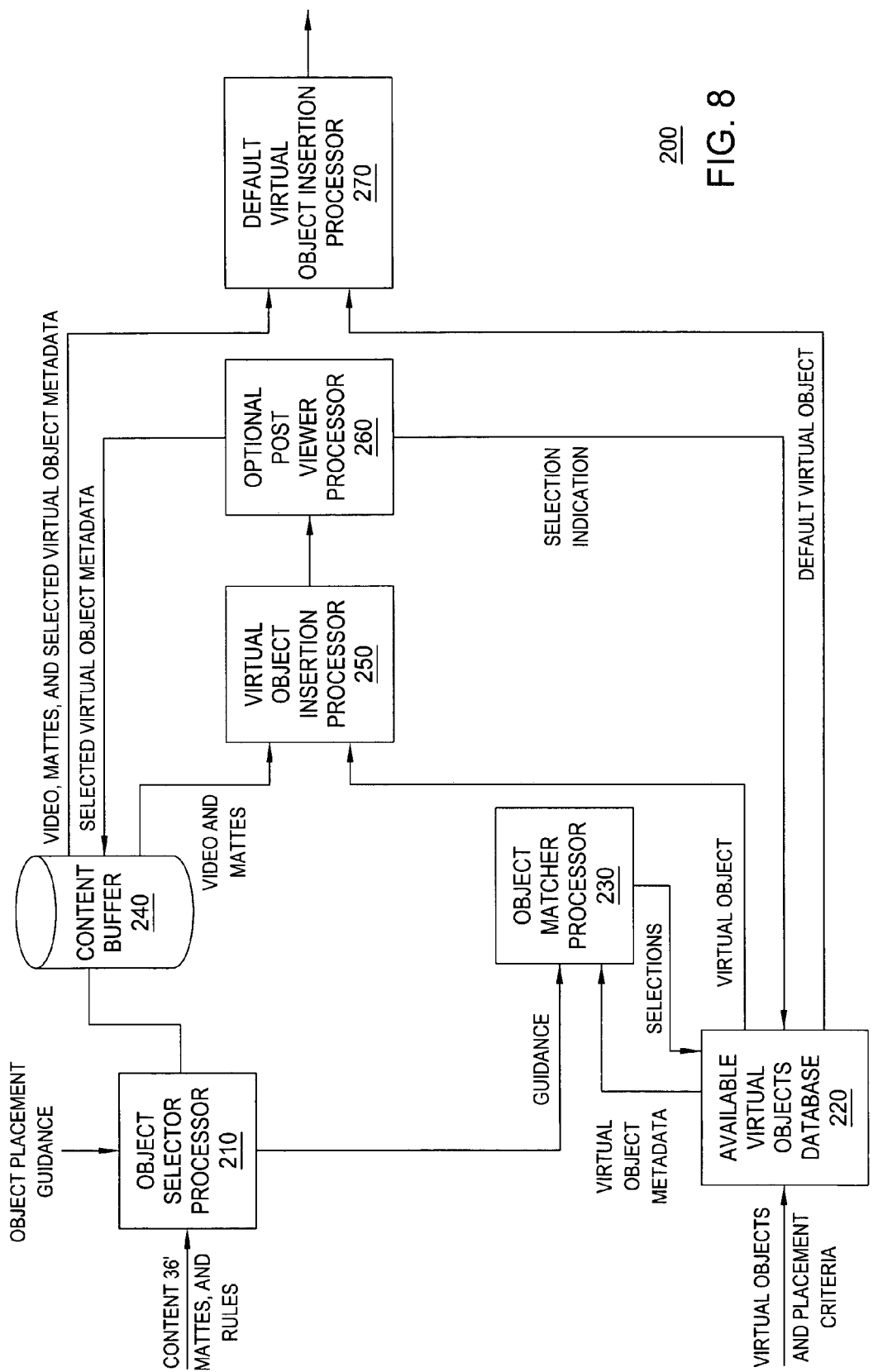
FIG. 8 depicts a virtual object selector.

FIG. 8 is a block diagram of the virtual object selector 200. Processed content 36', along with the metadata packets carrying the virtual object placement rules information associated with each virtual object location 37 and the mattes 16 are provided by the virtual object location definer 100 to the virtual object selector 200. An object selector processor 210 extracts the placement rules and stores the processed content 36' in a content buffer 240. Using the placement rules, along with any operator entered object placement guidance, the object selector processor 210 queries an object matcher processor 230 to initiate the selection of virtual objects that match the requisite rules. The object matcher processor 230 can be commanded by the object selector processor 210 to match a virtual object 38 in at least three manners: 1) automatically, 2) with manual placement, and 3) with pre-selected virtual objects. For automatic matching, the object matcher processor 230 searches an available virtual objects database 220 to find virtual objects that meet the placement rules provided by the object selector processor 210. The matching virtual objects are then marked in the available virtual objects database 220 as suitable for that virtual object location 37. For manual matching, the operator of the object matcher processor 230 manually selects the desired virtual objects to be associated with a virtual object location 37, and marks the selected virtual objects as suitable for the virtual object location 37 in the available virtual objects database 220. For pre-selected objects, the placement rules will indicate the pre-defined virtual objects to be associated with the processed content 36'. The object matcher processor 230 marks the pre-determined virtual objects in the available virtual objects database 220 as being associated the particular processed content 36' and virtual object location 37.

Virtual objects may be processed and stored in the available virtual objects database 220 before they are used. Processing of the virtual objects includes digitizing the virtual object 38 and associating the virtual object with those virtual object 38 placement guidelines and rules that must be followed to place the virtual object 38 within virtual object locations. The rules and guidelines may include product categories with which the virtual object 38 should be associated, or in contrast, cannot be associated with, the type of virtual object 38, the duration that the virtual object 38 is valid to be used, and the number of times the virtual object 38 may be used.

In a non-realtime environment, an optional post viewer processor 260, which is preceded by a virtual object insertion processor 250, is used to view the content 36 and insert each virtual object 38 that was matched to the content 36 by the object matcher processor 230 in the corresponding virtual object location 37. Techniques for insertion of overlaid virtual objects are described in detail in U.S. Pat. No. 4,319,266 to Bannister, Richard S.; entitled Chroma Keying System; U.S. Pat. No. 4,999,709 to Yamazaki, Hiroshi; and Okazaki, Sakae; entitled Apparatus for Inserting Title Pictures; U.S. Pat. No. 5,249,039, to Chaplin, Daniel J.; entitled Chroma Key Method and Apparatus; and U.S. Pat. No. 5,233,423 to Jernigan, Forest E.; and Bingham, Joseph; entitled Embedded Commercials within a Television Receiver using an Integrated Electronic Billboard, the disclosures of which are hereby incorporated by reference.

Techniques for the insertion of embedded virtual objects are described in detail in U.S. Pat. No. 5,953,076, to Astle, Brian; and Das, Subhodev; titled System and Method of Real Time Insertions into Video Using Adaptive Occlusion with a Synthetic Reference Image; U.S. Pat. No. 5,892,554, to DiCicco, Darrell; and Fant, Karl; entitled System and Method for Inserting Static and Dynamic Images into a Live Video Broadcast; U.S. Pat. No. 5,515,485, to Luquet, Andre; and Rebuffet, Michel; entitled Method and Device for Modifying a Zone in Successive Images; U.S. Pat. No. 5,903,317, to Sharir, Avi; and Tamir, Michael; entitled Apparatus and Method for Detecting, Identifying and Incorporation Advertisements in a Video; and the MPEG4 standard, the disclosure of which are hereby incorporated by reference.

In a realtime environment, the optional post viewer processor 260 is bypassed, and the default virtual object 38 is placed in the virtual object location 37 by a default virtual object insertion processor 270, which includes (not shown) a virtual object insertion processor 250.

Figure 9:
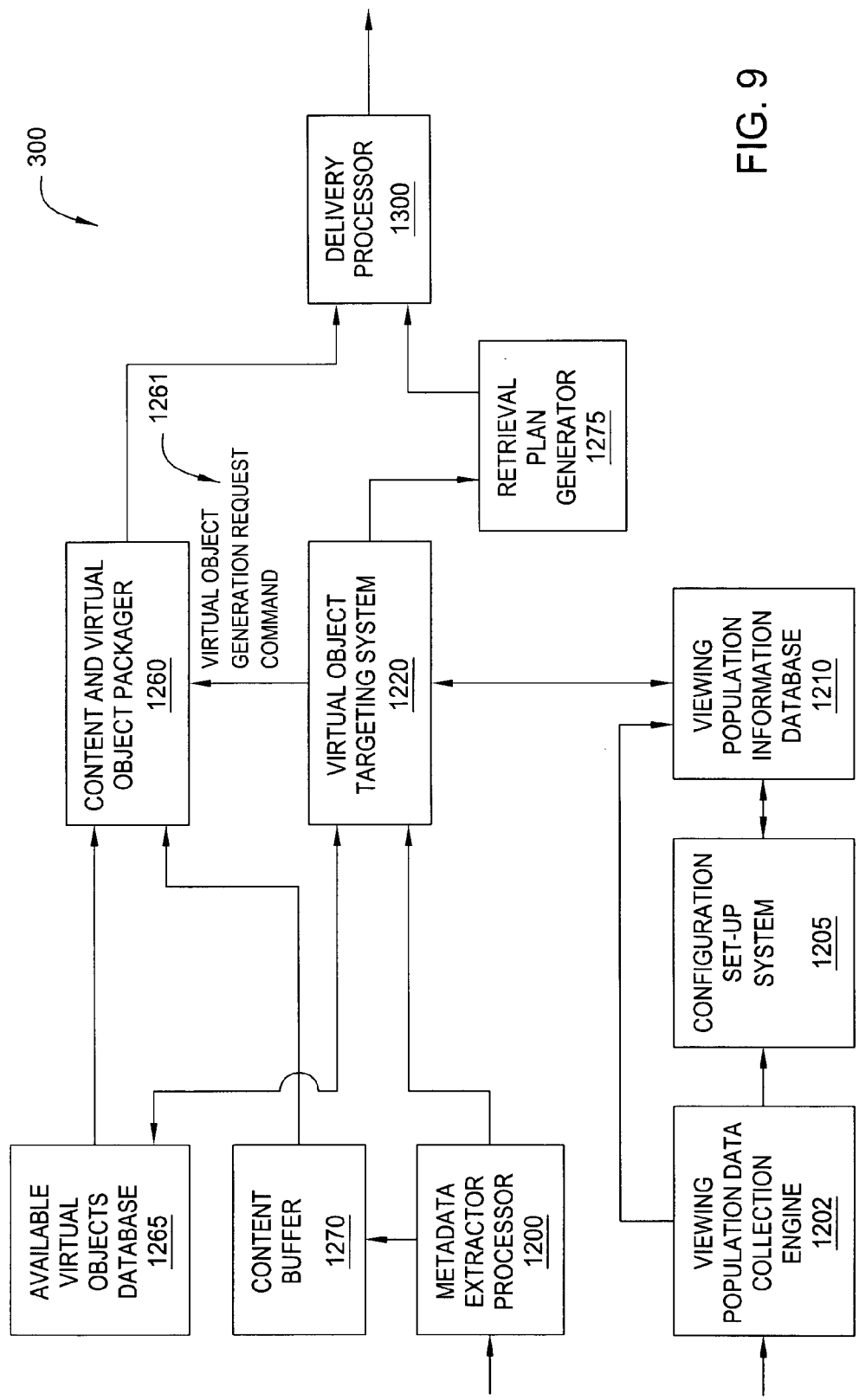
FIG. 9 depicts a targeted virtual object management system.

The targeted virtual object management system (TVOMS) 300 shown in FIG. 9 allows for virtual objects, including virtual object based advertisements, to be directed to groups of subscribers based on, for example, the use of subscriber data, programs watched data, past virtual objects viewing data, and/or mood indicators entered by the subscriber. Alternatively, input from subscribers collected through form-based on screen questionnaires maybe used to further define a subscriber's potential likes, wants, and needs and store this information at the reception site 30. Advertisers wanting to optimize their advertising expenditures may direct virtual objects to the appropriate viewing audiences to ensure that the desired audience views specific virtual objects. Advertisers can display specific virtual objects in content 36 that is being viewed by those subscribers most likely to be influenced to buy the advertised product, or otherwise respond in a desired fashion to the virtual objects.

Virtual objects may also be targeted to reception sites on various levels. At a highest level, virtual objects can be delivered to all reception sites viewing content 36, with no targeting of the virtual objects to the subscriber, but with the virtual objects displayed in the content 36 that are determined to be most relevant to the content 36. That is, the virtual objects are placed in the virtual object location 37 without the use of any group targeting. Alternatively, some level of targeting may occur based on, for example, ADI, zip code+4, geographical data and other similar criteria known by the reception site 30. In this alternative embodiment, the virtual objects are sent to a reception site, and a local insertion routine at the reception site 30 controls placement of the virtual objects into the virtual object locations 37 in the content 36. The virtual objects may be stored at the reception site 30 and may be periodically refreshed. To account for reception sites that do not have virtual objects available for insertion, the content may be provided with a default virtual object 38 embedded in the content 36. Upon receipt of the content at a reception site 30, the reception site 30, using the local insertion routine, determines if the default virtual object 38 should be replaced with another virtual object residing in the reception site's memory or being delivered concurrently with the content 36.

Alternatively, virtual objects may be targeted to groups of reception sites, with the groups of reception sites categorized based on some other common subscriber characteristics such as programs watched data, for example. Finally, virtual objects may also be targeted to specific subscribers that share the use of a reception site 30 based on their unique subscriber characteristics. Individual subscribers sharing the use of a reception site 30 may identify themselves when beginning to view content 36 at the reception site 30, resulting in the unique assignment of groups for the reception site 30 during that individual subscriber's use of the reception site 30.

The TVOMS 300 provides the management of information required to support each of the following: (1) delivery of targeted virtual objects along with content 36 being broadcast; (2) delivery of targeted virtual objects to reception sites independent of any content 36 being broadcast; and (3) delivery of TVOMS-related information including group assignment rules and retrieval plans to reception sites. The TVOMS 300 may be executed in software routines operating on a general purpose computer or a processor. The TVOMS 300 may also be executed, at least partly, in hardware. Finally, the TVOMS 300 may include various databases containing information to support targeting of virtual objects.

FIG. 9 shows the TVOMS 300 supporting the targeting of virtual objects to groups of subscribers. Broadcast information can be destined for the entire population of subscribers receiving the content 36, or groups of subscribers. Broadcast information can include actual content 36, metadata packets with virtual object insertion control information, virtual objects for placement within the content 36, and group assignment rules required by the subscriber's reception site 30 to configure the reception site 30 and retrieval plans to guide the reception site 30 in placing the appropriate virtual object 38 within the content 36. Broadcasting of this information may be supported over a variety of broadcast-capable communication systems, such as the Internet, cable television systems, terrestrial broadcast systems, satellite broadcast systems, and wireless communications systems, and other systems described below.

A viewing population information database 1210 in the TVOMS 300 contains viewing population information collected from numerous sources including marketing database services, from Arbitron or Nielsen program rating services, or subscriber surveys, for example. The viewing population information may be used by a virtual object targeting system 1220 to determine the best virtual objects to be distributed for inclusion in the content 36. The virtual object targeting system 1220 determines the optimum subset of virtual objects to be associated with the content 36 based on the selected object metadata provided by the virtual object selector 200 (FIG. 5) and viewing population information from the viewing population information database 1210. A content and virtual object packager 1260 is directed to retrieve the appropriate virtual objects from an available virtual objects database 1265. The content and virtual object packager 1260, then, along with the content 36 from a content buffer 1270, addresses the virtual objects with the appropriate group addressing information, and packages the virtual objects with the content 36. A delivery processor 1300 then delivers the combined package of virtual objects, content 36, and metadata to subscribers.

As an alternative to delivering virtual objects with associated content 36, virtual objects can be delivered independently to groups of subscribers as a result of modified group assignments or group assignment rules, or the need for refreshed virtual objects at reception sites. Initiation could be automatic based on a scheduled cycle or by TVOMS operator direction. Upon delivery initiation, the virtual object targeting system 1220 uses viewing information from the viewing population information database 1210, information about available virtual objects from the available virtual objects database 1265, and information about previously delivered virtual objects from the viewing population information database 1210, to select the appropriate virtual objects to be packaged and delivered to a group of reception sites. Once the virtual object targeting system 1220 determines the appropriate virtual objects, the content and virtual object packager 1260 retrieves the appropriate virtual objects, packages the virtual objects, addresses the information to a group or groups of reception sites, and delivers the information to the appropriate groups of reception sites using a delivery processor 1300. Virtual objects maybe broadcast to all reception sites, and a reception site 30 may store only the virtual objects that are associated with groups to which the reception site 30 belongs. Alternatively content 36, virtual objects, and other information destined to reception sites may be provided to the object delivery center 15 (FIG. 1) for delivery to reception sites.

The databases addressed in FIG. 9 may be configured to support a variety of information necessary for the TVOMS 300 to manage the targeting process. Below are tables that present typical data that may be tracked by these individual databases.

Viewing Population Information Database 1210

Criteria being captured by reception sites for targeting purposes
  Target categories and groups for each category
  Current group assignment rules
  Past group assignment rules
  Upcoming group assignment rules
  Estimated number of reception sites per zip+4 area
  Estimated number of reception site subscribers by:
  Sex
  Age
  Education
  Profession
  Household income
  ADI
  Past subscriber survey data or actual data presenting, by subscriber group type:
  TV program preferences
  Demographic information
  Past virtual object viewed data, time spent viewing
  Past products ordered, along with time, date, and method of order
  Past TV programs watched data, along with time and date
  Past PPV programs ordered data, along with time and date
  Nielsen and Arbitron program viewing statistics
  Generic subscriber profile information.
  for each category Available Virtual Objects Database 1265

Virtual object identifier with actual digital version of virtual (CR) object
  Display options (e.g., text, audio, graphics, video, link, HTML, XML, interactive)
  Static vs. dynamic virtual object indicator,
  If a linked virtual object, link table information
  Pricing subsidy information
  Run through completion status mode indication
  Date of valid use
  Virtual object placement controls, acceptable frequency
  Category and group preferences (as virtual object ranking percentages)

Within the TVOMS 300, the virtual object targeting system 1220 is responsible for the intelligent and rapid selection of virtual objects for placement in content 36. Category and group targeting is managed in a manner similar to that described in co-pending U.S. application Ser. No. 09/597,893, entitled METHOD AND APPARATUS FOR TARGETING VIRTUAL OBJECTS, filed Jun. 19, 2000, and in co-pending U.S. application Ser. No. 09/054,419 entitled TARGETED ADVERTISEMENT USING TELEVISION DELIVERY SYSTEM, filed Apr. 3, 1998, and in co-pending U.S. application Ser. No. 09/328,672 entitled ELECTRONIC BOOK SELECTION AND DELIVERY SYSTEM WITH TARGETED ADVERTISING, filed on Jun. 9, 1999, each of which are incorporated herein by reference.

Careful management of the virtual objects within the content 36, based on information known about the demographics and viewing habits of typical subscribers, for example, can greatly increase both the advertisers' likelihood of reaching an interested subscriber, and the likelihood a subscriber will be interested in a specific virtual object 38. Each virtual object location 37 within the content 36 is assigned a series of virtual objects by the TVOMS 300, and when multiple virtual objects are delivered for a given virtual object location 37 in the content 36, a retrieval plan is developed that directs which virtual objects should be displayed by a given group of subscribers or reception sites, or the entire subscriber population.

Figure 10:
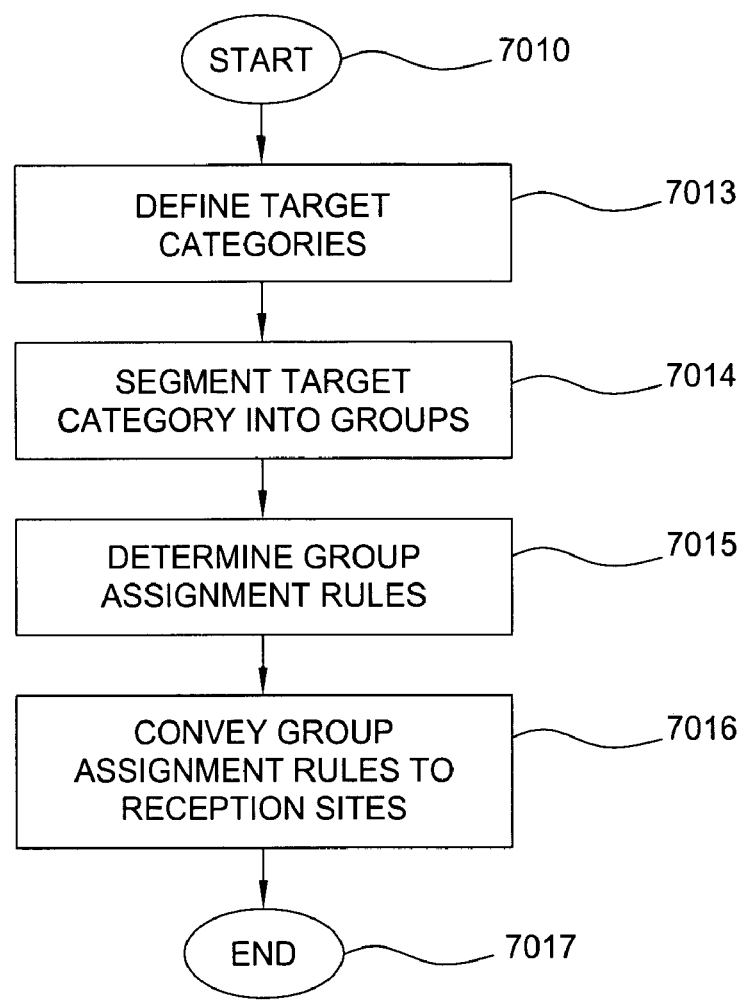
FIG. 10 shows configuration and set-up steps associated with targeting virtual objects.

The process of managing the targeted virtual objects may include a number of configuration and set-up steps shown in FIG. 10 that begins with the start step shown in block 7010 and ends with the end step shown in block 7017. First, a number of target categories are defined as shown in block 7013. Examples of target categories include demographic targeting (age/sex/income) and location, such as Area of Dominant Influence (ADI). Next, as shown in block 7014, each target category may be segmented into appropriate groups. For example, the ADI may include the groups Los Angeles, Calif. and Washington D.C. New target categories can be added and the groups included in the target category redefined after their initial establishment.

Next, as shown in block 7015, for each target category, group assignment rules are created that allow for reception sites to be assigned to a group for each target category based on the information collected at the reception site 30. The group assignment rules generation process is described in detail later. Group assignment rules are conveyed to all reception sites and are stored therein, as shown in block 7016. As groups are modified or group assignment rules change, the reception sites are provided with the changes. Additionally, the group assignment rules are periodically broadcast to ensure that newly added reception sites and those reception sites that have accidentally lost their information are up-to-date. As an alternative to, or in conjunction with conveying the group assignment rules, an initial set of group assignment rules may be provided with the reception site 30. For example, if the reception site 30 is a television set top terminal, the terminal may have embedded as a software routine, an initial set of group assignment rules. The group assignment rules may then be updated as needed.

Returning to FIG. 9, the virtual object targeting system 1220 determines the optimum types of virtual objects to be placed in the content 36 from the selected virtual objects provided by the virtual object selector 200 (FIG. 5). The virtual object targeting system 1220 takes into account groups of subscribers who will likely view the content 36, the desirability of providing available virtual objects to those groups of subscribers, target categories, the number of virtual objects locations available for the content 36, and the number of virtual objects available for assignment for a given virtual object location 37.

Once specific virtual objects are selected for one or more available virtual object locations, the groups that should view each virtual object 38 are determined, based on the target category of interest. For example, in target category ADI, and group Los Angeles, Calif., a virtual object related to a Los Angeles area professional basketball team may be considered appropriate as an advertisement for professional basketball while in the group Washington, D.C., a virtual object related to a Washington, D.C. professional basketball team might be considered appropriate. The selected virtual object locations 37 may include all virtual object locations, or a subset of all the virtual object locations. A retrieval plan is generated by the retrieval plan generator 1275 which provides information concerning which target category and group is assigned to each virtual object 38 associated with each virtual object location 37. The retrieval plan may provide information for one virtual object location 37 or multiple virtual object locations within content 36, where one or more virtual objects, target categories, and the groups to which each virtual object 38 is targeted within each virtual object location 37 is also provided in the retrieval plan. An example retrieval plan is provided in Table C below. Retrieval plans may be distributed along with the virtual objects and the associated content 36 directly to the reception sites by the delivery processor 1300 or using the object delivery center 15. Alternatively, a retrieval plan may be distributed by the delivery processor 1300 or using the object delivery center 15 independent of the associated content 36 or virtual objects.

After the reception site 30 receives and stores the virtual objects and the retrieval plan, the reception site 30 inserts those virtual objects into the appropriate virtual object locations in the content 36 based on the retrieval plan. The reception site 30 may retrieve and store only those virtual objects associated with that reception site's group assignment for that virtual object location 37. Alternatively, the reception site 30 may retrieve and store all virtual objects but only insert those virtual objects into virtual object locations as dictated by the retrieval plan.

When the virtual objects are displayed within the content 36, the reception site 30 will store virtual objects viewed data indicating that a virtual object 38 was shown. In an embodiment, the reception site 30 will store this virtual object viewed data only if the virtual objects are displayed for a predetermined time, or only if the subscriber takes an action to indicate the virtual object 38 has been viewed, such as by selecting an interactive virtual object 38, for example. Accumulated virtual objects viewed data may be used by a reception site 30 in conjunction with the group assignment rules.

The virtual object targeting system 1220 receives requests from the metadata extractor processor 200 to initiate the determination of virtual objects to be placed. The metadata extractor processor 1200 receives content 36 and associated virtual object information from the virtual object selector 200 (FIG. 5). The virtual object targeting system 1220 provides outputs to the content and virtual object packager 1260 and the retrieval plan generator 1275.

A part of the TVOMS 300 operation is the collection of viewing population data, and the assimilation of the viewing population data into the virtual objects selection method. This operation typically includes two steps. First, viewing population data is retrieved from various sources. The viewing population data is then compiled and sent to the viewing population data collection engine 1202 in the operations center 10. Once assembled, the data is filtered for each application of the TVOMS 300. In an embodiment, the viewing population information database 1210 receives inputs from the viewing population data collection engine 1202 and a configuration set-up system 1205. The viewing population information database 1210 provides outputs to the configuration set-up system 1205, and the virtual object targeting system 1220.

In addition to demographic information gathered, the viewing population information can be compiled using other methods. For instance, viewing population information can be gathered using questionnaires sent by mail to subscribers or collected over the telephone from subscribers and subsequently entered in the viewing population information database 1210. Subscriber preference information may be collected in surveys, including information such as sex, age, place of birth, place of lower school education, employment type, level of education, amount of television program viewing per week, and the number of television shows in particular categories that the subscriber watches in a given week such as, sports, movies, documentaries, sitcoms, amount of Internet use and favorite web sites, etc. Any demographic information that will assist the TVOMS 300 in targeting virtual objects may be collected. The viewing population data collection engine 1202 may gather marketing information from various sources and index the information for inclusion in the viewing population information database 1210.

Figure 11:
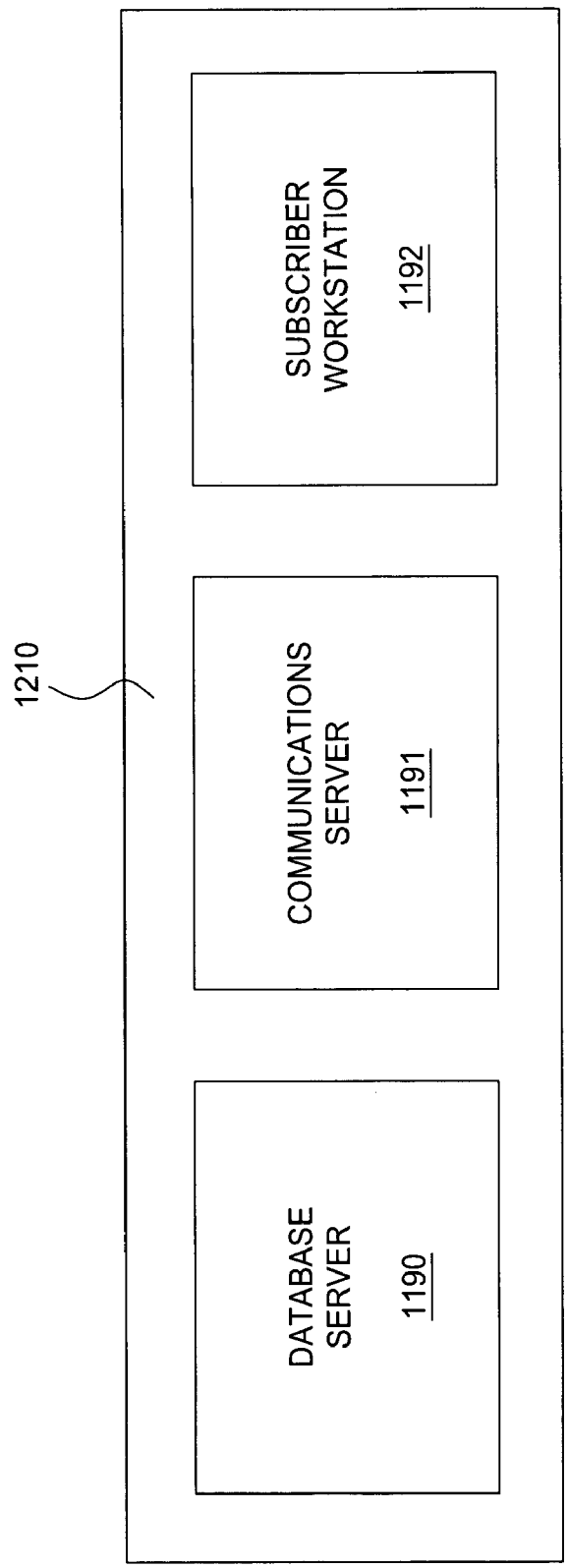
FIG. 11 shows a subscriber information database system.

To maintain the viewing population information database 1210 within the TVOMS 300, a database server 1190, communications server 1191, subscriber workstation 1192 or stations, or the suitable equivalents thereof, may be used, as depicted in FIG. 11. The database server 1190 supports saving database files, event logging, event scheduling, database server services, and database security access.

The communications server 1191 performs the following functions on database data: integrity check, filtering, processing, and uploading viewing population data from external sources using the viewing population data collection engine 1202. The workstation 1192 allows for operator viewing and entry of viewing population data into the viewing population information database 1210.

Figure 12:
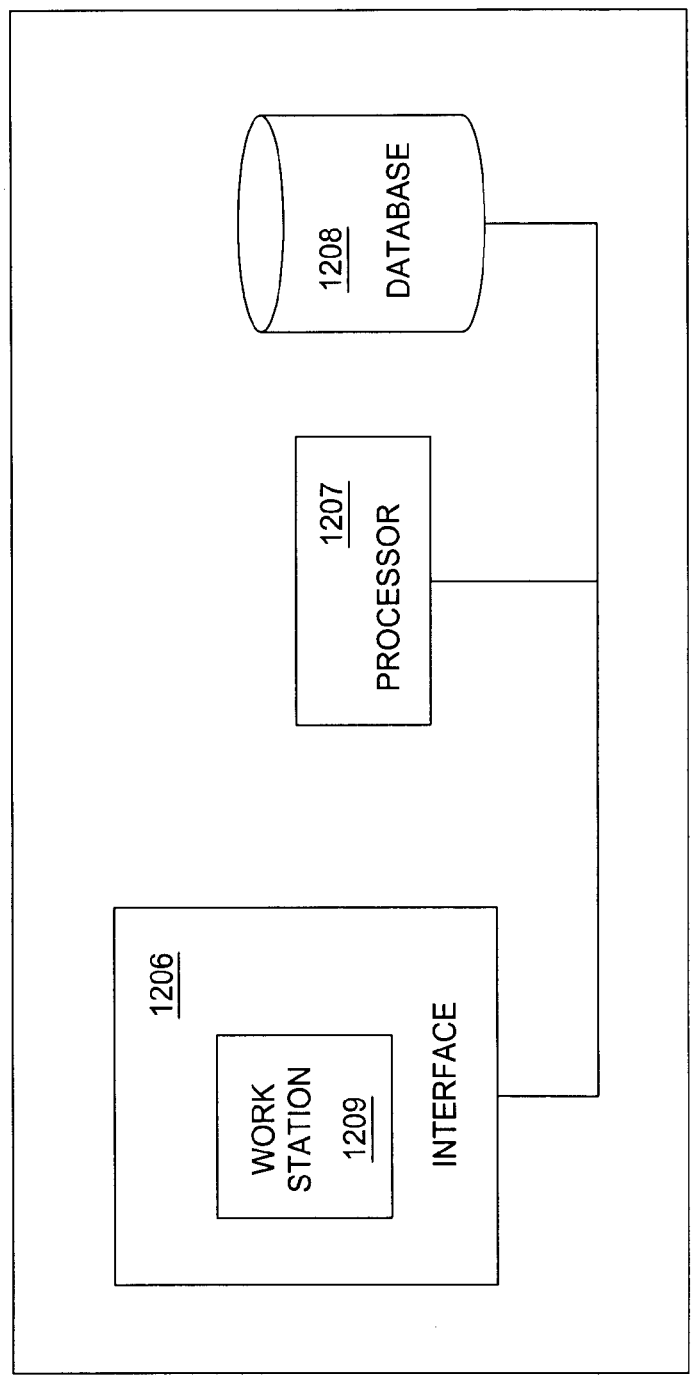
FIG. 12 shows a configuration set-up system.

FIG. 12 shows an example of the configuration set-up system 1205 in more detail. An interface 1206 receives viewing population information. The interface 1206 can include a workstation, such as the workstation 1209, for example, from which an operator manually enters viewing population information. Alternately, viewing population information can be automatically entered at the interface 1206 by downloading from an off-site database, the Internet, a storage medium, such as a CD-ROM or a floppy disk, or by collecting the information directly from the external sources using the viewing population data collection engine 1202. A processor 1207 processes the received viewing population information and organizes the information for use. For example, the processor 1207 may create a Category/Group Definition Matrix as presented in Table A and generate the group assignment rules that can be used to target virtual objects to groups of reception sites. The Category/Group Definition Matrix and group assignment rules will be described in more detail later. The Category/Group Definition Matrix and group assignment rules and organized viewing population information are then stored in a database 1208, and are periodically updated as viewing population information or group assignment rules, for example, change.

The information gathered by the configuration set-up system 1205 can come from a variety of sources including marketing databases, survey inputs from the subscribers, data collected by the viewing population data collection engine 1202, and other sources. The processor 1207 will assign category numbers to target categories. For example, the ADI could be assigned category 1 and household (HH) income could be assigned category 2. Next, the configuration set-up system 1205 creates a number of non-overlapping groups for each category. For example, ADI can be broken down into Seattle, Wash., Washington D.C., Denver Colo., Los Angles Calif., etc. Similarly, HH income can be broken down into a number of income groups such as no income, 20–40K, 40–60K, 60–120K, and over 120K. Then, the configuration set-up system 1205 assigns a "group mask representation" for each group within every category. The group mask representation may be simply a binary number that can be used to identify a particular group. Table A shows a completed Category/Group Definition matrix that could be used by the virtual object targeting system 1220 to assign targeted virtual objects to groups of reception sites.

TABLE A

Category/Group Definition Matrix

| Category Number | Category Name | Group Number | Group Definition | Group Mask Representation |
|---|---|---|---|---|
| 1 | ADI | 1 | Seattle, WA | 1000000000 |
|  |  | 2 | Washington, D.C. | 0100000000 |
|  |  | 3 | Denver, CO | 0010000000 |
|  |  | 4 | Los Angeles, CA | 0001000000 |
| 2 | HH income | 1 | No income | 1000000000 |
|  |  | 2 | 20–40 K | 0100000000 |
|  |  | 3 | 40–60 K | 0010000000 |
|  |  | 4 | 60–120 K | 0001000000 |
| 3 | Category x | 1 | Group a | 1000000000 |
|  |  | 2 | Group b | 0100000000 |
|  |  | 3 | Group c | 0010000000 |
|  |  | 4 | Group d | 0001000000 |
|  |  | 5 | Group e | 0000100000 |
|  |  | 6 | Group f | 0000010000 |

The processor 1207 also generates the group assignment rules for distribution to reception sites. The group assignment rules allow for the assignment of a group number to each reception site 30 for each target category based on information collected and stored at the reception site 30. The information used in conjunction with the group assignment rules is maintained in a subscriber database within the group assignment rules processor 735 at the reception site 30. Each reception site 30 populates its subscriber database through a variety of means, including subscriber input via a user interface at the reception site 30. Subscriber inputs may be driven by reception site prompts upon receipt of group assignment rules from the operations center 10 or other on-screen questionnaires generated by the reception site 30. The subscriber database may be populated automatically by the reception site 30 as events take place at the reception site such as programs are watched by the subscriber or selected for recording, virtual objects are viewed by the subscriber, PPV events are purchased, interactive virtual objects are selected, or based on Internet usage. Alternatively, upon installation of the reception site 30, an installer or the subscriber may complete an installation process that results in the subscriber database being populated. Additionally, the reception site 30 may contain, or interface to, a Global Positioning Satellite (GPS) receiver that may provide accurate reception site location information that is stored in the subscriber database for use in locality-based targeting. Subscriber database information may also come from external sources such as downloads from the Internet or, from the operations center 10 or local insertion center 20 using group assignment rules. Information contained in the subscriber database at the reception site 30 may include the following:

Reception system identification information
Reception site type
Date of system set-up
Household income
User data (for each registered subscriber), including:
Name
Sex
Age
Place of birth
Education
Profession
TV program preferences
Demographic information
Past virtual objects viewed data, number of times viewed, time spent viewing
Past products ordered, along with time, date, and method of order
Past billing information
Past TV programs watched data, along with time and date
Past PPV programs ordered data, along with time and date
Mood indicators entered at time of reception site turn on
Form-based questionnaire results from subscriber
Group assignments per subscriber for each target category
Past virtual objects delivered to subscriber, date of delivery, method of delivery
Zip+4 information
Household location or address
Number of subscribers in household
Responses to prompts from past group assignment rules interactions Group assignment rules can be distributed that manipulate the subscriber database for example by adding an additional field or additional fields to the subscriber database at reception sites. If the new field requires the subscriber to provide information and the reception site 30 is capable of prompting the subscriber and the subscriber is willing to provide the information, the reception site 30 will prompt the subscriber to enter the necessary information required for the newly added field or fields of data. If the new field or fields require the reception site 30 to begin automatically tracking new information to populate the field, the group assignment rule processor 735 will begin to collect the requisite information at the reception site and store the information in the subscriber database at the reception site 30.

Group assignment rules may also be used to place values in a subscriber database field or subscriber database fields based on the contents of another subscriber database field or other subscriber database fields.

Group assignment rules may also be used to assign a reception site to a group within a target category based on the value of a subscriber database field or combination of subscriber database fields.

What follows below is an embodiment of the group assignment rules used to associate reception sites to groups for target category X using as an example the Category/Group Definition Matrix presented in Table A. As an example, a group assignment rule may be created and distributed that results in the subscriber database being configured to track the sex of the subscriber (male or female) and the profession of the subscriber (doctor, lawyer, construction worker, college professor, teacher, or other). The delivery of this group assignment rule information may result in the subscriber at the reception site 30 being prompted to respond via an onscreen menu as to the subscriber's sex and profession. If this information is already stored in the subscriber database as a result of prior interactions, no prompt of the subscriber would be initiated by the reception site 30. Alternatively, a group assignment rule may be created and distributed that uses information automatically collected at the reception site 30, such as programs watched information, to impute a sex and profession for a reception site 30 based on the distributed group assignment rules. For example, research may indicate that women are more likely to watch professional billiards, so a group assignment rule can be created and distributed that dictates that if a reception site 30 has viewed any professional billiards, then the sex of the subscriber can be set to "female". Similarly, if research indicated that only doctors tend to select interactive virtual objects regarding toothpaste coupons, a group assignment rule can be created and distributed that dictates that if a reception site 30 has selected any interactive virtual objects for toothpaste coupons, then the profession of the subscriber can be set to "doctor." Group assignment rules can be created that then assign, for each group in a target category, the specific characteristics of a subscriber that are necessary for a reception site 30 to be assigned to each group. For target category X of Table A, as an example, group assignment rules can be created and distributed that specifically assign male doctors and male lawyers to Group B, female doctors and female lawyers to Group C, male construction workers to Group D, female construction workers to Group E, teachers and college professors to Group F, and anyone else to Group A. Table B below presents an example of the group assignment rules that would result in this assignment of reception sites to groups.

As can be seen from this example, group assignment rules can be created to flexibly manage the subscriber databases within reception sites remotely, while maintaining the privacy and security of the actual data at the reception site 30. For example, a group assignment rule may be based on how many times a certain virtual object 38 or several related virtual objects have been viewed at the reception site 30, allowing for the next in the sequence of virtual objects to be displayed at the reception site 30 once a requisite number of viewings of subsequent virtual objects have been achieved.

TABLE B

Example Group Assignment Rules

| Condition (IF) | Action (THEN) | Otherwise (ELSE) |
|---|---|---|
| If "Sex field in subscriber database" = "Male" AND "profession field in subscriber database" = "Doctor" OR "Lawyer | Then assign reception site to Group B for Target Category 3 | Else, go to the next rule |
| If "Sex field in subscriber database" = "Female" AND "profession field in subscriber database" = Doctor" OR "Lawyer" | Then assign reception site to Group C for Target Category 3 | Else, go to the next rule |
| If "Sex field in subscriber database" = "Male" AND "profession field in subscriber database" = "construction worker" | Then assign reception site to Group D for Target Category 3 | Else, go to the next rule |
| If "Sex field in subscriber database" = "Female" AND "profession field in subscriber database" = "construction worker" | Then assign reception site to Group E for Target Category 3 | Else, go to the next rule |

TABLE B-continued

Example Group Assignment Rules

| Condition (IF) | Action (THEN) | Otherwise (ELSE) |
|---|---|---|
| "If "profession field in subscriber database" = "teacher" OR "college professor" | Then assign reception site to Group F for Target Category 3 | Else, go to the next rule |
| | Then assign reception site to Group A for Target Category 3 | End |

Figure 13:
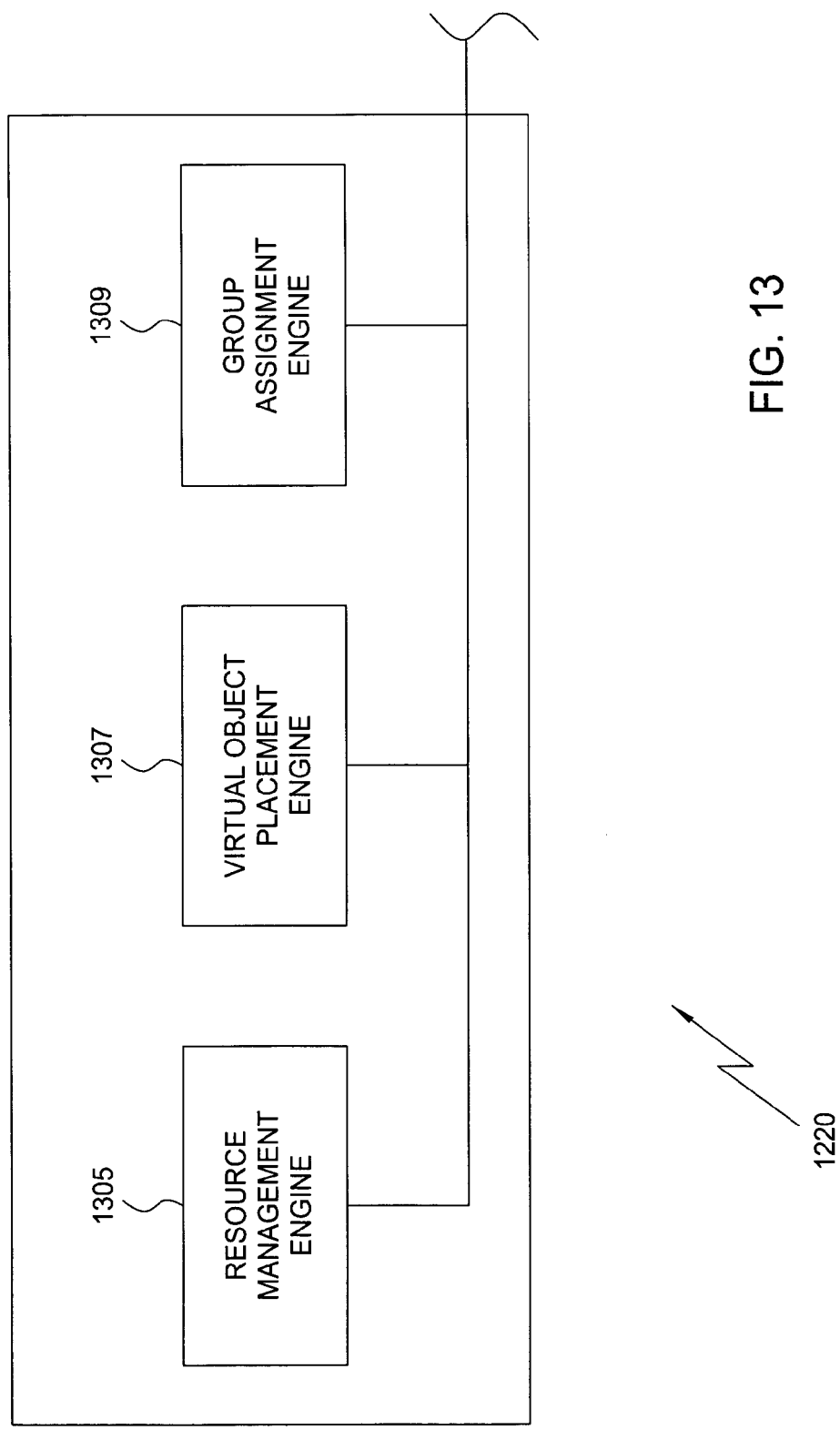
FIG. 13 shows a virtual object targeting system.

FIG. 13 shows an embodiment of the virtual object targeting system 1220 in more detail. A resource management engine 1305 uses information from a metadata extractor processor 1200 and an available virtual object database 1265 (see FIG. 9) to determine the number of virtual objects to be assigned to a given virtual object location 37. A virtual object placement engine 1307 decides which virtual objects to place in virtual object locations in the content 36. A group assignment engine 1309 determines which groups will view specific virtual objects. The virtual object placement engine 1307 receives information from the resource management engine 1305 related to the number of virtual objects available, how many virtual objects are to be provided for a given virtual object location 37, and the actual type of virtual objects available.

The resource management engine 1305 functions to divide available delivery bandwidth among multiple virtual objects for a given virtual object location 37 in the content 36. Because there may be a limited amount of resources on the delivery network 11 to deliver virtual objects with the content 36, the resource management engine 1305 may assign the available bandwidth optimally for the virtual objects associated with the individual virtual object locations within the content 36 being delivered over the communication channels. Some virtual object locations may be assigned multiple virtual objects, each targeted to a different group or groups, whereas other virtual object locations may be assigned only a single virtual object 38.

Referring to Table A, four group numbers (i.e., 1–4) are shown for the category of targeted virtual objects, ADI. For a particular virtual object location 37 in the content 36, the four groups can be divided into two, one for each available virtual object 38 of two total, with groups 1 and 2 receiving virtual object A and groups 3 and 4 receiving virtual object B, as shown for virtual object location 1. A retrieval plan for this later example is shown in Table C.

TABLE C

Retrieval Plan

| Virtual Object Location | Target Category | Virtual Object To Retrieve | Groups Assigned to Specific Virtual Object | Group Mask Assignment |
|---|---|---|---|---|
| Virtual Object Location 1 | ADI | Virtual Object A | 1, 2 | 11000000000 |
| | | Virtual Object B | 3, 4 | 00110000000 |
| Virtual Object Location 2 | HH Income | Virtual Object A | 1, 2, 3 | 11100000000 |
| | | Virtual Object B | 4 | 00010000000 |
| Virtual Object Location 3 | Category x | Virtual Object A | 1, 2 | 11000000000 |
| | | Virtual Object B | 3 | 00100000000 |
| | | Virtual Object C | 4 | 00010000000 |

TABLE C-continued

Retrieval Plan

| Virtual Object Location | Target Category | Virtual Object To Retrieve | Groups Assigned to Specific Virtual Object | Group Mask Assignment |
| --- | --- | --- | --- | --- |
| | | Virtual Object D | 5 | 00001000000 |
| | | Virtual Object E | 6 | 00000100000 |
| Virtual Object Location 4 | All | Virtual Object A | All | 11111111111 |

After determining how many virtual objects will be needed for each virtual object location 37 within the content 36, the resource management engine 1305 may also account for the type of available targeted virtual objects for display and the variety of subscribers (according to group assignment numbers) who may be viewing the content 36. An advertiser or content provider may provide this information when forwarding virtual objects for insertion. In an embodiment, the virtual object placement engine 1307 determines which specific virtual objects are to be placed in each available virtual object location 37 within the content 36. The virtual object placement engine 1307 first receives the list of selected available virtual objects from the metadata extractor processor 1200 (FIG. 9). In cooperation with the resource management engine 1305, the virtual object placement engine 1307 then determines which of the available virtual objects should be placed in each virtual object location 37 within the content 36. For example, if the preferred target category for virtual object location 1 is ADI, the virtual object placement engine 1307 will select one or more targeted virtual objects determined by the metadata extractor processor 1200 to place in that virtual object location 37. If the demographic or other data assembled by the configuration set-up system 1205 indicates that more than one targeted virtual object 38 should be placed, depending on the ADI, then the virtual object placement engine 1307 will select the appropriate number of targeted virtual objects, and will assign each targeted virtual object 38 to the specific virtual object location 37. The operation of the virtual object placement engine 1307 to assign the targeted virtual objects will be described in more detail later.

In an embodiment, the group assignment engine 1309 receives inputs from the resource management engine 1305 and the virtual object placement engine 1307 and then determines which target category groups will view specific targeted virtual objects. Thus, for each virtual object location 37, the group assignment engine 1309 assigns groups of reception sites to each of the virtual objects. The reception sites may be assigned based on their placement within a group (i.e., based on their group assignment number) as defined by the group assignment rules received from the operations center 10. In table C, the assignments are shown based on the group assignment numbers. As also shown in Table C, the group addressing for a virtual object location 37 may be based on a single category of targeting. This may avoid a conflict regarding which virtual object 38 a reception site 30 may retrieve.

The group assignment engine 1309 provides an output to the retrieval plan generator 1275. The output indicates which group assignment numbers (i.e., which groups of reception sites) are assigned to a virtual object 38 for a given virtual object location 37 in the content 36. The retrieval plan generator 1275 then generates a bit word, or group mask assignment, that is used to assign the groups to virtual objects. Once generated, the retrieval plan is provided to the delivery processor 1300 for distribution along with the content 36 and the actual virtual objects to reception sites by object delivery center 15.

In an embodiment, the virtual object targeting system 1220 provides a virtual object generation request command 1261 to the content and virtual object packager 1260. The virtual objects generation request command 1261 specifies which particular virtual objects are to be displayed in a particular virtual object location 37, and the actual location of the virtual objects. The virtual object 38 is then retrieved from the available virtual object database 1265. The virtual objects, along with the retrieval plan, and content 36 and associated metadata packets are provided to the delivery processor 1300 for delivery to the appropriate reception sites.

When a reception site 30 receives the content 36 that contains targeted virtual objects, software instructions operating on the reception site 30 analyze the contents of the retrieval plan. Then, based on the groups assigned for each virtual object 38, the reception site 30 retrieves those virtual objects that match its own group assignments for the target category being used for the virtual object location 37. The reception site 30 then associates those virtual objects retrieved with the appropriate virtual object location 37 where the virtual object 38 will be placed, so that when the content 36 is viewed, the virtual object 38 assigned to that virtual object location 37 is displayed.

Figure 14:
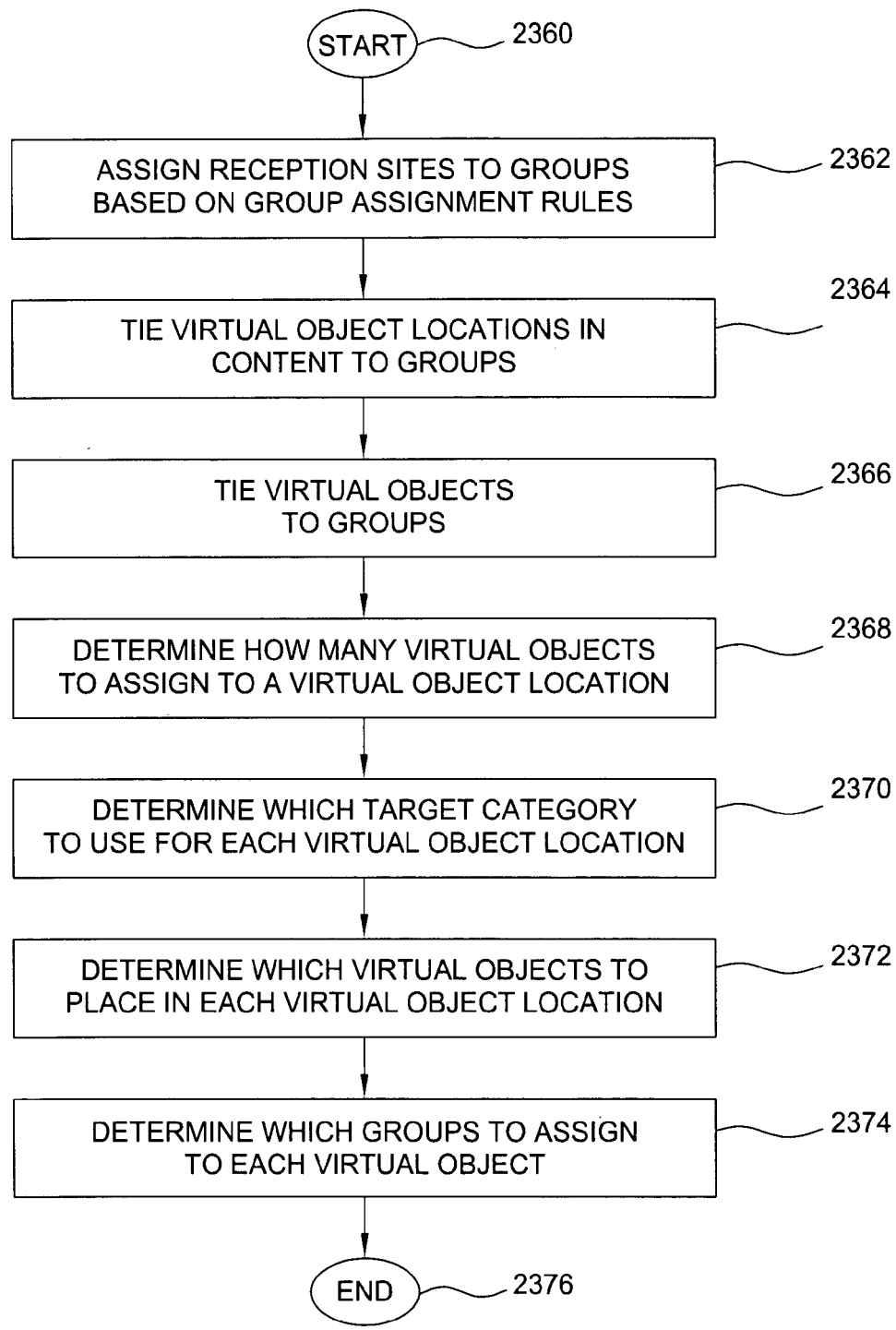
FIG. 14 presents an embodiment of the overall process for assigning targeted virtual objects.

An embodiment of the process for assigning targeted virtual objects using the virtual object placement engine 1307 is presented in FIG. 14. The process begins with block 2360. In block 2362, the reception sites are assigned to groups based on distributed group assignment rules. In block 2364, the virtual object placement engine 1307 ties or relates virtual object locations in content 36 to the groups. In block 2366, the virtual object placement engine 1307 ties or relates virtual objects to groups. In block 2368, the virtual object placement engine 1307 determines how many virtual objects to assign to a virtual object location 37. In block 2370, the virtual object placement engine 1307 determines which target category to use for one or more virtual object locations 37. In block 2372, the virtual object placement engine 1307 determines specific virtual objects to be placed in the virtual object locations 37. In block 2374, the virtual object placement engine 1307 determines which groups to assign to the virtual objects 38 for the selected virtual object locations 37. The process ends with block 2376.

As discussed above, virtual object targeting uses target categories and groups within each target category to tie or relate three entities together: 1) the reception site 30; 2) virtual objects; and 3) virtual object locations in content 36. In one embodiment of block 2362 in FIG. 14, the reception sites are assigned to groups for each target category by the configuration set-up system 1205 using the distribution of group assignment rules on which each reception site 30 assigns itself to a group for each target category.

In one embodiment of block 2364 in FIG. 14, virtual object locations in content 36 are tied or related to groups as described below. For each virtual object location 37, a group breakdown percentage can be defined for each group that represents the likely compatibility of the content 36 surrounding that virtual object location 37 with each group. Breakdown percentages for each virtual object location 37 are defined within the virtual object selector 200 (see FIG. 8) and passed to the TVOMS 300. Table D shows a sample breakdown of these group breakdown percentages for five example virtual object locations for three example target categories.

programmer, or content provider responsible for the virtual objects and may reside in the available virtual objects database 1265. Information resident in the viewing population information database 1210 maybe used to assign virtual object ranking percentages. Table E shows a sample assignment of virtual object ranking percentages for eight sample virtual objects using the same target categories and group numbers as in Table D. Not all virtual objects may be assigned to groups for a target category if an advertiser or programmer does not wish its virtual objects to be targeted in the manner required by that target category. For example, an advertiser or programmer may want the same virtual object to be displayed at all reception sites 30, regardless of subscriber group information or characteristics.

TABLE D

Virtual Object Location Group Breakdown Percentages

| Virtual object location | Target Category | Group 1 | Group 2 | Group 3 | Group 4 | Group 5 | Group 6 |
|---|---|---|---|---|---|---|---|
| Virtual object location 1 | 1 | 25 | 25 | 25 | 25 | N/A | N/A |
| " | 2 | 30 | 10 | 20 | 40 | N/A | N/A |
| " | 3 | 10 | 20 | 30 | 40 | N/A | N/A |
| Virtual object location 2 | 1 | 10 | 20 | 30 | 40 | N/A | N/A |
| " | 2 | 25 | 25 | 25 | 25 | N/A | N/A |
| " | 3 | 10 | 15 | 25 | 25 | 15 | 10 |
| Virtual object location 3 | 1 | 40 | 30 | 20 | 10 | N/A | N/A |
| " | 2 | 80 | 10 | 5 | 5 | N/A | N/A |
| " | 3 | 25 | 25 | 10 | 10 | 15 | 25 |
| Virtual object location 4 | 1 | 50 | 0 | 50 | 0 | N/A | N/A |
| " | 2 | 0 | 40 | 40 | 20 | N/A | N/A |
| " | 3 | 10 | 10 | 25 | 25 | 15 | 15 |
| Virtual object location 5 | 1 | 20 | 30 | 30 | 20 | N/A | N/A |
| " | 2 | 30 | 30 | 10 | 30 | 10 | 10 |
| " | 3 | 10 | 30 | 10 | 30 | 10 | 10 |

The group breakdown percentage data may be derived from information resident in the viewing population information database 1210 or a number of sources including surveys, and program ratings services such as Nielsen or Arbitron, for example. In this example, the group assignment numbers are the same as those presented in Table A. Thus, target categories 1 and 2 each have four groups associated with them, and target category 3 has six groups associated with it. For virtual object location 1, the target category 1 refers to ADI and under group 1, a group breakdown percentage of 25 percent is assigned for group 1 from the target category ADI since 25 percent of the subscribers reside in the Seattle, Wash. ADI. The group breakdown percentages for each target category for each virtual object location 37 may sum to 100 percent.

In an embodiment of the subroutine represented by block 2366 of FIG. 14, virtual objects may be ranked according to their potential revenue generation for each group within one and up to all possible target categories, again using percentages. This information may be provided by an advertiser, Referring to Table E, the data indicates that for virtual object 1, and target category 1 (ADI), the advertiser believes that virtual object 1 is appropriate for the subscribers in groups 1 and 2 and is not appropriate for the subscribers in groups 3 and 4. The advertiser also believes that virtual object 1 is equally appropriate for both the group 1 and the group 2 subscribers. However, if the group 1 subscribers are determined to be more likely to respond to virtual object 1 than the group 2 subscribers, then group 1 could be given a higher percentage than group 2. Table E also shows that virtual object 1 is not applicable to groups 5 and 6 because only four groups are defined for the target category ADI. Thus, all the reception sites will be grouped into one of groups 1 through 4.

Using this paradigm, virtual objects can be targeted using at least two methods. The first is a designated multi-virtual object campaign where specific unique sets of groups are assigned for each virtual object 38 of the campaign. In the second method, each virtual object 38 provided by an advertiser is independently associated with groups. Virtual objects from several different advertisers are then used together to optimize use of virtual object locations.

TABLE E

Virtual Object Ranking Percentages

| Virtual Object | Target Category | Group 1 | Group 2 | Group 3 | Group 4 | Group 5 | Group 6 |
|---|---|---|---|---|---|---|---|
| Virtual object 1 | 1 | 50 | 50 | 0 | 0 | N/A | N/A |
| " | 2 | 30 | 10 | 20 | 40 | N/A | N/A |
| " | 3 | 0 | 0 | 0 | 0 | 0 | 0 |
| Virtual object 2 | 1 | 0 | 0 | 50 | 50 | N/A | N/A |
| " | 2 | 0 | 0 | 0 | 0 | N/A | N/A |
| " | 3 | 0 | 0 | 0 | 0 | 0 | 0 |
| Virtual object 3 | 1 | 0 | 0 | 0 | 0 | N/A | N/A |
| " | 2 | 25 | 25 | 25 | 25 | N/A | N/A |
| " | 3 | 0 | 0 | 0 | 0 | 0 | 0 |
| Virtual object 4 | 1 | 50 | 0 | 50 | 0 | N/A | N/A |
| " | 2 | 0 | 40 | 40 | 20 | N/A | N/A |
| " | 3 | 10 | 30 | 10 | 30 | 10 | 10 |
| Virtual object 5 | 1 | 40 | 20 | 20 | 40 | N/A | N/A |
| " | 2 | 10 | 30 | 30 | 30 | N/A | N/A |
| " | 3 | 30 | 30 | 30 | 5 | 5 | 0 |
| Virtual object 6 | 1 | 0 | 0 | 0 | 0 | N/A | N/A |
| " | 2 | 0 | 0 | 0 | 0 | N/A | N/A |
| " | 3 | 10 | 10 | 10 | 10 | 30 | 30 |
| Virtual object 7 | 1 | 20 | 40 | 40 | 20 | N/A | N/A |
| " | 2 | 25 | 25 | 25 | 25 | N/A | N/A |
| " | 3 | 0 | 30 | 20 | 30 | 0 | 20 |
| Virtual object 8 | 1 | 30 | 40 | 0 | 30 | N/A | N/A |
| " | 2 | 30 | 30 | 10 | 30 | N/A | N/A |
| " | 3 | 20 | 0 | 20 | 20 | 20 | 20 |

As depicted in FIG. 14, blocks 2368, 2370, 2372, and 2374, the virtual object placement engine 1307 determines: 1) how many virtual objects are assigned to which virtual object location; 2) which target category is used for which virtual object location; 3) which virtual objects to place in each virtual objects location; and 4) which groups are assigned to which virtual objects, respectively. To limit the need for excessive distribution bandwidth to distribute virtual objects to reception sites, the algorithm in the virtual object placement engine 1307 that assigns targeted virtual objects to the virtual objects assumes that there is a total number of virtual objects available [TOTAL_VIRTUAL OBJECTS] for a segment of content 36 (across all virtual object locations), and assumes that no more than some maximum number of the virtual objects can be or are desired to be assigned to a given virtual object location 37. This amount is denoted as [MAX_VIRTUAL OBJECTS].

Figure 15:
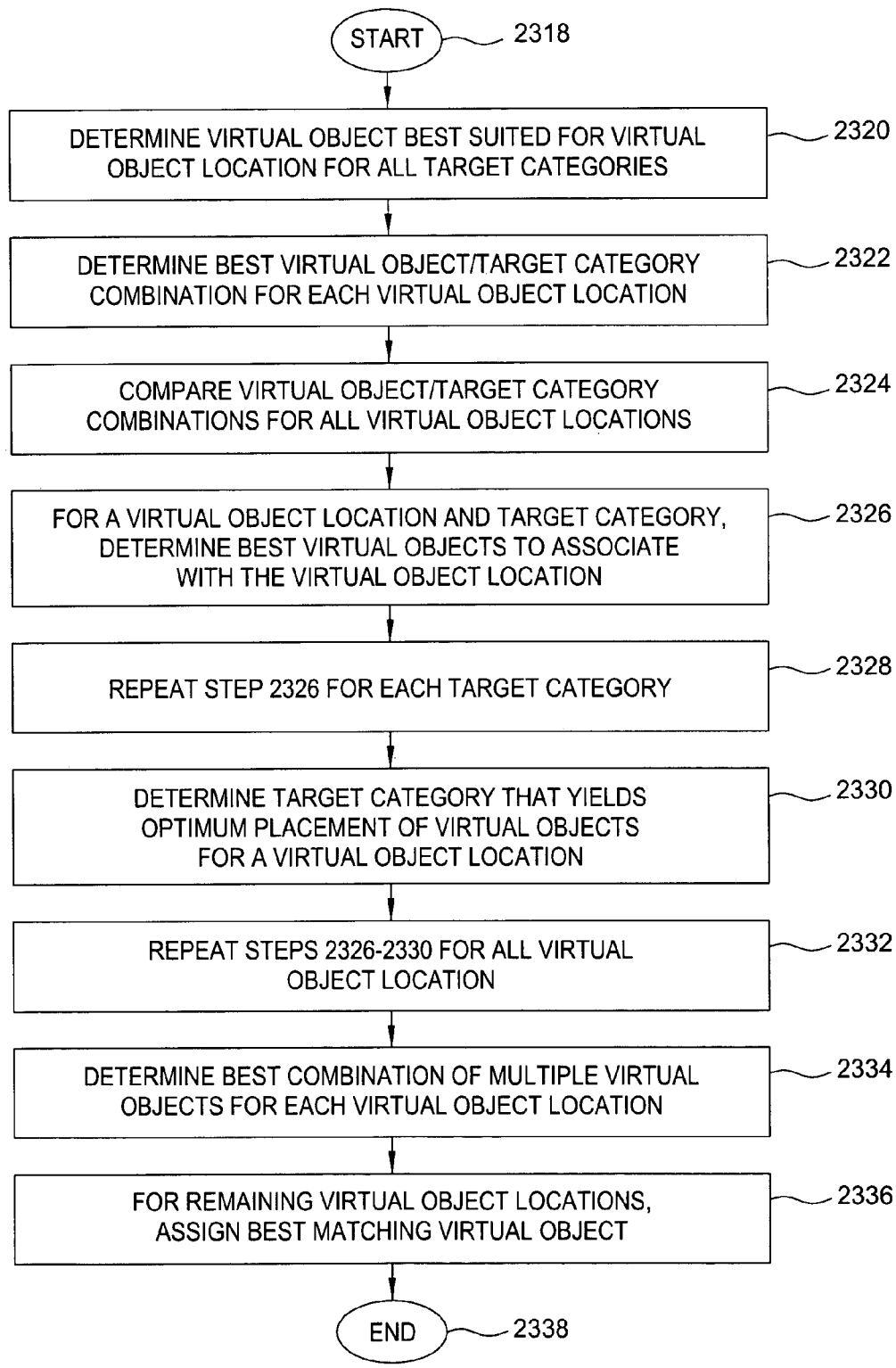
FIG. 15 presents an embodiment of a process used by the virtual object placement engine to assign virtual objects to virtual object locations.

FIG. 15 presents an embodiment of a process used by the virtual object placement engine 1307 to execute the functions listed in blocks 2368, 2370, 2372, and 2374 depicted in FIG. 14. The process begins with the start ellipse, 2318. In block 2320, the virtual object placement engine 1307 determines the virtual object 38 best suited for each virtual object location 37 for all target categories. In block 2322, the virtual object placement engine 1307 determines the best virtual object/target category combination for each virtual object location 37. In block 2324, the virtual object placement engine 1307 compares virtual object/target category combinations for all virtual object locations. In block 2326, the virtual object placement engine 1307, for a virtual object location 37 and target category, determines the best virtual objects to associate with the virtual object location 37. In block 2328, the virtual object placement engine 1307 repeats block 2326 for each target category. In block 2330, the virtual object placement engine 1307 determines the target category that yields the optimum placement of virtual objects for a virtual object location 37. In block 2332, the virtual object placement engine 1307 repeats blocks 2326, 2328, and 2330 for all virtual object locations. In block 2334, the virtual object placement engine 1307 determines the best combination of multiple virtual objects for each virtual object location 37. In block 2336, for the remaining virtual object locations, the virtual object placement engine 1307 assigns the best matching virtual object 38. The process ends with block 2338.

A further embodiment of a virtual objects targeting algorithm presented in FIG. 15 will be described with reference to the example values shown in Tables A–E. Various other prioritizing or ranking schemes may be used as described later.

Figure 16:
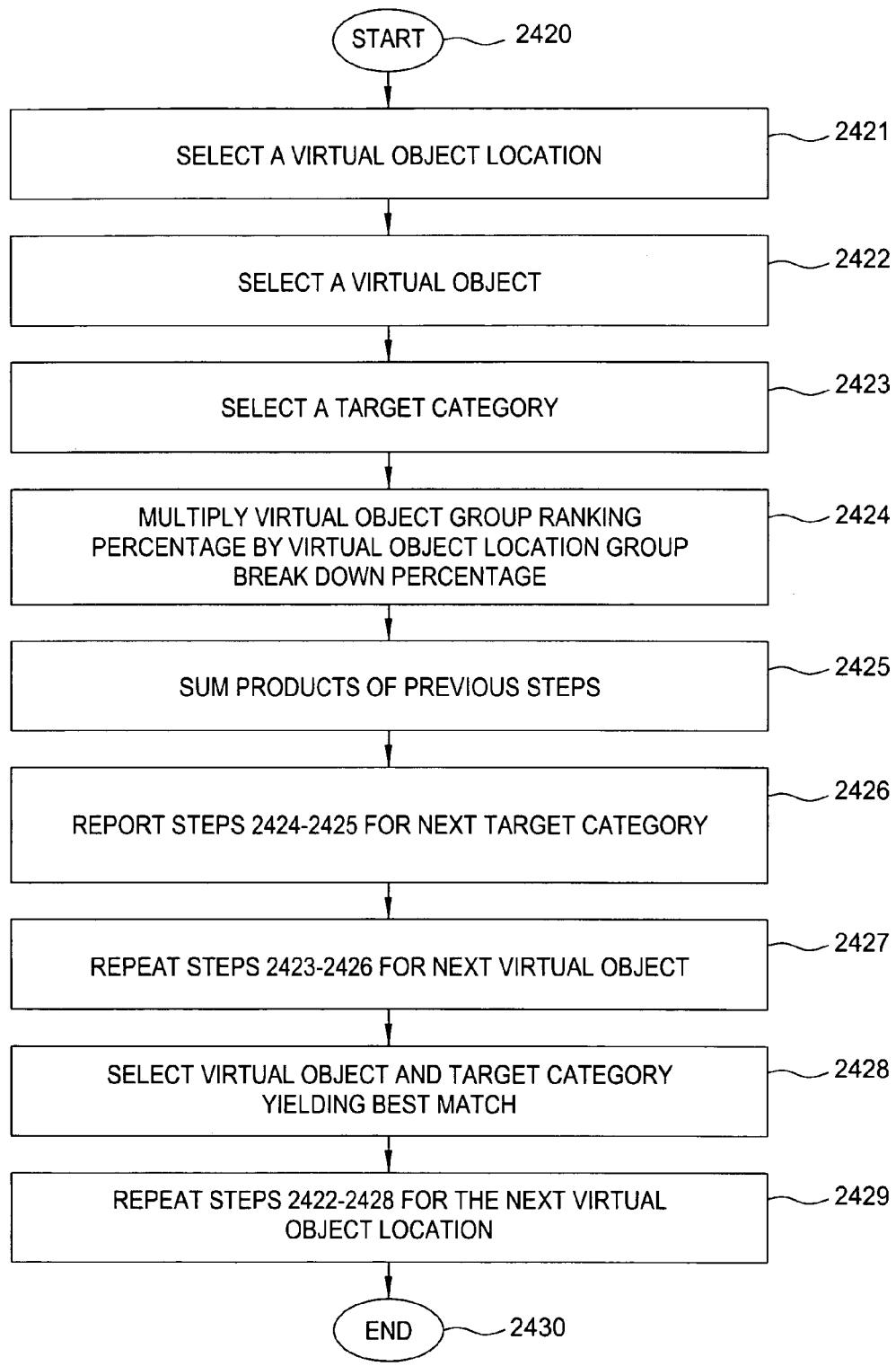
FIG. 16 presents an alternate embodiment used by the virtual object placement engine to assign virtual objects to virtual object locations.

Step 1: In block 2320 in FIG. 15, the virtual object placement engine 1307, for a virtual object location 37, determines the virtual objects with the highest overall ranking if that virtual object 38 were the only virtual object 38 to be placed in a virtual object location 37 in the content 36. This step compares the data in Tables D and E. FIG. 16 and the description that follows below present amore detailed embodiment of several of the blocks presented in FIG. 15. In step 1a, as an embodiment of block 2421 in FIG. 16, the virtual object placement engine 1307 selects the first virtual object location 37 and as an embodiment of block 2421 in FIG. 16, selects the first virtual object 38 to be analyzed. As Step 1b, for that virtual object selected in Step 1a, the virtual object placement engine 1307 selects the first category, as an embodiment of block 2423 in FIG. 16. Then, the virtual object placement engine 1307 multiplies the virtual object's Group Ranking Percentage by the virtual object location's Group Breakdown Percentage for each group as an embodiment of block 2424 in FIG. 16 and sums the result, as an embodiment of block 2425 in FIG. 16. As Step 1c, the virtual object placement engine 1307 repeats Step 1b for the next target category, as an embodiment of block 2426 in FIG. 16. As Step 1d, the virtual object placement engine 1307 repeats steps 1b and 1c for each virtual object 38, as an embodiment of block 2427 in FIG. 16. As Step 1e, for the virtual object location 37 under consideration, the virtual object placement engine 1307 selects the virtual object/target category that yields the highest summed value, as an embodiment of block 2428 in FIG. 16. Then, for Step 1f, the virtual object placement engine 1307 repeats Steps 1b–1e for all virtual object locations, as an embodiment of block 2429 in FIG. 16.

For example, using virtual object location 1, virtual object 1:

target category 1: 50*25+50*25+0*25+0*25=25%
target category 2: 30*30+10*10+20*20+40*40=30%
target category 3: 0*10+0*10+0*20+0*20 0*20+0*20=0%

The cross-multiplied result then shows a measure of effectiveness for each virtual object 38 if displayed in the corresponding virtual object location 37. Table F below presents the results of Step 1 above for virtual object location 1.

Step 2: Returning to FIG. 15, for each virtual object location 37, the virtual object placement engine 1307, in block 2322, determines the virtual object/target category combination that results in the highest overall ranking. In one embodiment the virtual object placement engine 1307, lists the virtual object locations, the overall ranking, the corresponding virtual object 38, and the corresponding target category. In case of a tie, the virtual object placement engine 1307 selects any virtual object 38 with the overall highest ranking. Table G shows the results. Thus, from Table G, virtual object 4, a virtual object 38 displayed within virtual object location 4 yields a measure of effectiveness of 50 (highest) and virtual object 8 along within virtual object location 5 yields a measure of effectiveness of 28.

TABLE G

| Virtual Object Location | Highest Overall Ranking | Corresponding Virtual Object | Corresponding Target Category |
|---|---|---|---|
| Virtual object location 1 | 30 | Virtual Object 1 | 2 |
| Virtual object location 2 | 35 | Virtual Object 2 | 1 |
| Virtual object location 3 | 35 | Virtual Object 1 | 1 |
| Virtual object location 4 | 50 | Virtual Object 4 | 1 |
| Virtual object location 5 | 28 | Virtual Object 8 | 2 |

Step 3: In one embodiment of block 2324 in FIG. 15, the virtual object placement engine 1307 orders the resulting list of virtual object locations from Step 2 from lowest overall ranking to highest overall ranking to compare virtual object/target category combinations for virtual object locations. Table H shows the results.

TABLE F

| Virtual object location/ Virtual object | Target Category | Group 1 | Group 2 | Group 3 | Group 4 | Group 5 | Group 6 | Summation |
|---|---|---|---|---|---|---|---|---|
| 1/1 | 1 | 12.5 | 12.5 | 0 | 0 | 0 | 0 | 25 |
|  | 2 | 9 | 1 | 4 | 16 | 0 | 0 | 30 |
|  | 3 | 0 | 0 | 0 | 0 | 0 | 0 | 0 |
| 1/2 | 1 | 0 | 0 | 12.5 | 12.5 | 0 | 0 | 25 |
|  | 2 | 0 | 0 | 0 | 0 | 0 | 0 | 0 |
|  | 3 | 0 | 0 | 0 | 0 | 0 | 0 | 0 |
| 1/3 | 1 | 0 | 0 | 0 | 0 | 0 | 0 | 0 |
|  | 2 | 7.5 | 2.5 | 5 | 10 | 0 | 0 | 25 |
|  | 3 | 0 | 0 | 0 | 0 | 0 | 0 | 0 |
| 1/4 | 1 | 12.5 | 0 | 12.5 | 0 | 0 | 0 | 25 |
|  | 2 | 0 | 4 | 8 | 8 | 0 | 0 | 20 |
|  | 3 | 1 | 3 | 2 | 6 | 2 | 2 | 16 |
| 1/5 | 1 | 10 | 5 | 5 | 5 | 0 | 0 | 25 |
|  | 2 | 3 | 3 | 6 | 12 | 0 | 0 | 24 |
|  | 3 | 3 | 3 | 6 | 1 | 1 | 0 | 14 |
| 1/6 | 1 | 0 | 0 | 0 | 0 | 0 | 0 | 0 |
|  | 2 | 0 | 0 | 0 | 0 | 0 | 0 | 0 |
|  | 3 | 1 | 1 | 2 | 2 | 6 | 6 | 18 |
| 1/7 | 1 | 5 | 5 | 10 | 5 | 0 | 0 | 25 |
|  | 2 | 7.5 | 2.5 | 5 | 10 | 0 | 0 | 25 |
|  | 3 | 0 | 3 | 4 | 6 | 0 | 4 | 17 |
| 1/8 | 1 | 7.5 | 10 | 0 | 7.5 | 0 | 0 | 25 |
|  | 2 | 9 | 3 | 2 | 12 | 0 | 0 | 26 |
|  | 3 | 2 | 0 | 4 | 4 | 4 | 4 | 18 |

TABLE H

| Virtual Object Location | Overall Ranking | Corresponding Virtual Object | Corresponding Target Category |
|---|---|---|---|
| Virtual object location 5 | 28 | Virtual Object 8 | 2 |
| Virtual object location 1 | 30 | Virtual Object 1 | 2 |
| Virtual object location 2 | 35 | Virtual Object 2 | 1 |
| Virtual object location 3 | 35 | Virtual Object 1 | 1 |
| Virtual object location 4 | 50 | Virtual Object 4 | 1 |

Step 4: In one embodiment of block 2326 in FIG. 15, the virtual object placement engine 1307 uses the process shown in FIG. 17 to determine the best virtual objects to associate with a virtual object location 37. The process begins with ellipse 2440. In block 2441 in FIG. 17, the virtual object placement engine 1307 selects the virtual object location 37 from Step 3 resulting in the lowest overall ranking. As Step 4a, for the selected virtual object location 37, the virtual object placement engine 1307 selects the first target category, as an embodiment of block 2442 in FIG. 17. As Step 4b, the virtual object placement engine 1307 assembles a table showing the product of each virtual object Group Ranking Percentage and virtual object location Group Breakdown Percentage combination. Table I below provides an example for virtual object location 5 and target category 1.

TABLE I

| Virtual Object Location/ Virtual Object | Target Category | Group 1 | Group 2 | Group 3 | Group 4 | Summation |
|---|---|---|---|---|---|---|
| 5/1 | 1 | 10 | 15 | 0 | 0 | 25 |
| 5/2 | 1 | 0 | 0 | 15 | 10 | 25 |
| 5/3 | 1 | 0 | 0 | 0 | 0 | 0 |
| 5/4 | 1 | 10 | 0 | 15 | 0 | 25 |
| 5/5 | 1 | 8 | 6 | 6 | 4 | 24 |
| 5/6 | 1 | 0 | 0 | 0 | 0 | 0 |
| 5/7 | 1 | 4 | 6 | 12 | 4 | 26 |
| 5/8 | 1 | 6 | 12 | 0 | 6 | 24 |

Figure 17:
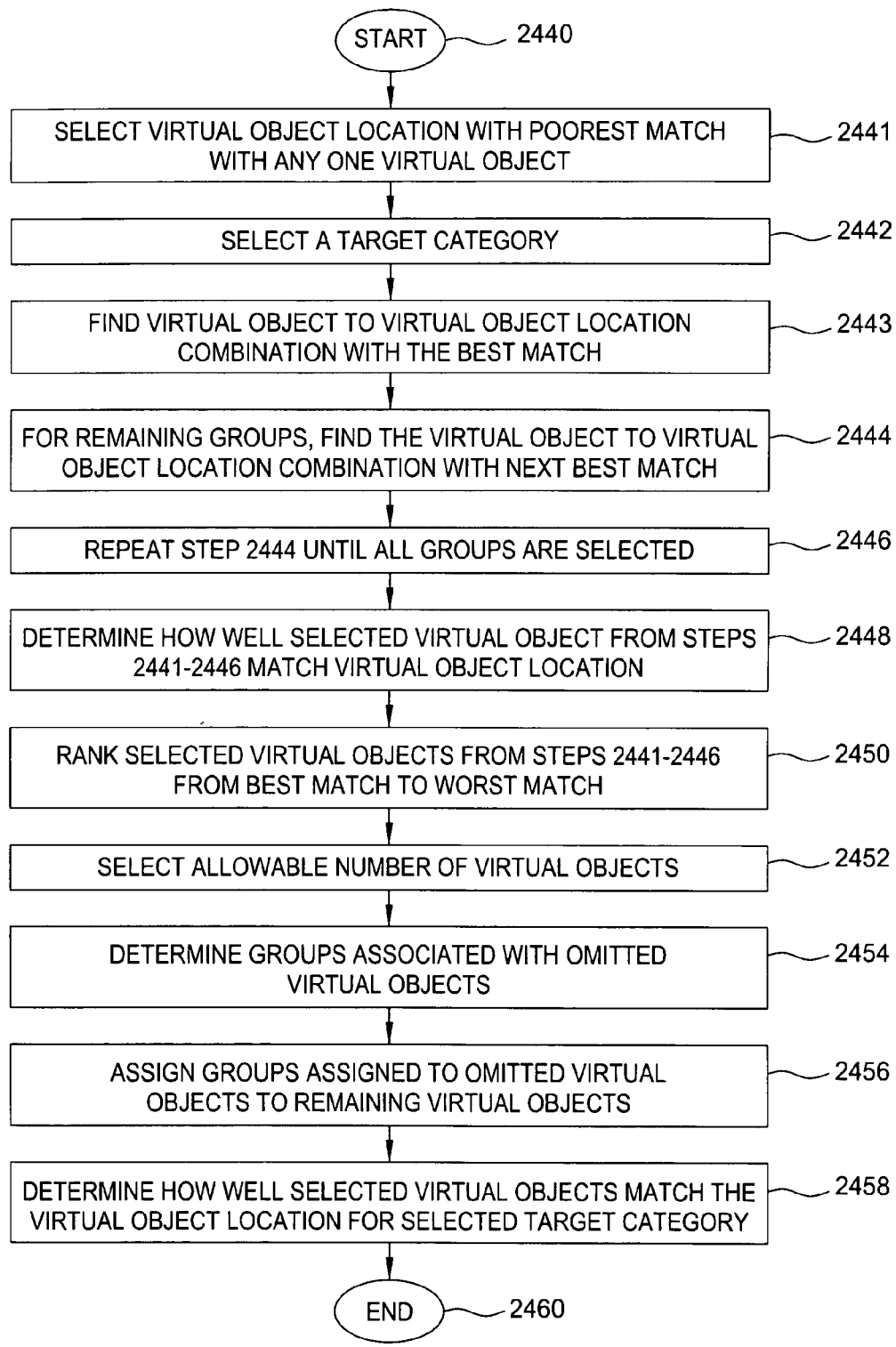
FIG. 17 presents yet another embodiment used by the virtual object placement engine to assign virtual objects to virtual object locations.

As Step 4c, as an embodiment of block 2443 in FIG. 17, the virtual object placement engine 1307 finds the product that is the highest. In case of a tie, the virtual object placement engine 1307 selects the product that corresponds to the highest summation value for that virtual object location/virtual object combination. In case a tie still persists, the virtual object placement engine 1307 selects any of the cells with an equivalent value. Table J below shows the previous example continued where group 2 for virtual object location/virtual object combination 5/1 is selected.

TABLE J

| Virtual Object Location/ Virtual Object | Target Category | Group 1 | Group 2 | Group 3 | Group 4 | Summation |
|---|---|---|---|---|---|---|
| 5/1 | 1 | 10 | *15* | 0 | 0 | 25 |
| 5/2 | 1 | 0 | 0 | 15 | 10 | 25 |
| 5/3 | 1 | 0 | 0 | 0 | 0 | 0 |
| 5/4 | 1 | 10 | 0 | 15 | 0 | 25 |
| 5/5 | 1 | 8 | 6 | 6 | 4 | 24 |
| 5/6 | 1 | 0 | 0 | 0 | 0 | 0 |
| 5/7 | 1 | 4 | 6 | 12 | 4 | 26 |
| 5/8 | 1 | 6 | 12 | 0 | 6 | 24 |

Step 5: As an embodiment of block 2444 in FIG. 17, the virtual object placement engine 1307 finds the product that is next highest (or the same value as in Step 4), but that is associated with a group not yet selected. Again, in case of a tie, the virtual object placement engine 1307 selects the product that corresponds to the highest summation value for that virtual object location/virtual object combination. In case a tie still persists, the virtual object placement engine 1307 selects any of the cells with an equivalent value. Table K below shows the previous example continued.

TABLE K

| Virtual Object Location/Virtual Object | Target Category | Group 1 | Group 2 | Group 3 | Group 4 |
|---|---|---|---|---|---|
| 5/1 | 1 | *10* | *15* | 0 | 0 |
| 5/2 | 1 | 0 | 0 | *15* | *10* |
| 5/3 | 1 | 0 | 0 | 0 | 0 |
| 5/4 | 1 | 10 | 0 | 15 | 0 |
| 5/5 | 1 | 8 | 6 | 6 | 4 |
| 5/6 | 1 | 0 | 0 | 0 | 0 |
| 5/7 | 1 | 4 | 6 | 12 | 4 |
| 5/8 | 1 | 6 | 12 | 0 | 6 |

Step 6: As an embodiment of block 2446 in FIG. 17, the virtual object placement engine 1307 repeats Step 5 until a product has been selected for all groups. Table L below continues the example.

TABLE L

| Virtual Object Location/Virtual Object | Target Category | Group 1 | Group 2 | Group 3 | Group 4 |
|---|---|---|---|---|---|
| 5/1 | 1 | *10* | *15* | 0 | 0 |
| 5/2 | 1 | 0 | 0 | *15* | *10* |
| 5/3 | 1 | 0 | 0 | 0 | 0 |
| 5/4 | 1 | 10 | 0 | 15 | 0 |
| 5/5 | 1 | 8 | 6 | 6 | 4 |
| 5/6 | 1 | 0 | 0 | 0 | 0 |
| 5/7 | 1 | 4 | 6 | 12 | 4 |
| 5/8 | 1 | 6 | 12 | 0 | 6 |

Step 7: As an embodiment of block 2448 in FIG. 17, for all virtual objects with products cells selected in Step 6, the virtual object placement engine 1307 calculates the summed products of those selected cells for each virtual object 38. Table M below shows the results.

TABLE M

| Virtual Object Location/ Virtual Object | Target Category | Group 1 | Group 2 | Group 3 | Group 4 | Summation |
|---|---|---|---|---|---|---|
| 5/1 | 1 | *10* | *15* | 0 | 0 | 25 |
| 5/2 | 1 | 0 | 0 | *15* | *10* | 25 |
| 5/3 | 1 | 0 | 0 | 0 | 0 | 0 |
| 5/4 | 1 | 10 | 0 | 15 | 0 | 0 |
| 5/5 | 1 | 8 | 6 | 6 | 4 | 0 |
| 5/6 | 1 | 0 | 0 | 0 | 0 | 0 |
| 5/7 | 1 | 4 | 6 | 12 | 4 | 0 |
| 5/8 | 1 | 6 | 12 | 0 | 6 | 0 |

Step 8: As an embodiment of block 2450 in FIG. 17, the virtual object placement engine 1307 orders the virtual objects in Step 7 from highest summed value to lowest. In case of equal summed values, the virtual object placement engine 1307 arbitrarily orders those virtual objects with the same summed value. Table N presents the example results.

Step 9: As Step 9a, if the number of virtual objects selected in Step 8 exceeds [MAX_VIRTUAL OBJECTS], the virtual object placement engine 1307 selects the first [MAX_VIRTUAL OBJECTS] virtual objects with the summed value as an embodiment of block 2452 in FIG. 17. For example, if it is desired to assign at most two virtual objects to a virtual object location 37, the virtual object placement engine 1307 selects the two virtual objects with the highest virtual object Group Ranking Percentage and virtual object location Group Breakdown Percentage products. Next, as Step 9b, for the unselected virtual objects, the virtual object placement engine 1307 determines those groups that were associated with these omitted virtual objects, as an embodiment of block 2454 in FIG. 17.

Step 10: As an embodiment of block 2456 in FIG. 17, for the virtual objects associated with the groups determined in Step 9b, the virtual object placement engine 1307 selects the product within that group that is the highest for the [MAX_VIRTUAL OBJECT] selected virtual objects from Step 9a. The virtual object placement engine 1307 recalculates the summed products of those selected groups cells for each of the virtual objects. Table O below provides a new example, assuming [MAX_VIRTUAL OBJECTS]=2; therefore, groups 5 and 6, which are associated with virtual object 6, may be reallocated to virtual objects 7 & 5, respectively.

TABLE O

| Virtual object location/ Virtual object | Target Category | Group 1 | Group 2 | Group 3 | Group 4 | Group 5 | Group 6 | Summation |
|---|---|---|---|---|---|---|---|---|
| Result before Step 10 is shown below: | | | | | | | | |
| 5/7 | 3 | 0 | *9* | 2 | *9* | 0 | 2 | 18 |
| 5/5 | 3 | *3* | 9 | *3* | 1.5 | 0.5 | 0 | 6 |
| 5/6 | 3 | 1 | 3 | 1 | 3 | *3* | *3* | 6 |
| Result after Step 10 is shown below: | | | | | | | | |
| 5/7 | 3 | 0 | *9* | 2 | *9* | 0 | *2* | 20 |
| 5/5 | 3 | *3* | 9 | *3* | 1.5 | *0.5* | 0 | 6.5 |
| 5/6 | 3 | 1 | 3 | 1 | 3 | 3 | 3 | 0 |

TABLE N

| Virtual Object Location/ Virtual Object | Target Category | Group 1 | Group 2 | Group 3 | Group 4 | Summation |
|---|---|---|---|---|---|---|
| 5/1 | 1 | 10 | 15 | 0 | 0 | 25 |
| 5/2 | 1 | 1 | 0 | 15 | 10 | 25 |

Step 11: As an embodiment of block 2458 in FIG. 17, the virtual object placement engine 1307 calculates the total summed product value for all virtual objects selected in Step 10. From Table P, this value is 26.5. The resultant groups selected for each virtual object 38 will serve as the group assignments if this virtual object location/target category ultimately results in the best match, as determined in the remaining steps of the algorithm.

TABLE P

| Virtual object location/ Virtual object | Target Category | Group 1 | Group 2 | Group 3 | Group 4 | Group 5 | Group 6 | Summation |
|---|---|---|---|---|---|---|---|---|
| 5/7 | 3 | 0 | *9* | 2 | *9* | 0 | *2* | 20 |
| 5/5 | 3 | *3* | 9 | *3* | 1.5 | 0.5 | 0 | 6.5 |
| Total summed product values | | | | | | | | 26.5 |

Step 12: The virtual object placement engine 1307 repeats steps 4–11 above for the same selected virtual object location 37 of Step 4 using the remaining target categories, as an embodiment of block 2328 in FIG. 15. The Table Q example below provides the output results for each of the three example target categories.

TABLE Q

| Virtual object location/ Virtual object | Target Category | Group 1 | Group 2 | Group 3 | Group 4 | Group 5 | Group 6 | Summation |
|---|---|---|---|---|---|---|---|---|
| 5/1 | 1 | *10* | *15* | 0 | 0 | | | 25 |
| 5/2 | 1 | 0 | 0 | *15* | *10* | | | 25 |
| Total summed product values | | | | | | | | 50 |
| 5/1 | 2 | *9* | 3 | 2 | *12* | 0 | 0 | 21 |
| 5/4 | 2 | 0 | *12* | *4* | 6 | 0 | 0 | 16 |
| Total summed product values | | | | | | | | 37 |
| 5/7 | 3 | 0 | *9* | 2 | *9* | 0 | *2* | 20 |
| 5/5 | 3 | *3* | 9 | *3* | 1.5 | *0.5* | 0 | 6.5 |
| Total summed product values | | | | | | | | 26.5 |

Step 13: As an embodiment of block 2330 in FIG. 15, the virtual object placement engine 1307 selects the target category that yields the highest total summed product amount. The virtual object placement engine 1307 assigns this as the Maximum Rank for that virtual object location 37. In the case above, the virtual object placement engine 1307 would assign target category 1, with a value of 50 that is selected.

Step 14: As an embodiment of block 2332 in FIG. 15, the virtual object placement engine 1307 repeats Steps 4–13 for the virtual object location 37 selected in Step 4 with the next lowest overall ranking, computing the Maximum Rank for each virtual object location 37.

Step 15: As an embodiment of block 2334 in FIG. 15, the virtual object placement engine 1307 uses the available [MAX_VIRTUALOBJECTS] virtual objects for the virtual object locations up to the maximum number of [TOTAL_VIRTUALOBJECTS] that yield the largest Maximum Rank. The virtual object placement engine 1307 makes use of the relevant target category determined in Step 13, with virtual objects as determined in Step 10, with group assignments as determined in Step 11.

Step 16: As an embodiment of block 2336 in FIG. 15, for all other virtual object locations, the virtual object placement engine 1307 assigns the single virtual objects that yielded the highest Overall Ranking as determined in Step 2.

The above algorithm performed by the virtual object placement engine 1307 is meant to be illustrative and not limiting. Other algorithms are possible for assigning targeted virtual objects to groups of reception sites or to individual reception sites. Other targeted virtual object routines can also be used by the virtual object placement engine 1307.

Figure 18:
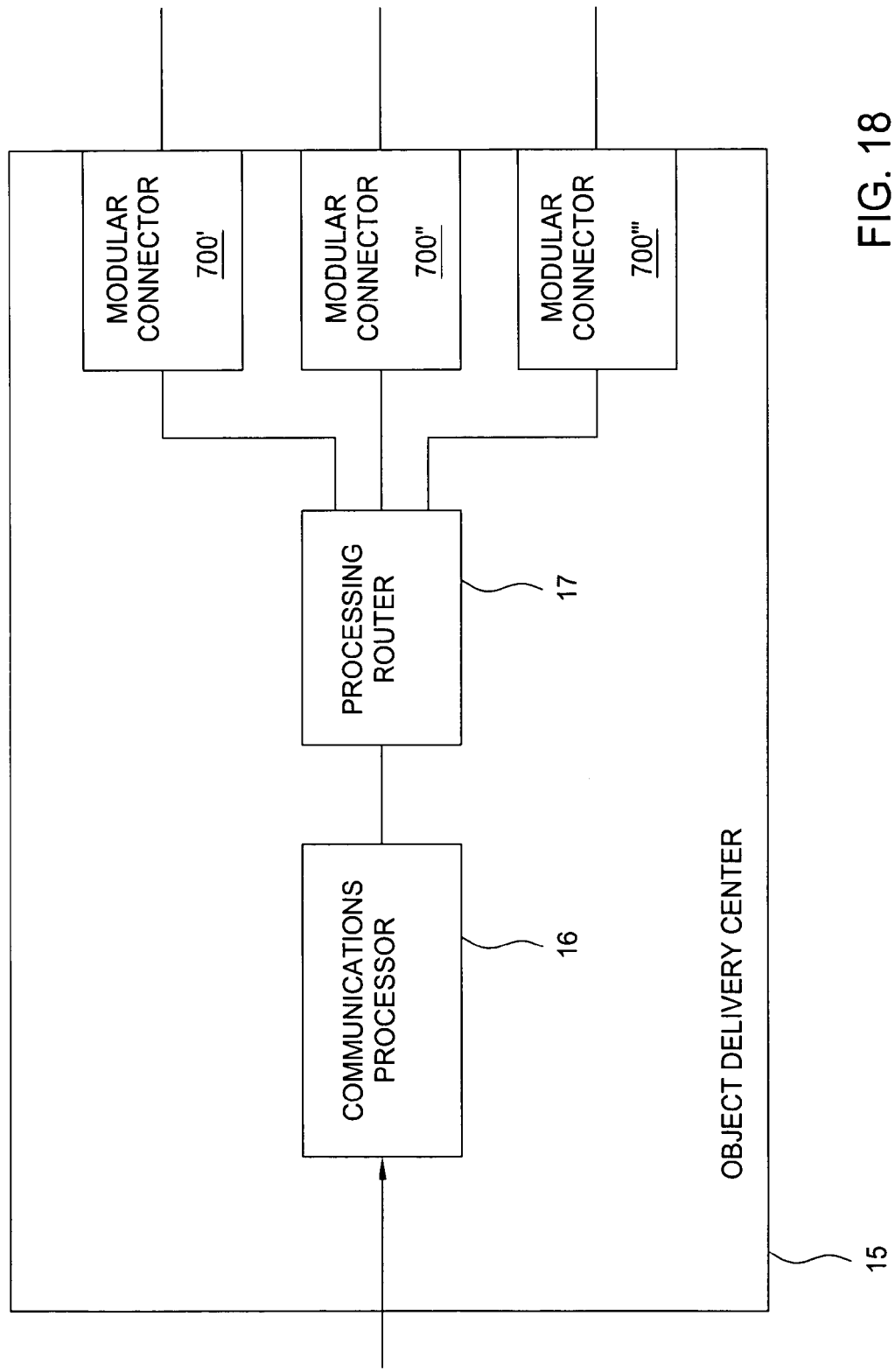
FIG. 18 depicts an object delivery center.

FIG. 18 depicts the object delivery center 15. The object delivery center 15 receives content 36, virtual objects, retrieval plans, group assignment rules, and other information from the operations center 10 that is to be transmitted to reception sites. The communication processor 16 in the object delivery center 15 may determine the delivery network and communications methods appropriate for each item to be delivered, may combine items to be delivered to common destinations, may format the items for delivery, and provide the formatted items to the processing router 17. The processing router 17 may then route each item to the appropriate modular connector 700, for example modular connector 700', modular connector 700", or modular connector 700', depending on the required delivery network 11 and communication method.

A number of embodiments of delivery networks 11, 12, and 14 are presented below. The embodiments presented below may use the object delivery center 15, which inserts the virtual objects into the signal for delivery over the delivery network 11 or 12. The embodiments presented below use a modular connector 700 in the reception site 30, that receives the delivered signal with virtual objects, extracts the virtual objects, and provides the virtual objects to the storage management processor 710. The modular connector 700 supports the receive functionality for each unique delivery network communication method embodiment.

Figure 19:
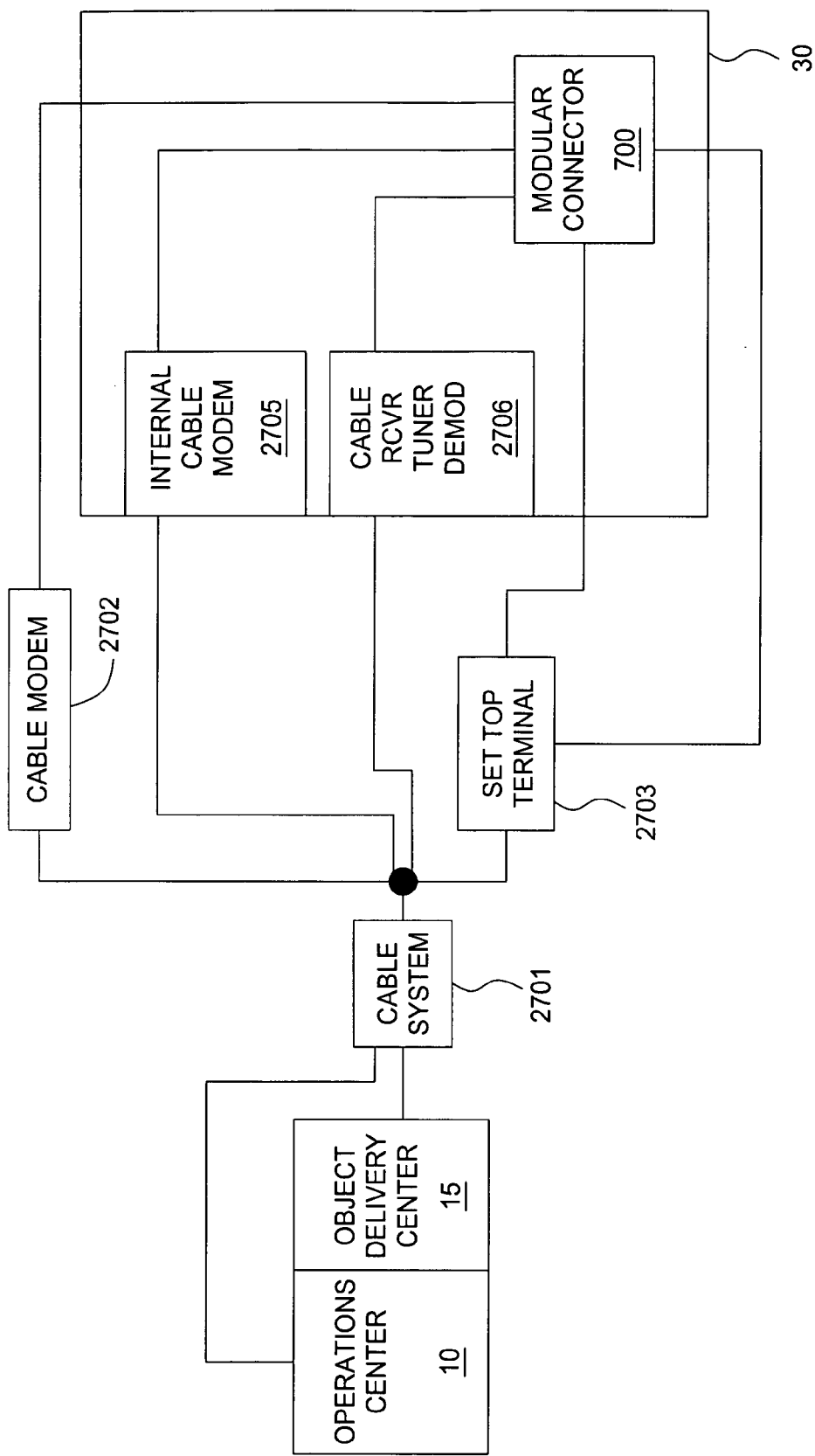
FIG. 19 presents embodiments associated with the delivery of virtual objects over a coaxial or fiber cable system to a reception site.

FIG. 19 presents embodiments associated with the delivery of virtual objects over a coaxial or fiber cable system 2701 to a reception site 30. Virtual objects are provided to the delivery network 11 by the object delivery center 15 or directly by the operations center 10. Alternatively, content 36 and virtual objects may be provided to the reception site 30 from the object delivery center 15 or from the local insertion center 20 using delivery network 12. The signal is delivered over the cable system 2701 delivery network. The signal may provide for the delivery of virtual objects, content 36 containing virtual object locations, and group assignment rules and retrieval plans. The signal may also provide for interactive virtual object requests from the reception site 30 to the interactive object service center 60 using delivery network 14 or the signal may be a means to provide access to the Internet or other public network through which virtual objects or content 36 are delivered (not shown). The cable system 2701 may be a coaxial cable network, totally fiber network, hybrid fiber coax network, fiber to the curb network, or any other cable distribution technology. The signal over the cable system may be generated by a cable modem, in which an external cable modem 2702 is used to receive the signal and provide the embedded virtual objects to the modular connector 700 in the reception site 30 for processing. Alternatively, the reception site 30 may contain an internal cable modem 2705, which receives the signal and provides the virtual objects to the modular connector 700 for processing.

In another embodiment, the signal delivered over the cable system is a video signal. In one embodiment, the video signal is an analog video signal. In another embodiment, the video signal is a digital video signal. The reception site 30 may contain an internal cable receiver/tuner/demodulator 2706 to process the signal, and provide the embedded virtual objects to the modular connector 700. A set top terminal 2703, or other device capable of receiving a cable video signal, such as a cable ready TV, or PC with cable tuner (not shown), may process the video signal and deliver the video signal to the connector 700 in the reception site 30, which extracts the embedded virtual objects. Alternately, the set top terminal 2703, or other such device, may extract the embedded virtual objects from the video signal and provide the virtual objects to the modular connector 700 in the reception site 30.

In another embodiment, virtual objects may be embedded within the audio signal, requiring an appropriate audio-capable modular connector 700 in the reception site 30 to extract the virtual objects from the audio signal. In one embodiment, the audio signal is an analog audio signal. In another embodiment, the audio signal is a digital audio signal.

In yet another embodiment, the signal is a spread spectrum signal containing a digital data stream, requiring an appropriate spread spectrum receiver and modular connector 700 in the reception site 30 to extract the virtual objects. In this embodiment, the spread spectrum signal is transmitted in the same bandwidth as the video or audio signal, but below the noise level.

Figure 20:
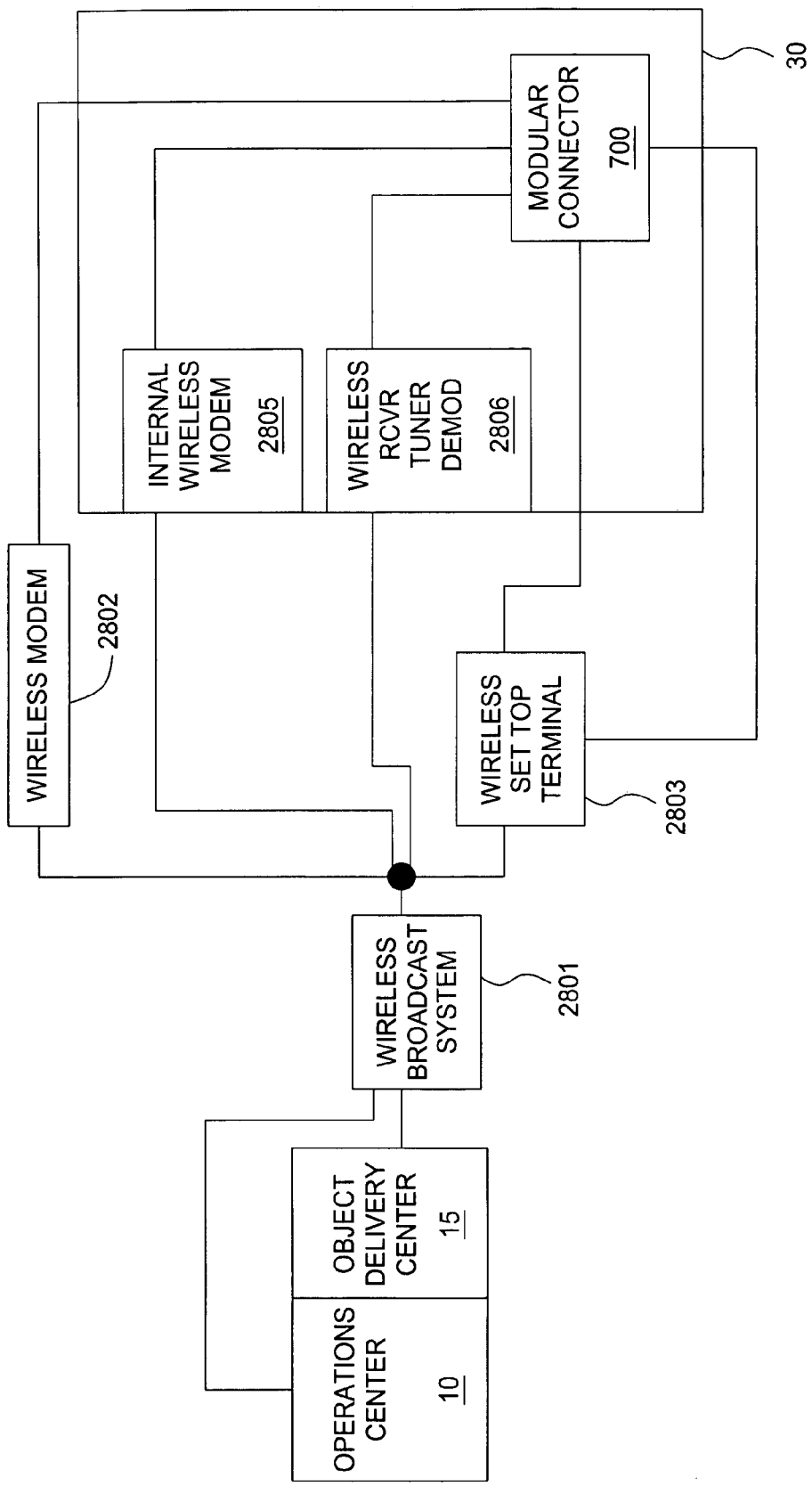
FIG. 20 presents embodiments associated with the delivery of virtual objects over a wireless broadcast system to a reception site.

FIG. 20 presents embodiments associated with the delivery of virtual objects over a wireless broadcast system 2801 to a reception site 30. Virtual objects are provided to the delivery network 11 by the object delivery center 15 or directly by the operations center 10. Alternatively, content 36 and virtual objects may be provided to the reception site 30 from the object delivery center 15 or from the local insertion center 20 using delivery network 12. The signal is delivered over the wireless broadcast system 2801 delivery network. The signal may provide for the delivery of virtual objects, content 36 containing virtual object locations, and group assignment rules and retrieval plans. The signal may also provide for interactive virtual object requests from the reception site 30 to the interactive object service center 60 using delivery network 14 or the signal may be a means to provide access to the Internet or other public network through which virtual objects or content 36 are delivered. The wireless broadcast system may be a microwave multipoint delivery system (MMDS), local multipoint distribution system (LMDS), Instructional Television Fixed Service (ITFS) system, or any other wireless data, video, or telephony broadcast system, including point-to-point and point-to-multipoint microwave broadcast systems like those provided by Teligent, Winstar digital wireless network, and ATT's wireless system. The signal over the wireless broadcast system may be generated by a wireless modem, in which an external wireless modem 2802 is used to receive the signal and provide the embedded virtual objects to the modular connector 700 in the reception site 30 for processing. Alternatively, the reception site 30 may contain an internal wireless modem 2805, which receives the signal and provides the virtual objects to the modular connector 700 in the reception site 30 for processing.

In another embodiment, the signal delivered over the wireless broadcast system is a video signal. In one embodiment, the video signal is an analog video signal. In another embodiment, the video signal is a digital video signal. The reception site 30 may contain an internal wireless receiver/tuner/demodulator 2806 to process the signal, and provide the embedded virtual objects to the modular connector 700. A wireless set-top terminal 2803, or other device capable of receiving a wireless video signal, such as a TV, or PC with a wireless receiver and tuner, may process the video signal and deliver the video signal to the modular connector 700 in the reception site 30, which extracts the embedded virtual objects. Alternately, the set top terminal 2803, or other such device, may extract the embedded virtual objects from the video signal and provide the data to the modular connector 700 in the reception site 30.

In another embodiment, virtual objects maybe embedded within the audio signal, requiring an appropriate audio-capable modular connector 700 in the reception site 30 to extract the virtual objects from the audio signal. In one embodiment, the audio signal is an analog audio signal. In another embodiment, the audio signal is a digital audio signal.

In yet another embodiment, the signal is a spread spectrum signal containing a digital data stream, requiring an appropriate spread spectrum receiver modular connector 700 in the reception site 30 to extract the virtual objects. In this embodiment, the spread spectrum signal is transmitted in the same bandwidth as the video or audio signal, but below the noise level.

Figure 21:
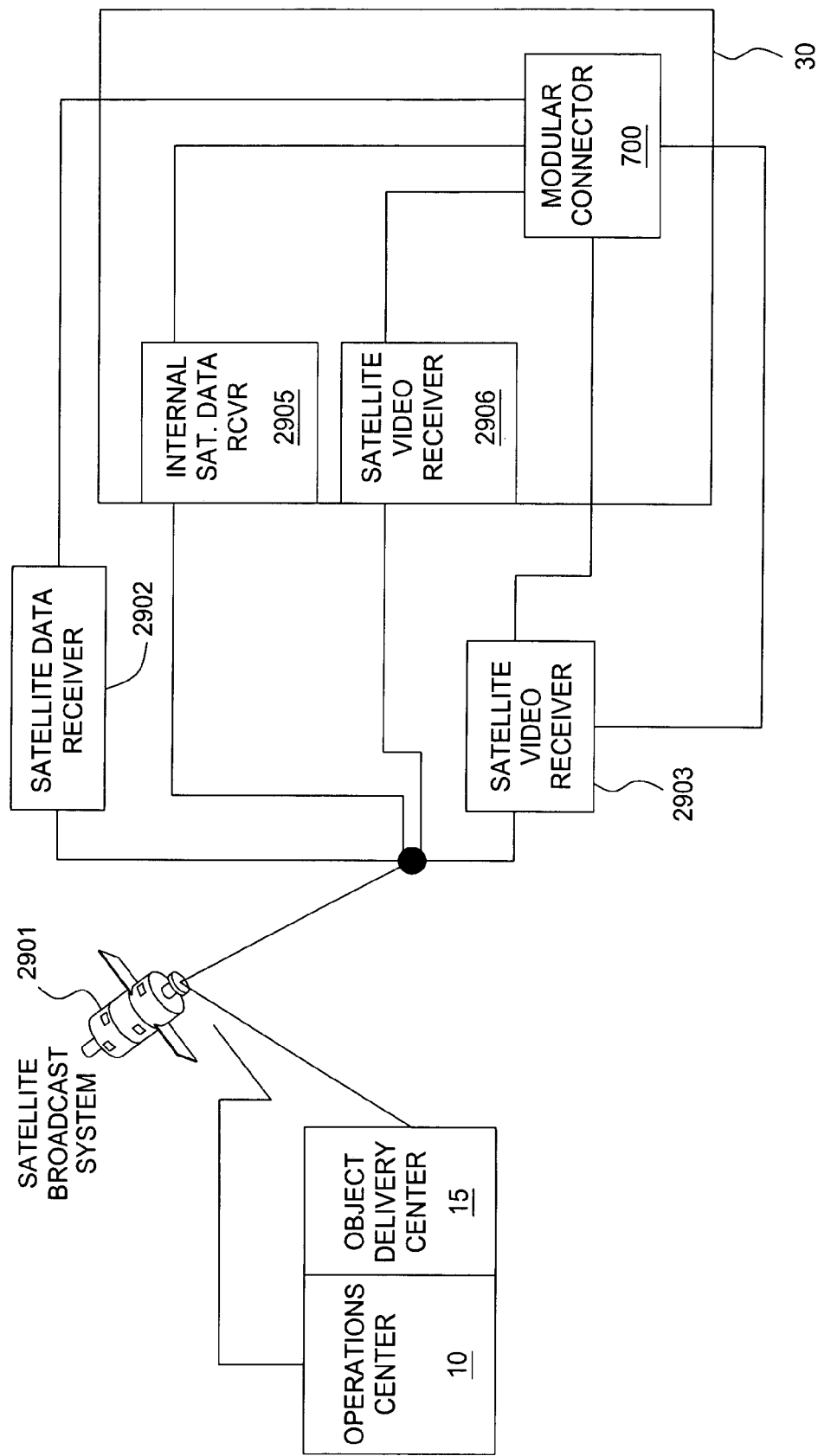
FIG. 21 presents embodiments associated with the delivery of virtual objects over a satellite broadcast system to a reception site.

FIG. 21 presents embodiments associated with the delivery of virtual objects over a satellite broadcast system 2901 to a reception site 30. Virtual objects are provided to the delivery network 11 by the object delivery center 15 or directly by the operations center 10. Alternatively, content 36 and virtual objects maybe provided to the reception site 30 from the object delivery center 15 or from the local insertion center 20 using delivery network 12. The signal is delivered over the satellite broadcast system 2901 delivery network. The signal may provide for the delivery of virtual objects, content 36 containing virtual object locations, and group assignment rules and retrieval plans. The signal may also provide for interactive virtual object requests from the reception site 30 to the interactive object service center 60 using delivery network 14 or the signal may be a means to provide access to the Internet or other public network through which virtual objects or content 36 are delivered. The satellite broadcast system 2901 can be a direct broadcast system like DirecTV and EchoStar, a direct to home satellite broadcast system, video network distribution broadcast system, a point-to-point or point-to-multipoint data VSAT system, a digital audio broadcast system like WorldSpace, Sirius—formerly CD Radio, or XM, or a mobile data and telephony satellite broadcast system like Iridium, Teledesic, or Globalstar. Alternatively, the satellite broadcast system can be regionalized broadcast services or store and forward communication services hosted on high flying balloons or on airplanes that provide communication repeater services to an small geographic region. The signal over the satellite broadcast system may be generated by a satellite data modem, in which an external satellite data receiver 2902 is used to receive the signal and provide the embedded virtual objects to the reception site 30 modular connector 700 for processing. Alternatively, the reception site 30 may contain an internal satellite receiver 2905, which receives the signal and provides the virtual objects to the modular connector 700 in the reception site 30 for processing.

In another embodiment, the signal delivered over the satellite broadcast system is a video signal. In one embodiment, the video signal is an analog video signal. In another embodiment, the video signal is a digital video signal. The reception site 30 may contain an internal satellite video receiver 2906 to process the signal, and provide the embedded virtual objects to the modular connector 700. A satellite receiver 2903, or other device capable of receiving a satellite video signal, such as a TV, or PC with satellite receiver, may process the video signal and deliver the video signal to the modular connector 700 in the reception site 30, which extracts the embedded virtual objects. Alternately, the satellite receiver 2903, or other such device, may extract the embedded virtual objects from the video signal and provide the data to the modular connector in the reception site 258.

In another embodiment, virtual objects may be embedded within the audio signal, requiring an appropriate audio-capable modular connector 700 in the reception site 30 to extract the virtual objects from the audio signal. In one embodiment, the audio signal is an analog audio signal. In another embodiment, the audio signal is a digital audio signal.

In yet another embodiment, the signal is a spread spectrum signal containing a digital data stream, requiring an appropriate spread spectrum receiver modular connector 700 in the reception site 30 to extract the virtual objects. In this embodiment, the spread spectrum signal is transmitted in the same bandwidth as the video or audio signal, but below the noise level.

Figure 22:
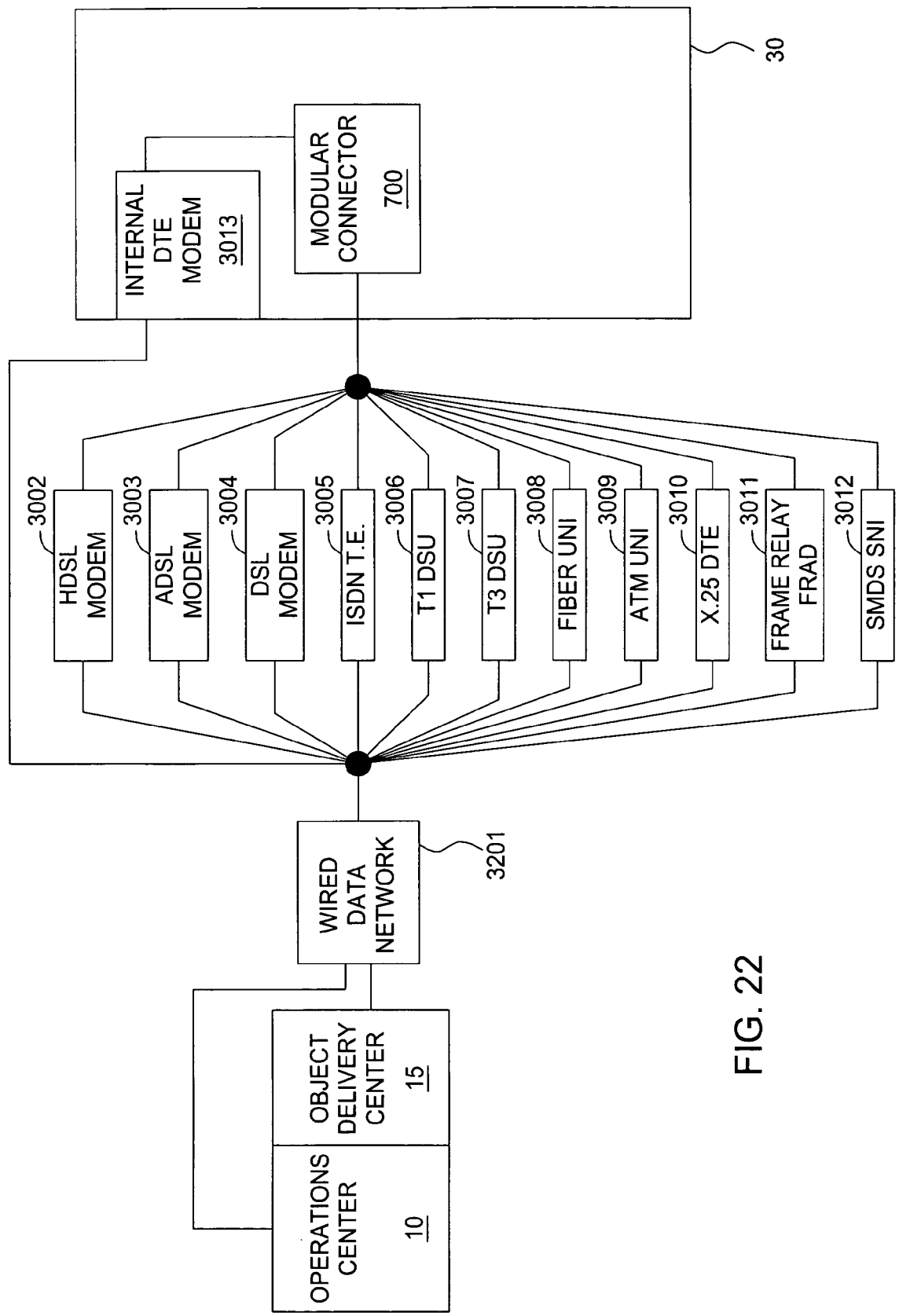
FIG. 22 presents embodiments associated with the delivery of virtual objects over a wired data network to a reception site.

FIG. 22 presents embodiments associated with the delivery of virtual objects over a wired data network 3001 to a reception site 30. Virtual objects are provided to the delivery network 11 by the object delivery center 15 or directly by the operations center 10. Alternatively, content 36 and virtual objects may be provided to the reception site 30 from the object delivery center 15 or from the local insertion center 20 using delivery network 12. The signal is delivered over the wired data network 3001 delivery network. The signal may provide for the delivery of virtual objects, content 36 containing virtual object locations, and group assignment rules and retrieval plans. The signal may also provide for interactive virtual object requests from the reception site 30 to the interactive object service center 60 using delivery network 14 or the signal may be a means to provide access to the Internet or other public network through which virtual objects or content 36 are delivered. The wired data network 3001 can be metallic wire or fiber, supporting any of a number of communication standards including HDSL, ADSL, DSL, ISDN, T1, T3, SONET, ATM, X.25, frame relay, Switched MultiMegabit Data Service (SMDS), or others. The signal sent over the wired data network may be generated by a data modem or transmission device, in which the appropriate modem, interface device, or Data Terminating Equipment (DTE) device is used to receive the signal and provide the embedded virtual objects to the reception site 30 modular connector 700 for processing. Embodiments of such receiving devices are shown in FIG. 22 as HDSL modem 3002, ADSL modem 3003, DSL modem 3003, ISDN Terminal equipment (TE) device 3005, T1 Digital service unit (DSU) 3006, T3 DSU 3007, Fiber user network interface device (UNI) 3008, ATM UNI 3009, X.25 DTE 3010, Frame relay assembler/disassembler (FRAD) 3011, and SMDS subscriber network interface device (SNI) 3012. Alternatively, the reception site 30 may contain an internal modem or DTE 3013, which receives one or more signal types and provides the received signal with embedded virtual objects to the modular connector 700 in the reception site 30 for processing. Finally, the reception site 30 may be attached to a wired LAN using a transceiver. In this embodiment, virtual objects may be delivered over the LAN at any time.

Figure 23:
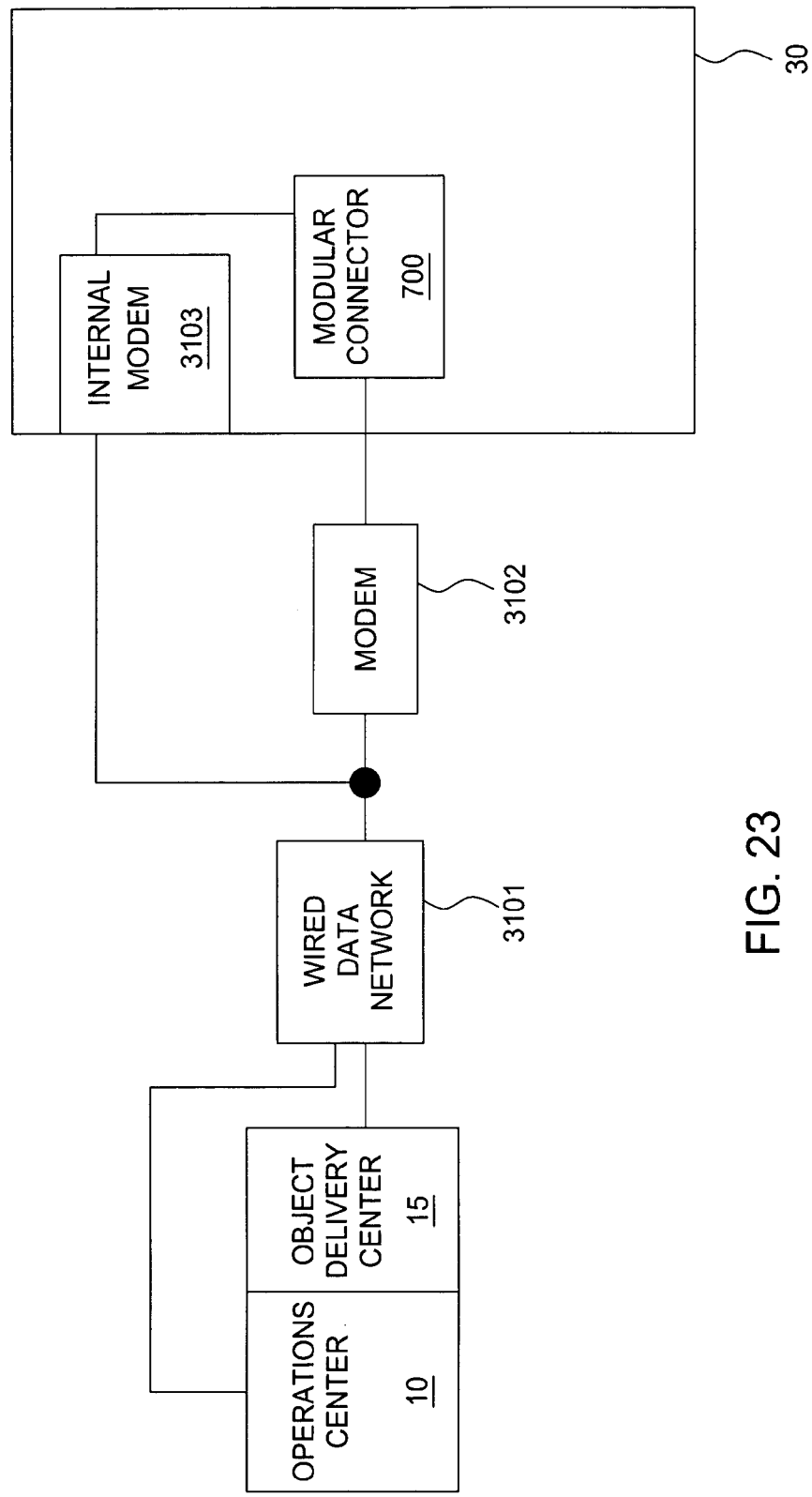
FIG. 23 presents embodiments associated with the delivery of virtual objects using the public switched telephony network (PSTN) to a reception site.

FIG. 23 presents embodiments associated with the delivery of virtual objects using the public switched telephone network (PSTN) 3101 to a reception site 30. Virtual objects are provided to the delivery network 11 by the object delivery center 15 or directly by the operations center 10. Alternatively, content 36 and virtual objects may be provided to the reception site 30 from the object delivery center 15 or from the local insertion center 20 using delivery network 12. The signal is delivered over the PSTN 3101 delivery network. The signal may provide for the delivery of virtual objects, content 36 containing virtual object locations, and group assignment rules and retrieval plans. The signal may also provide for interactive virtual object requests from the reception site 30 to the interactive object service center 60 using delivery network 14 or the signal may be a means to provide access to the Internet or other public network through which virtual objects or content 36 are delivered. The signal sent over the PSTN may be generated by a data modem or transmission device, in which the appropriate modem 3102 is used to receive the signal and provide the embedded virtual objects to the modular connector 700 in the reception site 30 for processing. Alternatively, the reception site 30 may contain an internal modem 3103, which receives the signal and provides the received signal with embedded virtual objects to the modular connector 700 in the reception site 30 for processing.

Figure 24:
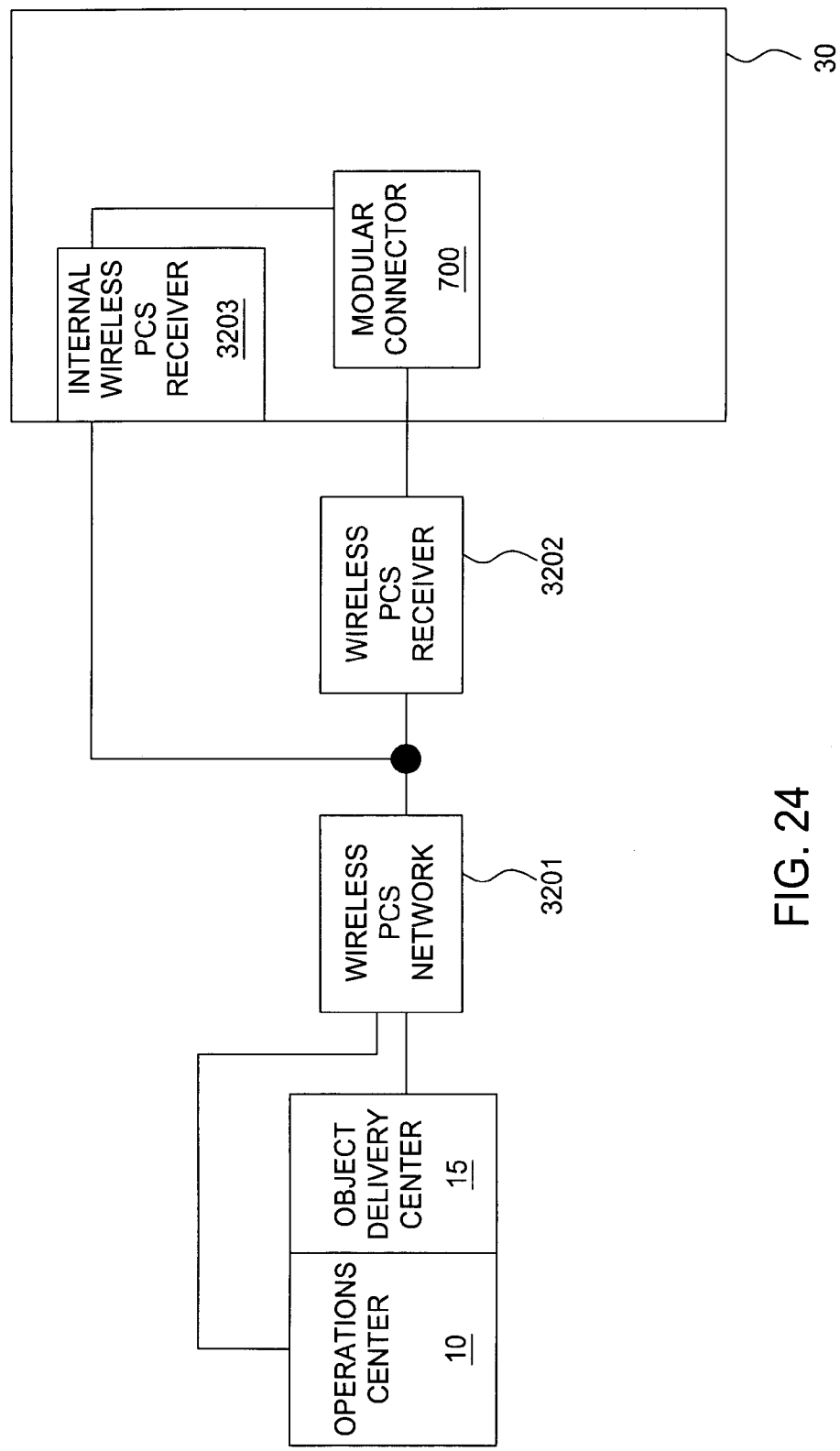
FIG. 24 presents embodiments associated with the delivery of virtual objects using wireless personal communications system (PCS) to a reception site.

FIG. 24 presents embodiments associated with the delivery of virtual objects using wireless personal communications system (PCS) 3201 to a reception site 30. Virtual objects are provided to the delivery network 11 by the object delivery center 15 or directly by the operations center 10. Alternatively, content 36 and virtual objects may be provided to the reception site 30 from the object delivery center 15 or from the local insertion center 20 using delivery network 12. The signal is then delivered over the PCS network 3201 delivery network. The wireless PCS system may be, for example a wireless LAN, digital cellular telephony network, analog cellular telephony network, digital cellular radio system, analog cellular radio system, digital pager network, analog pager network, or Personal Communication Network (PCN). The signal may provide for the delivery of virtual objects, content 36 containing virtual object locations, and group assignment rules and retrieval plans. The signal may also provide for interactive virtual object requests from the reception site 30 to the interactive object service center 60 using delivery network 14 or the signal may be a means to provide access to the Internet or other public network through which virtual objects or content 36 are delivered. A wireless PCS receiver 3202 is used to receive the signal and provide the embedded virtual objects to the modular connector 700 in the reception site 30 for processing. Alternatively, the reception site 258 may contain an internal wireless PCS receiver 3203, which receives the signal and provides the received signal with embedded virtual objects to the modular connector 700 in the reception site 30 for processing.

Figure 25:
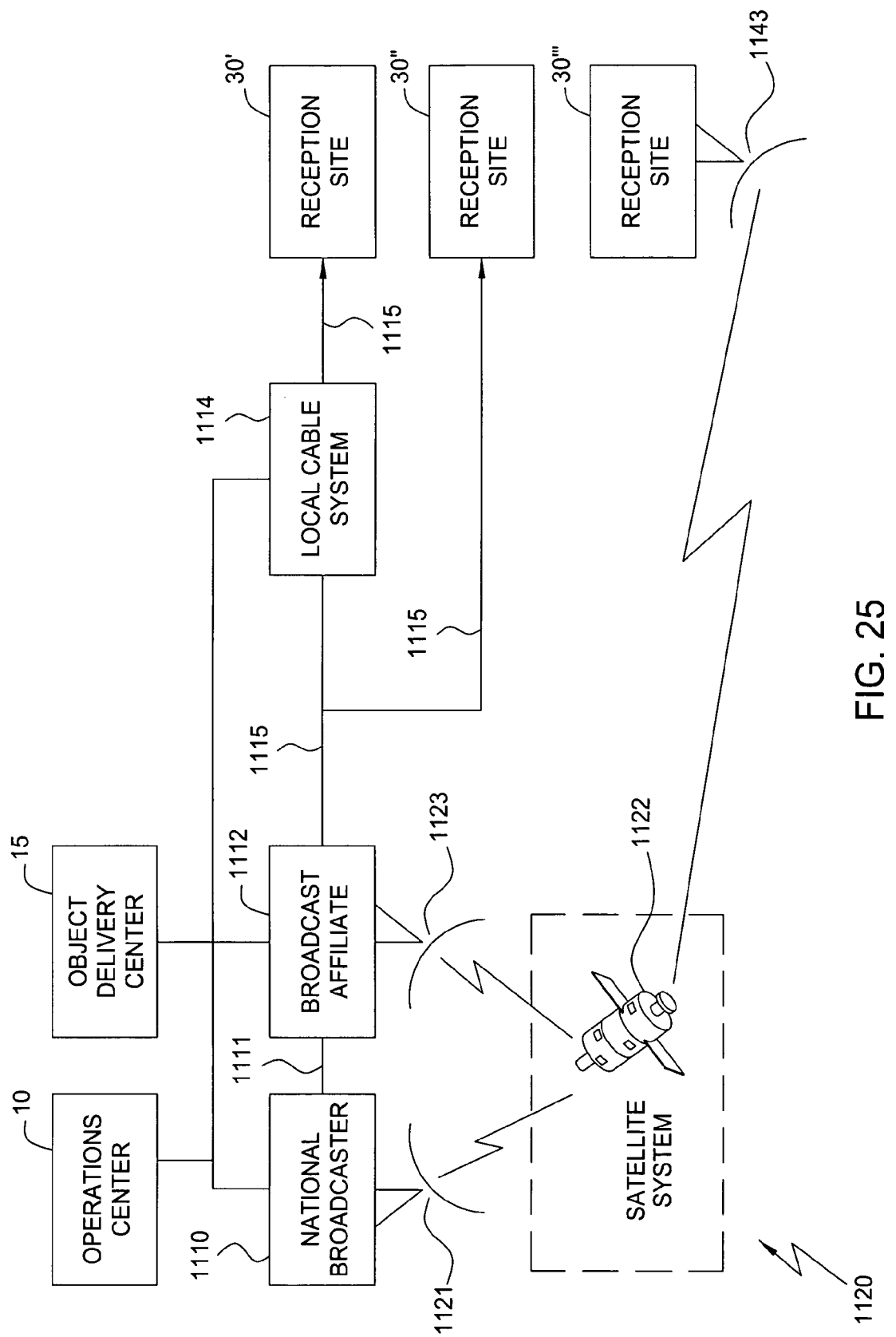
FIG. 25 depicts several embodiments associated with the delivery of virtual objects using a national or local television broadcaster's signal.

FIG. 25 depicts several embodiments associated with the delivery of virtual objects using a national or local television broadcaster's signal. Virtual objects are provided to either the national broadcaster 1110, the broadcast affiliate 1112, or the local cable system 1114 by the object delivery center 15 or directly by the operations center 10. The signal from the national broadcaster 1110 can be delivered to reception site 30', 30" or 30'" using a satellite system 1122, using a broadcast affiliate 1112 terrestrially, or using a local cable system 1114. Alternatively, the local television broadcast affiliate 1112 can originate the signal which can be delivered to the reception site 30', 30"or 30'" terrestrially, or using a local cable system 1114. The signal may provide for the delivery of virtual objects, content 36 containing virtual object locations, and group assignment rules and retrieval plans. The signal may also provide for interactive virtual object requests from the reception sites 30', 30", and 30'" to the interactive object service center 60 using delivery network 14 or the signal may be a means to provide access to the Internet or other public network through which virtual objects or content 36 are delivered. In one embodiment, the video signal is an analog video signal and the virtual objects is embedded in the video signal. In another embodiment, the video signal is a digital video signal and the virtual objects are carried as an independent data stream. In another embodiment, virtual objects may be embedded within the audio signal. In one embodiment, the audio signal is an analog audio signal. In another embodiment, the audio signal is a digital audio signal.

Figure 27:
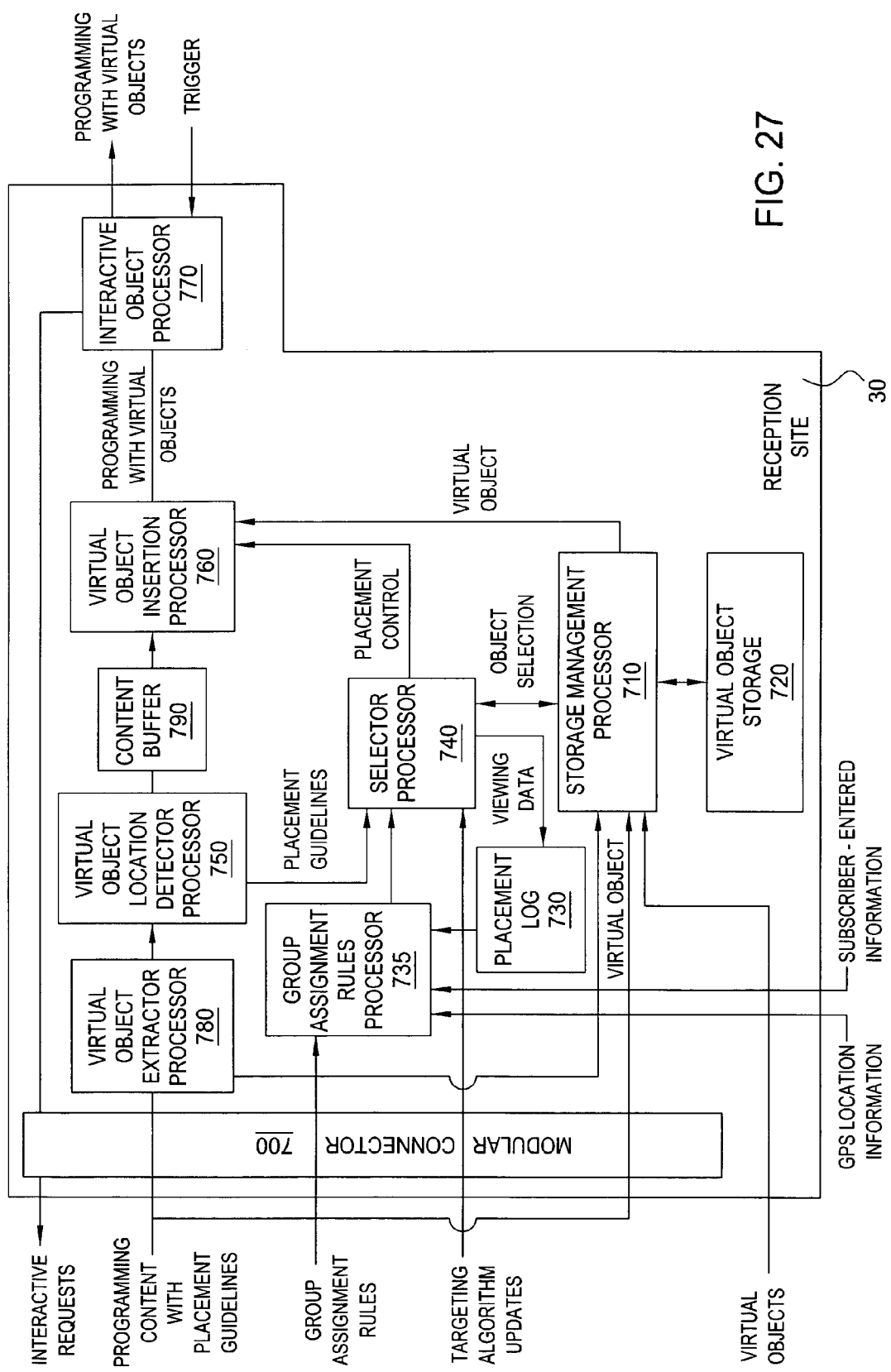
FIG. 27 depicts an example of a reception site.

In yet another embodiment, the signal is a spread spectrum signal containing a digital data stream, requiring an appropriate spread spectrum receiver modular connector, such as the connector 700 of FIG. 27, in the reception site 30', 30" or 30'" to extract the virtual objects. In this embodiment, the spread spectrum signal is transmitted in the same bandwidth as the video or audio signal, but below the noise level.

Alternatively, several embodiments are associated with the delivery of virtual objects using a national or local radio broadcaster's signal. The signal from the national radio broadcaster can be delivered to the reception site 30', 30" or 30'" using the satellite system 1122, or using a broadcast affiliate 1122. Alternatively, the radio broadcast affiliate 1122 can originate the signal, which can be delivered to the reception site 30', 30" or 30'", terrestrially. In one embodiment, the audio signal is an analog audio signal and the virtual objects is embedded in the audio signal. In another embodiment, the audio signal is a digital audio signal and the virtual objects are carried as an independent data stream. In yet another embodiment, the virtual objects are embedded in a sub-carrier of the analog audio broadcast. In another embodiment, the signal is a spread spectrum signal containing a digital data stream, requiring an appropriate spread spectrum receiver modular connector 700 in the reception site 30', 30" or 30'" to extract the virtual objects. In this embodiment, the spread spectrum signal is transmitted in the same bandwidth as the audio signal, but below the noise level.

Figure 26:
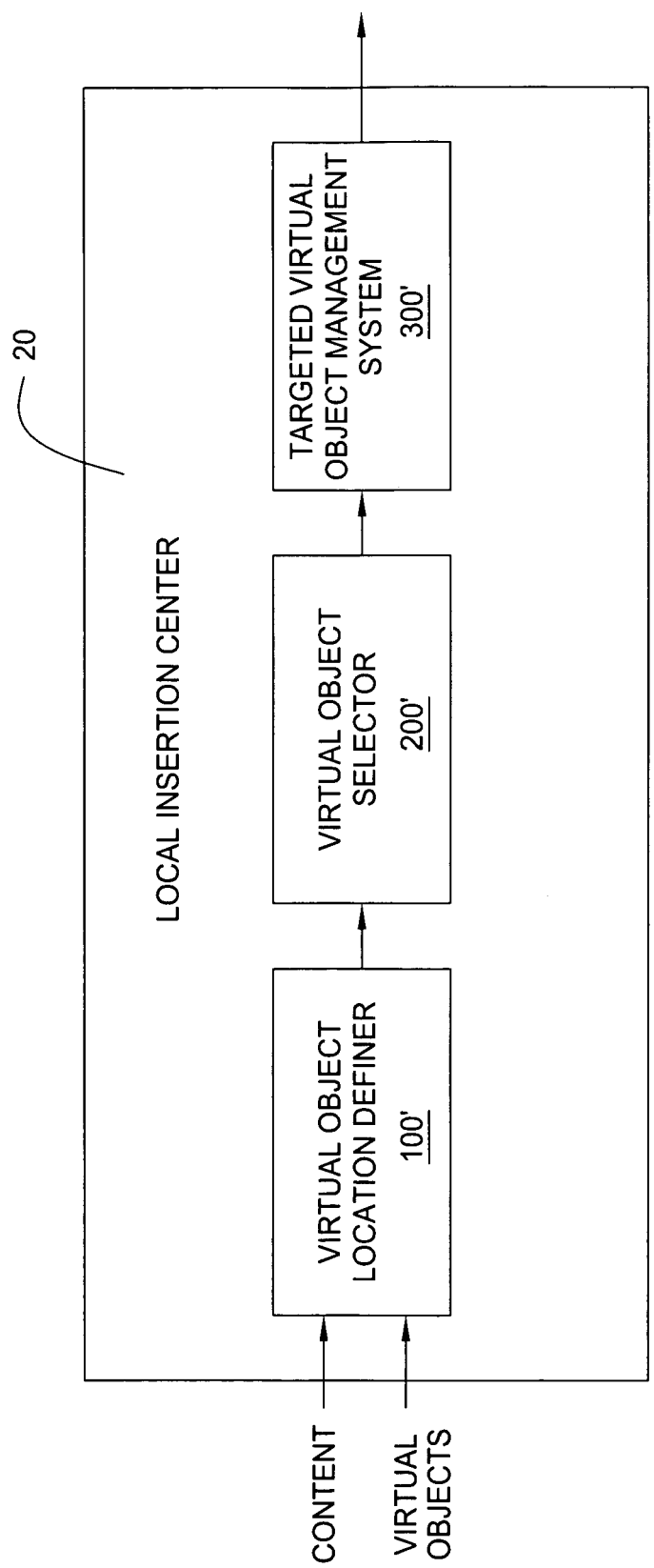
FIG. 26 depicts a local insertion center.

A local insertion center 20 or multiple local insertion centers may optionally be used to insert virtual objects into content 36 provided by an operations center 10 or another local insertion center 20, and any other content source. A local insertion center 20 may perform the same functions as an operations center 10. FIG. 26 depicts a local insertion center 20. As shown in FIG. 26, the local insertion center 20 includes a virtual object location definer 100' a virtual object selector 200', and a targeted virtual object management system 300'(TVOMS) which are identical to the virtual object location definer 100, a virtual object selector 200, and a targeted virtual object management system 300 (TVOMS) of an operations center 10. A local insertion center 20 may detect existing virtual object locations in content 36 and replace existing virtual objects with new virtual objects, delete existing virtual objects, or add new virtual objects in existing virtual object locations and target the virtual objects to reception sites or groups of reception sites. Alternatively, a local insertion center 20 may create new virtual object locations and insert and target virtual objects within these new virtual object locations using the processes defined for the operations center 10. The local insertion center 20 may modify an existing or generate a new retrieval plan and modify an existing or generate new group assignment rules for distribution to reception sites.

FIG. 27 depicts an example of a reception site 30 in more detail. The modular connector 700 may handle all interactions with a reception site 30. Programming content 36 with virtual object locations and metadata packets containing placement guidelines, mattes, and retrieval plans are received by the reception site modular connector 700 and passed to the virtual object extractor processor 780. The virtual object extractor processor 780 removes any virtual objects from the received signal and the retrieval plan information and routes the virtual objects and retrieval plan to the storage management processor 710. The storage management processor 710 uses the retrieval plan to determine which virtual objects are destined to the reception site 30 and saves the required virtual objects in virtual object storage 720. In an alternative embodiment, virtual objects may be received by the reception site 30 independent of the programming content 36. Group assignment rules are received by the modular connector 700 and passed to the group assignment rules processor 735. The group assignment rules processor 735 manages the reception site's subscriber database. The group assignment rules processor 735 allows the subscriber to modify information within the subscriber database either directly or through on-screen menus and prompts. The group assignment rules processor 735 allows the subscriber to review the current group assignment rules in effect for the reception site 30. The group assignment rules processor 735 allows the subscriber to override any or all of the current group assignment rules in effect at the reception site or modify any or all group assignment rules in effect at the reception site 30.

The programming content 36 with virtual object locations is then passed to the virtual object location detector processor 750. Information received about virtual object locations is extracted from the programming content 36 and passed to the selector processor 740 which coordinates with the storage management processor 710 to determine the appropriate virtual object 38 to place into each virtual object location 37 based on placement guidelines and available virtual objects stored in the virtual object storage 720. The storage management processor 710 retrieves the appropriate virtual object 38 for one or more virtual object location 37 contained in the content 36 from the virtual object storage 720. Virtual objects are passed from the storage management processor 710 to the virtual object insertion processor 760.

Programming content 36 with virtual object locations is passed from the virtual object location detector processor 750 to the content buffer 790 where the programming content 36 is stored for a fixed period of time and then played out of the content buffer 790 to the virtual object insertion processor 760. If a virtual object 38 is available for placement in a virtual object location 37, the virtual object 38 is inserted into the appropriate virtual object location 37 by the virtual object insertion processor 760.

In one embodiment, the virtual object location 37 may require that an embedded virtual object 38 be placed within the content 36. The virtual object insertion processor 760 may use techniques for the insertion of embedded virtual objects which are described in detail in U.S. Pat. No. 5,953,076, to Astle, Brian; and Das, Subhodev; titled System and Method of Real Time Insertions into Video Using Adaptive Occlusion with a Synthetic Reference Image; U.S. Pat. No. 5,892,554, to DiCicco, Darrell; and Fant, Karl; entitled System and Method for Inserting Static and Dynamic Images into a Live Video Broadcast; U.S. Pat. No. 5,515,485, to Luquet, Andre; and Rebuffet, Michel; entitled Method and Device for Modifying a Zone in Successive Images; U.S. Pat. No. 5,903,317, to Sharir, Avi; and Tamir, Michael; entitled Apparatus and Method for Detecting, Identifying and Incorporation Advertisements in a Video; and the MPEG4 standard, the disclosure of which are hereby incorporated by reference.

In another embodiment, when the virtual object location 37 may require that an overlaid virtual object 38 be placed within the content 36. The virtual object insertion processor 760 may use techniques for the overlaying of virtual objects which are described in detail in U.S. Pat. No. 4,319,266 to Bannister, Richard S.; entitled Chroma Keying System; U.S. Pat. No. 4,999,709 to Yamazaki, Hiroshi; and Okazaki, Sakae; entitled Apparatus for Inserting Title Pictures; U.S. Pat. No. 5,249,039, to Chaplin, Daniel J.; entitled Chroma Key Method and Apparatus; and U.S. Pat. No. 5,233,423 to Jernigan, Forest E.; and Bingham, Joseph; entitled Embedded Commercials within a Television Receiver using an Integrated Electronic Billboard, the disclosure of which are hereby incorporated by reference. Programming content 36 with embedded and overlaid virtual objects is passed to an optional interactive object processor 770.

If an external trigger is received indicating the subscriber has selected an interactive virtual object 38, the interactive object processor 770 processes the request and passes the subscriber request to the modular connector 700. The modular connector 700, in turn, passes the request to the interactive object servicing center 60. The interactive object servicing center 60 will process the request and may respond back to the reception site 30 with an interactive response.

Preferably, when a virtual object 38 is placed into a virtual object location 37, the selector processor 740 records the event in the placement log 730. The placement log 730 provides viewing data to the group assignment rules processor 735, where the information can be used for future virtual object targeting processing. The selector processor 740 can be provided targeting algorithm updates from external sources.

Figure 28:
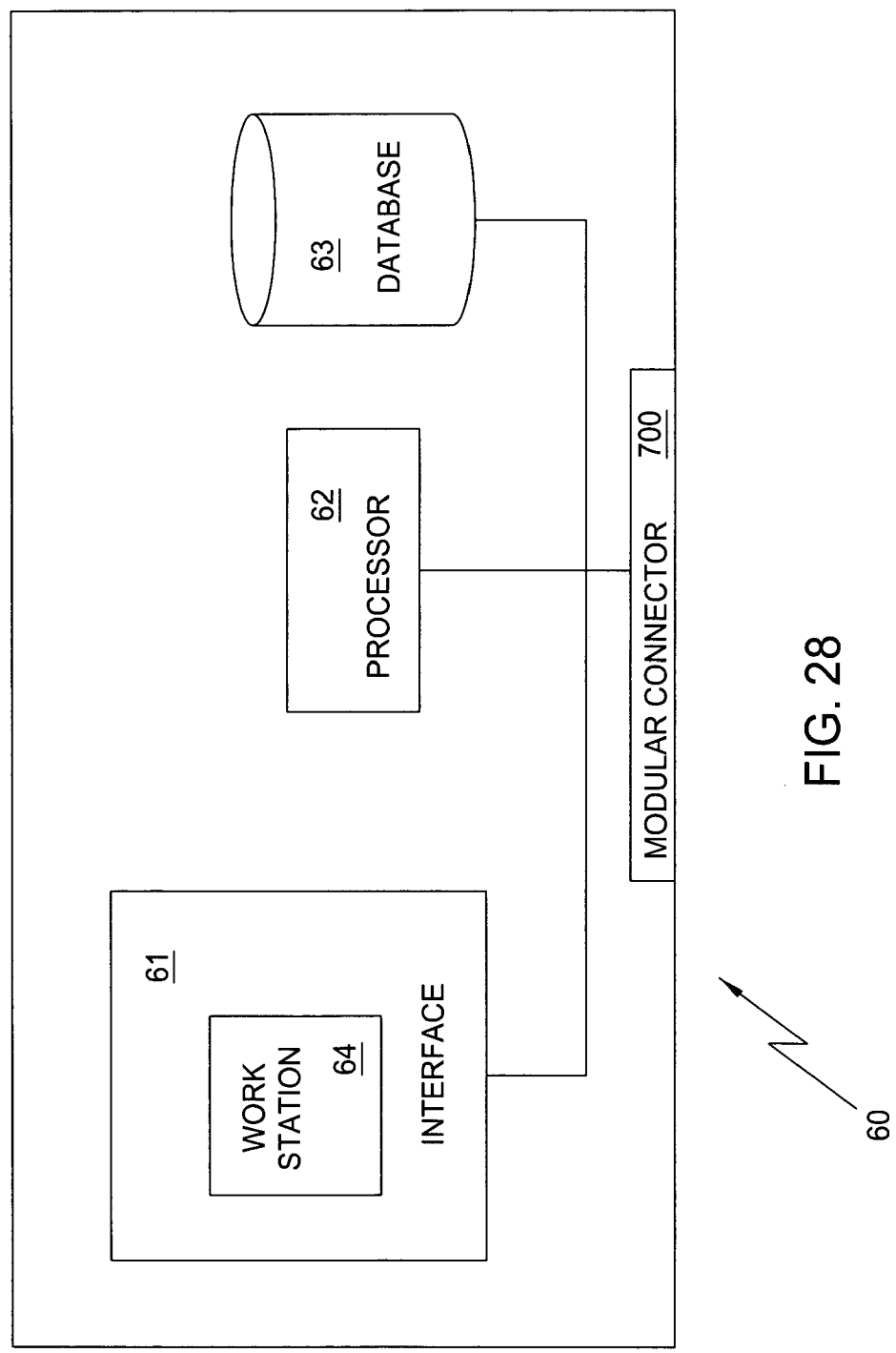
FIG. 28 depicts an interactive object servicing center.
Figure 29:
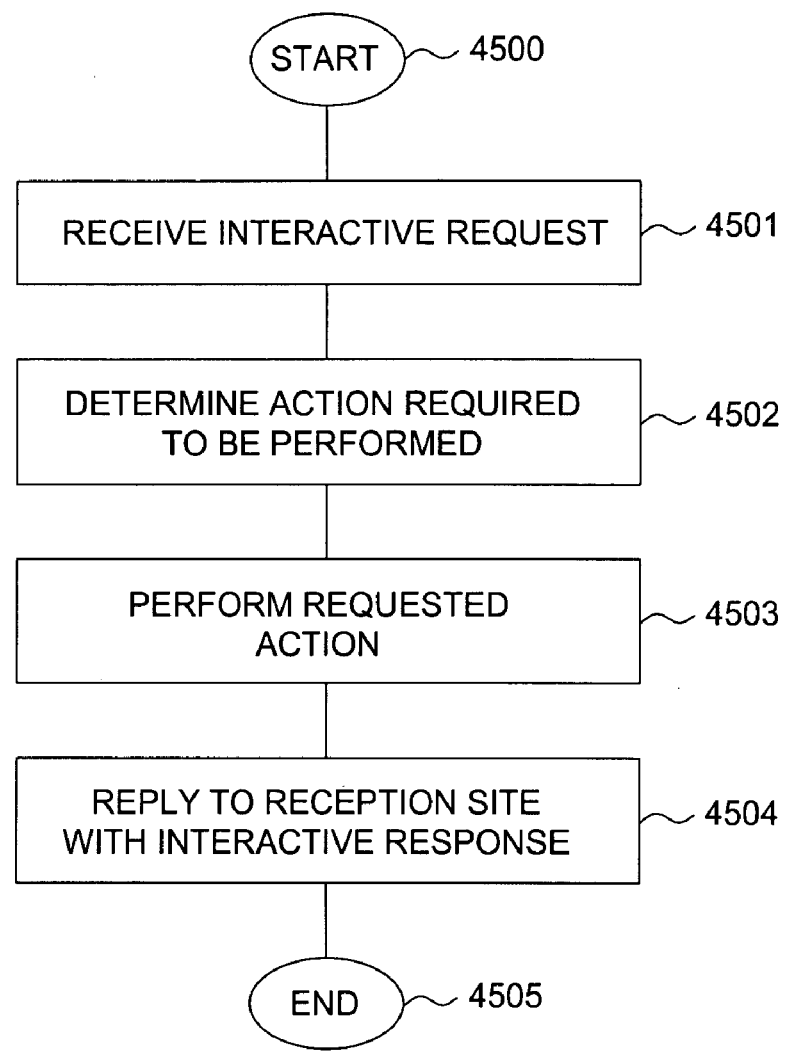
FIG. 29 presents processing performed by an interactive object servicing center.

An interactive object servicing center 60 is depicted in FIG. 28. The interactive object servicing center 60 processes interactive requests and formulates responses to such requests. FIG. 29 presents the process the interactive object servicing center 60 performs. The process begins with block 4500. In block 4501, the interactive object servicing center 60 receives interactive requests from reception sites. In block 4502, the interactive object servicing center 60 determines the appropriate action to be performed based on the received interactive request. In block 4503, the interactive object servicing center 60 performs the appropriate action based on the received interactive request. In block 4504, the interactive object servicing center 60 replies to the requesting reception site with an interactive response.

As shown in FIG. 28, communications to and from the interactive object servicing center 60 over a delivery network may be done using modular connector 700. An interface 61 receives interactive requests from reception sites. The interface 61 can include a workstation, such as the workstation 64, for example, from which an operator manually enters interactive request behavior for the interactive object servicing center 60. A processor 62 processes the received interactive request, performs the appropriate action, retrieving information from database 63 to perform the actions and storing transaction information in database 63 to record the transaction event.

A variety of virtual object targeting delivery systems have been described. One of ordinary skill in the art will recognize that the above description is that of preferred embodiments of the invention and the various changes and modification may be made thereto without departing from the spirit and scope of the invention as defined in the following claims.

What is claimed is:

1. A method for locally targeting virtual advertisements at a users terminal, comprising:
    assigning at least one virtual advertisement spot to a video program;
    assigning a plurality of virtual objects to the at least one virtual advertisement spot, wherein assigning the plurality of virtual objects further comprises:
        ranking one or more of the video programs based on target categories and a first percentage of total viewers in one or more groups of viewers;
        ranking the plurality of virtual objects based on a second percentage of total viewers in the one or more groups of viewers; and
        determining, for one or more of the video programs and one or more of the target categories, the plurality of virtual objects with overall highest rankings, based on the multiplication of the first and the second percentages;
    generating group assignment rules;
    generating a retrieval plan; and
    providing the retrieval plan, the group assignment rules and video program to the terminal, wherein the retrieval plan and the group assignment rules are sent periodically to the terminal, and the retrieval plan directs the terminal to select one of the plurality of virtual objects for placement at said at least one virtual advertisement spot in said video program.

2. The method of claim 1, further comprising:
defining one or more target categories; and
for one or more of the target categories, designating one or more groups, wherein a group is based on common viewer characteristics.

3. The method of claim 2, further comprising assigning the terminal to one or more of the groups, comprising:
storing the group assignment rules at the terminal; and
determining one or more group assignments based on the group assignment rules and data related to the terminal.

4. The method of claim 3, wherein the data related to the terminal includes one or more of Area of Dominant Influence (ADI), zip code+4, demographic data and video programs watched data, virtual objects viewed, on-screen questionnaires and characteristics imported from marketing databases, the group assignments being updated to reflect changes in the ADI, zip code+4, demographic data, video programs watched data, virtual objects viewed, on-screen questionnaires, and characteristics imported from marketing databases.

5. The method of claim 2, wherein generating the retrieval plan comprises:
designating a unique group mask for one or more of the groups; and
assigning one or more of the groups to one of the virtual objects, wherein the group mask indicates whether the terminal displays a particular virtual object.

6. A method of locally targeting virtual objects, comprising:
creating categories of virtual objects and video programs;
within one or more of the categories, defining one or more groups;
generating group assignment rules based on common viewer characteristics;
providing the group assignment rules to one or more of the terminals;
providing a video program containing one or more virtual object locations;
providing virtual objects for one or more of the virtual object locations;
providing alternate virtual objects for one or more of the virtual object locations; and
generating a retrieval plan at one or more of the terminals, wherein the retrieval plan at one or more of the terminals designates which of the one or more virtual object locations displays an alternate virtual object in the video program,
wherein generating the retrieval plan, comprises:
assigning the virtual objects to the one or more virtual object locations;
assigning the alternate virtual objects to at least one of the one or more virtual object locations;
assigning a group to one or more of the virtual objects and the alternate virtual objects, wherein assigning the group to the virtual objects and the alternate virtual objects, comprises:
ranking one or more video programs based on the categories of targeted virtual objects and a first percentage of total viewers who may view the one or more video programs;
ranking the targeted virtual objects based on a second percentage of the total viewers: and
determining, for the one or more ranked video programs and the categories of targeted virtual objects, targeted virtual objects with overall highest rankings, based on the multiplication of the first and the second percentages; and
creating a group mask assignment, wherein the group mask assignment is used at the terminals to compare the retrieval plan to the assignments of the terminals to the groups.

7. The method of claim 6, wherein the video program is a television program.

8. The method of claim 6, wherein at least one of the virtual object locations is fixed in position across frames of the video program.

9. The method of claim 6, wherein at least one of the virtual object locations moves spatially in the video program with time.

10. The method of claim 6, wherein at least one of the virtual objects is interactive.

11. The method of claim 6, wherein the video program is broadcast to the terminals, further comprising:
storing the group assignment rules in one or more of the terminals;
using the stored group assignment rules, assigning one or more of the terminals to one or more of the groups; and
comparing the retrieval plan to the group assignments to determine virtual objects to display in the one or more virtual object locations.

12. The method of claim 6, wherein assigning the group to the virtual objects and the alternate virtual objects, further comprises:
assigning targeted virtual objects with the overall highest rankings to be displayed as the virtual objects; and
assigning targeted advertisements with lower overall rankings to be displayed as the alternate virtual objects.

13. The method of claim 11, wherein the common viewer characteristics include viewer demographic information.

14. The method of claim 11, wherein the common viewer characteristics include viewer-entered information.

15. The method of claim 11, wherein the common viewer characteristics include video programs watched data.

16. The method of claim 11, wherein the common viewer characteristics include virtual objects watched data.

17. The method of claim 11, wherein one or more of the virtual object locations contain an interactive virtual object, and wherein the common viewer characteristics include viewer activation of the interactive virtual object.

18. The method of claim 11, wherein the terminals are television set top terminals.

19. The method of claim 11, wherein one or more of the terminals is incorporated into one of a television, a personal computer and a PDA with video viewing capabilities.

20. The method of claim 11, wherein one or more of the terminals is a satellite television receiver.

21. The method of claim 11, further comprising:
at one or more of the terminals, recording in a memory an identification of a virtual object displayed in a virtual object location;
providing the identification to a remote site; and
deleting the identification from the memory.

22. A method of locally targeting virtual objects to terminals, comprising:
creating a package of targeted virtual objects, comprising:
ranking one or more video programs based on target categories of targeted virtual objects and a first percentage of total viewers in one or more groups of viewers;
ranking the targeted virtual objects based on a second percentage of total viewers in the one or more groups of viewers; and determining, for one or more of the video programs and one or more of the target categories, targeted virtual objects with overall highest rankings, based on the multiplication of the first and the second percentages;

providing the package to one or more of the terminals;

generating group assignment rules;

providing the group assignment rules to one or more of the terminals;

generating a retrieval plan;

storing the retrieval plan at one or more of the terminals; and providing a video program to one or more of the terminals, the video program including at least one virtual object location, wherein the retrieval plan designates virtual objects to be displayed during a display of the video program.

23. The method of claim 22, further comprising:

storing the group assignment rules at one or more of the terminals; and creating group assignments by assigning one or more of the terminals to one or more groups based on the group assignment rules.

24. The method of claim 23, further comprising at one or more of the terminals receiving the video program, retrieving one of the targeted virtual objects for display in the at least one virtual object location.

25. The method of claim 24, wherein the retrieval step, comprises:

comparing the group assignments to the retrieval plan; and selecting a virtual object for display based on the comparison.

26. The method of claim 23, wherein one or more of at least one virtual object locations contains an interactive virtual object, further comprising:

receiving a selection of the interactive virtual object; and linking a terminal selecting the interactive virtual object to an alternate program.

27. The method of claim 26, wherein the alternative program comprises an Internet web site.

28. The method of claim 23, wherein the step of creating the group assignments comprises analyzing individual terminal data and terminal group data.

29. The method of claim 28, wherein the individual terminal data comprises one or more of viewer demographic data, programs watched data, virtual objects viewed data, on-screen questionnaires, and characteristics imported from marketing databases, and wherein the terminal group data, comprises one or more of ADI, zip code, and geographical data.

30. The method of claim 28, wherein one or more of the terminals comprises a global positioning satellite receiver, further comprising:

determining a geographical location of one or more of the terminals; and storing the geographical location of the one or more of the terminals as individual terminal data.

31. A method for assigning targeted virtual objects to virtual object locations in one or more video programs, comprising:

identifying the one or more video programs to carry the targeted virtual objects;

assigning the targeted virtual objects to target categories;

ranking one or more of the video programs based on the target categories and a first percentage of total viewers in one or more groups of viewers;

ranking the targeted virtual objects based on a second percentage of total viewers in the one or more groups of viewers;

determining, for one or more of the video programs and one or more of the target categories, targeted virtual objects with overall highest rankings, based on the multiplication of the first and the second percentages;

assigning one or more targeted virtual objects as default virtual objects;

assigning one or more targeted virtual objects as alternate virtual objects; and assigning the default virtual objects and the alternate virtual objects to the virtual object locations.

32. The method of claim 31, wherein the first and second percentages of total viewers are based on viewer demographic information including zip code, ADI and geographical data.

33. The method of claim 31, wherein assigning the default virtual objects and the alternate virtual objects, comprises:

dividing one or more target categories into groups;

generating group assignment rules that are used to assign or more of the terminals to one or more of the groups:

storing the group assignment rules at one or more of the terminals, wherein processors at the one or more terminals assign the terminals to one or more groups using the group assignment rules;

generating a retrieval plan; and providing the retrieval plan to one or more of the terminals receiving the video programs at the one or more terminals, comparing the group assignments to the retrieval plan.

34. The method of claim 33, further comprising:

revising the retrieval plan and the group assignment rules; and providing the revised retrieval plan and the revised group assignment rules to the one or more terminals.

35. The method of claim 33, wherein the retrieval plan and the group assignment rules are provided over an Internet.

36. The method of claim 31, wherein the package of targeted virtual objects is provided to a terminal over an Internet.

37. The method of claim 31 wherein the package of targeted virtual objects is provided to a terminal using one of a public switched telephone network, a cable television network, a satellite television network, a local area network and a fiber optic network.

38. The method of claim 31, wherein virtual objects are provided with program content.

39. The method of claim 31, wherein virtual objects are provided independently of program content.

40. A method for locally targeting virtual objects to subscribers in a television program delivery system, comprising:

identifying the one or more video programs to carry targeted virtual objects;

assigning the targeted virtual objects to target categories;

ranking one or more of the video programs based on the target categories and a first percentage of total viewers in one or more groups of viewers;

ranking the targeted virtual objects based on a second percentage of total viewers in the one or more groups of viewers;

determining, for one or more of the video programs and one or more of the target categories, targeted virtual objects with overall highest rankings, based on the multiplication of the first and the second percentages;

gathering information related to a plurality of subscribers, wherein individual subscriber's information is gathered and stored at individual subscriber's terminals;

analyzing the gathered information to determine a subscriber profile for one of the plurality of subscribers;

correlating the subscriber profile with categories of virtual objects, wherein one or more virtual object categories includes targeted virtual objects; and selecting from the correlated virtual objects for placement in the one or more of the video programs based on an optimum placement determination.

41. The method of claim 40, wherein the individual subscriber's information includes virtual objects watched data.

42. The method of claim 40, further comprising defining virtual object locations, wherein the virtual objects are displayed in the virtual object locations.

43. The method of claim 42, wherein the virtual object locations are defined in a television program.

44. The method of claim 42, wherein the virtual object locations are defined in an advertisement provided over a television delivery system.

45. A computer readable medium encoded with a routine, executable by a processor, for targeting virtual objects to an individual viewer, the routine, comprising:

a group definition routine that defines groups based on common viewer characteristics;

a group assignment routine that assigns individual viewer terminals to one or more of the groups;

a virtual object location routine that determines available virtual object locations in a video program; and a retrieval plan generator that generates a plan for retrieving one or more virtual objects for display in one or more of the available virtual object locations, wherein the retrieval plan is generated based on the group definitions, and the one or more virtual objects is assigned comprising:

ranking one or more of the video programs based on target categories of targeted virtual objects and a first percentage of total viewers in one or more groups of viewers;

ranking the virtual objects based on a second percentage of total viewers in the one or more groups of viewers; and determining, for one or more of the video programs and one or more of the target categories, targeted virtual objects with overall highest rankings, based on the multiplication of the first and the second percentages; and a delivery processor that sends group assignment rules to the individual viewer terminals.

46. A method for targeting virtual objects to locations in a video program, comprising:

at a local viewer terminal, identifying virtual objects for insertion into one or more of the locations in the video program, wherein the identified virtual objects is assigned comprising the steps of:

ranking one or more of the video programs based on target categories and a first percentage of total viewers in one or more groups of viewers;

ranking the virtual objects based on a second percentage of total viewers in the one or more groups of viewers; and determining, for one or more of the video programs and one or more of the target categories, identified virtual objects with overall highest rankings, based on the multiplication of the first and the second percentages;

generating an individual viewer profile; and providing one or more of the identified virtual objects for insertion at least partially based on the individual viewer profile and group assignment rules, wherein the group assignment rules are provided by a remote location to the local viewer terminal.

47. A method for targeting virtual objects to terminals, comprising:

identifying the terminals based on viewing characteristics of individual terminals;

identifying virtual object locations in video programs for display at the terminals; and targeting the virtual objects for insertion into the virtual object locations based on the identities of the terminals, wherein the targeted virtual objects is assigned comprising the steps of:

ranking one or more of the video programs based on target categories and a first percentage of total viewers in one or more groups of viewers;

ranking the targeted virtual objects based on a second percentage of total viewers in the one or more groups of viewers; and determining, for one or more of the video programs and one or more of the target categories, targeted virtual objects with overall highest rankings, based on the multiplication of the first and the second percentages.

48. The method of claim 47, further comprising displaying multiple virtual objects simultaneously at the identified terminals.

49. The method of claim 47, wherein one or more of the virtual objects are interactive virtual objects, further comprising:

receiving a selection of one or more of the interactive virtual objects from one or more of the terminals;

linking the selecting terminal to a remote location; and displaying video content from the remote location at the selecting terminal.

50. The method of claim 49, wherein the remote location is an operations center and the content is an additional program.

51. The method of claim 49, wherein the remote location is an Internet web site and the content is one or more web pages.

52. A terminal in a television program delivery system that targets virtual objects for display to a viewer of the terminal, comprising:

a receiver that receives group assignment rules and video programs containing virtual object locations, virtual objects, and a virtual object retrieval plan, wherein the virtual objects is assigned comprising the steps of:

ranking one or more of the video programs based on target categories and a first percentage of total viewers in one or more groups of viewers;

ranking the virtual objects based on a second percentage of total viewers in the one or more groups of viewers; and determining, for one or more of the video programs and one or more of the target categories, virtual objects with overall highest rankings, based on the multiplication of the first and the second percentages;

a memory that stores the group assignment rules and the virtual object retrieval plan; and a processor that executes a group assignment routine using the group assignment rules and data related to the terminal to assign the terminal to one or more groups, wherein the groups are defined based on common viewer characteristics, and executes a virtual object assignment routine that assigns virtual objects to the virtual object locations based on a comparison of the retrieval plan and the group assignments.

53. The terminal of claim 52, wherein the group assignment rules include an initial set of group assignment rules stored in the memory.

54. The terminal of claim 52, wherein the data related to the terminal is stored in the memory, the data related to the terminal including internal information generated internally at the terminal and external information generated external to the terminal and provided to the terminal.

55. The terminal of claim 54, wherein the terminal further comprises a global positioning satellite (GPS) receiver, the GPS receiver determining a location of the terminal, wherein the location is stored in the memory as internal information, and wherein the processor uses the location to determine area of dominant influence and postal code information.

56. The terminal of claim 54, wherein the internal information includes programs watched information and virtual objects viewed information for video programs and virtual objects displayed at the terminal.

57. The terminal of claim 52, wherein the group assignment rules are periodically revised, the memory storing the revised group assignment rules and the processor determining revised group assignments based on the revised group assignment rules.

58. The terminal of claim 52, wherein the data related to the terminal is revised, the processor determining revised group assignments based on the revised data related to the terminal.

59. The terminal of claim 52, wherein the processor uses the group assignment rules to derive terminal identifying information based on other information stored at the terminal.

60. A method for assigning targeted virtual objects to virtual object locations in one or more video programs, comprising:
   identifying the one or more video programs to carry the targeted virtual objects;
   ranking the one or more of the video programs based on target categories of targeted virtual objects and a first percentage of total viewers in one or more groups of viewers;
   ranking the targeted virtual objects based on a second percentage of total viewers in the one or more groups of viewers;
   assigning the targeted virtual objects to target categories and to groups within the target categories;
   generating virtual object location group percentage breakdowns, wherein the generating step comprises using generic viewing population information to assign the groups to the one or more video programs;
   creating virtual object ranking percentages based on the generic viewing population information;
   determining, for one or more of the video programs and one or more of the target categories, targeted virtual objects with overall highest ranking percentages, based on the multiplication of the first and the second percentages; and
   assigning virtual objects to the virtual object locations based on the determined ranking percentages and group percentage breakdowns.

61. A method of targeting virtual objects to terminals, comprising:
   identifying virtual objects;
   providing the one or more of the virtual objects to one or more of the terminals, wherein the virtual objects is assigned for providing comprising:
      ranking one or more of the video programs based on target categories and a first percentage of total viewers in one or more groups of viewers;
      ranking the virtual objects based on a second percentage of total viewers in the one or more groups of viewers; and
      determining, for one or more of the video programs and one or more of the target categories, the virtual objects with overall highest rankings, based on the multiplication of the first and the second percentages;
   generating group assignment rules;
   providing the group assignment rules to one or more of the terminals;
   generating a retrieval plan;
   storing the retrieval plan at one or more of the terminals; and
   providing a video program to one or more of the terminals, the video program including at least one virtual object location, wherein the retrieval plan designates virtual objects to be displayed during a display of the video program.

62. The method of claim 61, further comprising:
   storing the group assignment rules at one or more of the terminals; and
   creating group assignments by assigning one or more of the terminals to one or more groups based on the group assignment rules.

63. The method of claim 62, wherein the step of generating group assignment rules comprises generating initial group assignment rules, and wherein the step of storing the group assignment rules comprises storing the initial group assignment rules.

64. The method of claim 63, wherein the initial group assignment rules are stored at or before an initial use of a terminal.

65. The method of claim 62, further comprising at one or more of the terminals receiving the video program, retrieving one of the targeted virtual objects for display in the at least one virtual object location.

66. The method of claim 65, wherein the retrieval step, comprises:
   comparing the group assignments to the retrieval plan; and
   selecting a virtual object for display based on the comparison.

67. The method of claim 62, wherein one or more of at least one virtual object locations contains an interactive virtual object, further comprising:
   receiving a selection of the interactive virtual object; and
   linking a terminal selecting the interactive virtual object to an alternate program.

68. The method of claim 62, wherein the group assignment rules are provided to a terminal using one of a public switched telephone network, a cable television network, a satellite television network, a local area network, a fiber optic network and an Internet.

69. The method of claim 61, wherein the virtual objects are provided to a terminal using one of a public switched telephone network, a cable television network, a satellite television network, a local area network, a fiber optic network and an Internet.

70. The method of claim 61, wherein the retrieval plan is provided to a terminal using one of a public switched telephone network, a cable television network, a satellite television network, a local area network, a fiber optic network and an Internet.

* * * * *

UNITED STATES PATENT AND TRADEMARK OFFICE
CERTIFICATE OF CORRECTION

| | | |
|---|---|---|
| PATENT NO. | : 7,207,053 B1 | |
| APPLICATION NO. | : 09/628805 | |
| DATED | : April 17, 2007 | |
| INVENTOR(S) | : Michael L. Asmussen | |

It is certified that error appears in the above-identified patent and that said Letters Patent is hereby corrected as shown below:

Column 9, line 3, delete "object based" and insert instead --object-based--; line 36, after "content" insert --36--.

Column 23, lines 49-50 (approx), delete "[TOTAL_VIRTUAL OBJECTS]" and insert instead --[TOTAL_VIRTUALOBJECTS]--.

Column 24, line 64, delete "amore" and insert instead --a more--.

Column 25, line 19, delete "if," and insert --1f,--.

Column 30, line 2, delete "[MAX_VIRTUAL OBJECTS]" and insert instead --[MAX_VIRTUALOBJECTS]--; line 4, delete "[MAX_VIRTUAL OBJECTS]" and insert instead --[MAX_VIRTUALOBJECTS]--; lines 20-21, delete delete "[MAX_VIRTUAL OBJECT]" and insert instead --[MAX_VIRTUALOBJECT]--; line 25 (approx), delete "[MAX_VIRTUAL OBJECTS]" and insert instead --[MAX_VIRTUALOBJECTS]--.

Column 32, line 60, delete "700'," and insert instead --700'",--.

Column 38, line 22, delete "100'" and insert instead --100',--.

Column 40, line 44 (approx), in claim 1, delete "users" and insert instead --user's--.

Column 41, line 64, in claim 6, delete "viewers:" and insert instead --viewers;--.

Column 44, line 21 (approx), in claim 33, delete "groups:" and insert instead --groups;--; line 43 (approx), in claim 37, after "claim 31" insert --,--.

Signed and Sealed this

Twenty-first Day of August, 2007

JON W. DUDAS
*Director of the United States Patent and Trademark Office*